United States Patent
Toyooka et al.

(10) Patent No.: US 11,014,344 B2
(45) Date of Patent: May 25, 2021

(54) TRANSFER FILM, ELECTRODE PROTECTIVE FILM, LAMINATE, ELECTROSTATIC CAPACITANCE-TYPE INPUT DEVICE, METHOD FOR MANUFACTURING ELECTROSTATIC CAPACITANCE-TYPE INPUT DEVICE, AND METHOD FOR MANUFACTURING TRANSFER FILM

(71) Applicant: FUJIFILM Corporation, Tokyo (JP)

(72) Inventors: Kentaro Toyooka, Shizuoka (JP); Yohei Aritoshi, Shizuoka (JP); Tatsuya Shimoyama, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 297 days.

(21) Appl. No.: 16/121,713

(22) Filed: Sep. 5, 2018

(65) Prior Publication Data

US 2019/0004632 A1 Jan. 3, 2019

Related U.S. Application Data

(63) Continuation of application No. PCT/JP2017/009336, filed on Mar. 8, 2017.

(30) Foreign Application Priority Data

Mar. 8, 2016 (JP) .............................. JP2016-044831
Aug. 9, 2016 (JP) .............................. JP2016-156904
(Continued)

(51) Int. Cl.
*B32B 27/08* (2006.01)
*B32B 7/06* (2019.01)
(Continued)

(52) U.S. Cl.
CPC .............. *B32B 27/281* (2013.01); *B32B 7/02* (2013.01); *B32B 7/06* (2013.01); *B32B 27/08* (2013.01);
(Continued)

(58) Field of Classification Search
CPC .. B32B 7/02; B32B 7/06; B32B 27/08; B32B 27/308; B32B 37/025; B32B 2307/748;
(Continued)

(56) References Cited

U.S. PATENT DOCUMENTS

2015/0251393 A1 9/2015 Kanna et al.
2018/0001606 A1 1/2018 Kanna et al.

FOREIGN PATENT DOCUMENTS

CN 104812569 A 7/2015
JP 2004050734 A 2/2004
(Continued)

OTHER PUBLICATIONS

Machine translation of detailed description of JP 2015-208987 acquired Sep. 21, 2020.*
(Continued)

*Primary Examiner* — Gerard Higgins
(74) *Attorney, Agent, or Firm* — Sughrue Mion, PLLC

(57) ABSTRACT

A transfer film including, on a temporary support, a first transparent layer including at least a polymerizable monomer and a resin, a second transparent layer including at least metal oxide particles and a resin and having an average thickness of less than 200 nm, and a third transparent layer having an average thickness that is smaller than the average thickness of the second transparent layer sequentially from a temporary support side, and application thereof. The third transparent layer has a percentage of metal atoms in all atoms in the layer which is smaller than a percentage of metal atoms in all atoms in the second transparent layer, or
(Continued)

a percentage of metal atoms in all atoms of 2% or less in a 300 μm×300 μm area in the case of being measured from an outermost surface opposite to a surface in contact with the second transparent layer using X-ray photoelectron spectroscopy.

22 Claims, 1 Drawing Sheet

(30) Foreign Application Priority Data

Mar. 7, 2017 (JP) .............................. JP2017-043227
Mar. 7, 2017 (JP) .............................. JP2017-043289

(51) Int. Cl.
  *B32B 27/28* (2006.01)
  *B32B 7/02* (2019.01)
  *B32B 37/00* (2006.01)
  *B32B 27/30* (2006.01)
  *B32B 37/26* (2006.01)

(52) U.S. Cl.
  CPC .......... *B32B 27/308* (2013.01); *B32B 37/025* (2013.01); *B32B 2037/268* (2013.01); *B32B 2264/1022* (2020.08); *B32B 2264/1024* (2020.08); *B32B 2307/412* (2013.01); *B32B 2307/418* (2013.01); *B32B 2307/748* (2013.01); *B32B 2457/208* (2013.01)

(58) Field of Classification Search
  CPC ........ B32B 2307/418; B32B 2307/412; B32B 2457/208
  See application file for complete search history.

(56) References Cited

FOREIGN PATENT DOCUMENTS

| | | | |
|---|---|---|---|
| JP | 2014108541 | A | 6/2014 |
| JP | 2014142834 | A | 8/2014 |
| JP | 2015099284 | A | 5/2015 |
| JP | 2015196369 | A | 11/2015 |
| JP | 2015208987 | A | 11/2015 |
| KR | 10-2015-0082338 | A | 7/2015 |

OTHER PUBLICATIONS

Machine translation of detailed description of JP 2015-099284 acquired Sep. 21, 2020.*
International Search Report of PCT/JP2017/009336 filed Jun. 13, 2017.
Written Opinion of PCT/JP2017/009336 dated Jun. 13, 2017 [PCT/ISA/237].
International Preliminary Report on Patentability issued in International Application No. PCT/JP2017/009336 dated Sep. 11, 2018 [PCT/IB/373].
Communication dated Feb. 13, 2020, issued by the Korean Intellectual Property Office in application No. 10-2018-7025399.
Communication dated Apr. 2, 2019 issued by the Japanese Patent Office in counterpart Japanese application No. 2017-043227.
Communication dated Apr. 2, 2019 issued by the Japanese Patent Office in counterpart Japanese application No. 2017-043289.
The First Office Action dated Nov. 19, 2019, issued by the State Intellectual Property Office of People's Republic of China in counterpart Application No. 201780014096.9.
Korean Intellectual Property Office; Communication dated Aug. 2, 2019 issued in counterpart application No. 10-2018-7025399.
Communication dated Jul. 14, 2020 in Taiwanese Patent Application No. 106107613.

* cited by examiner

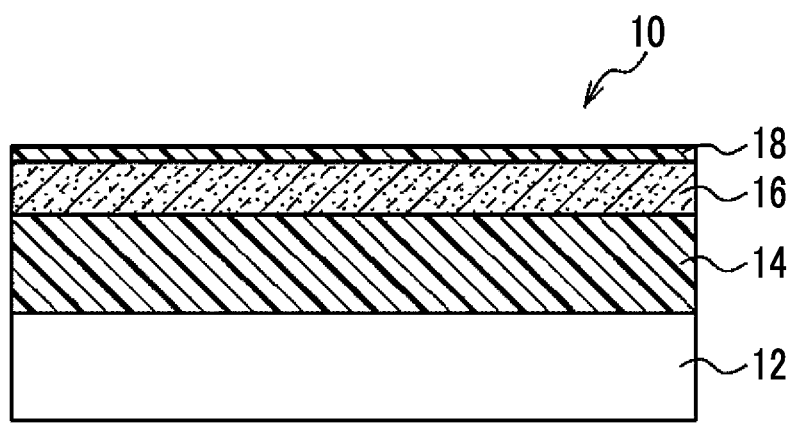

TRANSFER FILM, ELECTRODE PROTECTIVE FILM, LAMINATE, ELECTROSTATIC CAPACITANCE-TYPE INPUT DEVICE, METHOD FOR MANUFACTURING ELECTROSTATIC CAPACITANCE-TYPE INPUT DEVICE, AND METHOD FOR MANUFACTURING TRANSFER FILM

CROSS-REFERENCE TO RELATED APPLICATIONS

This application is a continuation application of International Application No. PCT/JP2017/009336, filed Mar. 8, 2017, the disclosure of which is incorporated herein by reference in its entirety. Further, this application claims priority from Japanese Patent Application No. 2016-044831, filed Mar. 8, 2016, Japanese Patent Application No. 2016-156904, filed Aug. 9, 2016, Japanese Patent Application No. 2017-043227, filed Mar. 7, 2017, and Japanese Patent Application No. 2017-043289, filed Mar. 7, 2017, the disclosures of which are incorporated herein by reference in their entirety.

BACKGROUND OF THE INVENTION

1. Field of the Invention

The present disclosure relates to a transfer film, an electrode protective film, a laminate, an electrostatic capacitance-type input device, a method for manufacturing an electrostatic capacitance-type input device, and a method for manufacturing a transfer film.

2. Description of the Related Art

Recently, in electronic devices such as mobile phones, car navigations, personal computers, ticket vending machines, and bank terminals, a tablet-type input device is disposed on the surface of a liquid crystal device or the like. There are electronic devices in which information corresponding to command images displayed in an image display region of a liquid crystal device can be input by touching places in which the command images are displayed with a stylus, a finger, or the like with reference to the command images.

As the input device as described above (hereinafter, referred to as the "touch panel" in some cases), there are resistance film-type input devices, electrostatic capacitance-type input devices, and the like. Electrostatic capacitance-type input devices have an advantage that a translucent conductive film needs to be formed on only one substrate. As such electrostatic capacitance-type input devices, for example, there are input devices in which electrode patterns are extended in mutually intersecting directions and input locations are detected by sensing changes in electrostatic capacitance between electrodes caused in a case in which the input locations are touched with a finger or the like.

For the purpose of protecting guidance wires (for example, metal wires such as copper wires) arranged in electrode patterns or frame portions in the electrostatic capacitance-type input device, a transparent resin layer is provided on a surface on which information is input with a finger or the like.

In the case of the above-described electrostatic capacitance-type input devices, there are cases in which, for example, in a case in which the surface of the touch panel is seen from a location slightly away from a point of regular reflection of incident light from a light source, the transparent electrode patterns present inside become visible, and a trouble with the appearance is caused. Therefore, there is a demand for improving the transparent electrode pattern-masking property on the surfaces of touch panels and the like.

JP2014-108541A describes a transfer film including a temporary support, a first curable transparent resin layer, and a second curable transparent resin layer disposed adjacent to the first curable transparent resin layer in this order, in which the refractive index of the second curable transparent resin layer is higher than the refractive index of the first curable transparent resin layer, and the refractive index of the second curable transparent resin layer is 1.6 or higher and describes that, in a case in which an electrode protective film is formed, the transparent electrode pattern-masking property is favorable.

JP2004-50734A relates to a transfer film having an antireflective transfer film provided on a base material film surface, describes that the transfer film is produced by laminating a first refraction layer, a second refraction layer, and a third refraction layer in this order on a base material film surface and the visible light refractive indexes of the respective layers decrease in order of the second refraction layer, the third refraction layer, and the first refraction layer, and describes that the antireflection capability is favorable and the productivity is excellent.

JP2015-196369A discloses a transfer film having a temporary support, a first curable transparent resin layer, and a second curable transparent resin layer disposed adjacent to the first curable transparent resin layer in this order, in which any one of the first curable transparent resin layer and the second curable transparent resin layer is a layer exhibiting water solubility, the other layer is a layer exhibiting non-water solubility, the refractive index of the second curable transparent resin layer is higher than the refractive index of the first curable transparent resin layer, and the refractive index of the second curable transparent resin layer is 1.6 or higher. The transfer film described in JP2015-196369A is described to be favorable in terms of the pattern-forming property and the transparent electrode pattern-masking property, and furthermore, it is described that a third curable transparent resin layer can be applied on the second curable transparent resin layer.

SUMMARY OF THE INVENTION

As a method for adjusting the refractive index of the second curable transparent resin layer to 1.6 or more in the transfer film described in JP2014-108541A, a method in which metal oxide particles are added to the second curable transparent resin layer is exemplified.

According to the present inventors' studies, in a case in which the second curable transparent resin layer containing metal oxide particles is present on the outermost surface and the metal oxide particles are unevenly distributed in the second curable transparent resin layer, during the lamination of the transfer film on a transfer target member, there are cases in which linear defects are generated in the transparent resin layer due to the unevenly-present metal oxide particles. In a case in which linear defects are generated in the transfer film and the transfer film is used to form an electrode protective film, there is a likelihood that light may leak along the linear defects.

In the case of the transfer film described in JP2004-50734A, the adjustment of the refractive indexes of the respective layers is troublesome, there is no description of metal oxide particles as an antireflective material, and there is still room for improvement in order to obtain an intended transparent electrode pattern-masking property.

In the case of the transfer film described in JP2015-196369A, the second transparent resin layer includes metal oxide particles, the third transparent resin layer which is a random layer that can be formed on the second transparent resin layer using a coating method also preferably includes metal oxide particles from the viewpoint of refractive index adjustment, and thus there is still room for improvement from the viewpoint of the balance in refractive index between the second transparent resin layer and the third transparent resin layer.

In a first embodiment of the present invention, a transfer film which has excellent adhesiveness to a transfer target body and can be used to produce a laminate having a favorable transparent electrode pattern-masking property is provided.

In a second embodiment of the present invention, a transfer film which has excellent adhesiveness to a transfer target body and can be used to produce a laminate having a favorable transparent electrode pattern-masking property is provided. In addition, in both embodiments, an electrode protective film which has excellent adhesiveness to a transfer target body and has a favorable transparent electrode pattern-masking property, a laminate, an electrostatic capacitance-type input device, a method for manufacturing an electrostatic capacitance-type input device, and a method for manufacturing a transfer film are provided.

The first embodiment includes the following aspects.

<1-1> A transfer film comprising on a temporary support: a first transparent layer including at least a polymerizable monomer and a resin; a second transparent layer including at least metal oxide particles and a resin and having an average thickness of less than 200 nm; and a third transparent layer having an average thickness that is smaller than the average thickness of the second transparent layer and having a percentage of metal atoms in all atoms of 2% or less in a 300 μm×300 μm area in the case of being measured from an outermost surface opposite to a surface in contact with the second transparent layer using X-ray photoelectron spectroscopy (hereinafter, referred to as XPS in some cases) sequentially from a temporary support side.

<1-2> The transfer film according to <1-1>, in which the average thickness of the third transparent layer is 10 nm or less.

<1-3> The transfer film according to <1-1> or <1-2>, in which the first transparent layer further contains a polymerization initiator and a compound capable of reacting with an acid by heating.

<1-4> The transfer film according to any one of <1-1> to <1-3>, in which the third transparent layer includes a component included in the first transparent layer.

<1-5> The transfer film according to <1-4>, in which the component included in the first transparent layer is a curing component included in the first transparent layer.

<1-6> The transfer film according to any one of <1-1> to <1-5>, in which the second transparent layer satisfies Expression (1), $$100 \times H2/T2 \leq 80.0 \qquad \text{Expression (1):}$$

(in Expression (1), H2 represents an absolute value of a difference between a maximum value and a minimum value of a thickness of the second transparent layer, and T2 represents the average thickness of the second transparent layer).

<1-7> The transfer film according to any one of <1-1> to <1-6>, in which the second transparent layer satisfies Expression (2), $$100 \times H2/T2 \leq 40.0 \qquad \text{Expression (2):}$$

(in Expression (2), H2 represents an absolute value of a difference between a maximum value and a minimum value of a thickness of the second transparent layer, and T2 represents the average thickness of the second transparent layer).

<1-8> The transfer film according to any one of <1-1> to <1-7>, in which the second transparent layer satisfies Expression (3), $$100 \times H2/T2 \leq 20.0 \qquad \text{Expression (3):}$$

(in Expression (3), H2 represents an absolute value of a difference between a maximum value and a minimum value of a thickness of the second transparent layer, and T2 represents the average thickness of the second transparent layer).

<1-9> The transfer film according to any one of <1-1> to <1-8>, in which the second transparent layer includes at least two kinds of resins.

<1-10> The transfer film according to <1-9>, in which at least one kind of the at least two kinds of resins is a resin having a weight-average molecular weight of 1,000 or more and 20,000 or less.

<1-11> The transfer film according to <1-9> or <1-10>, in which at least one kind of the at least two kinds of resins is a resin having an acid value of 150 mgKOH/g or more.

<1-12> The transfer film according to any one of <1-1> to <1-11>, in which the resin included in the second transparent layer includes a copolymer having a (meth)acrylic acid-derived structural unit and a styrene-derived structural unit.

<1-13> The transfer film according to any one of <1-1> to <1-12>, in which the resin included in the second transparent layer includes a copolymer having a (meth)acrylic acid-derived structural unit and a styrene-derived structural unit and having an acid value of 150 mgKOH/g or more.

<1-14> The transfer film according to any one of <1-1> to <1-13>, in which the resin included in the second transparent layer includes a copolymer having a (meth)acrylic acid-derived structural unit, a styrene-derived structural unit, and a (meth)acrylic acid ester-derived structural unit having an ethyleneoxy chain.

<1-15> The transfer film according to any one of <1-1> to <1-14>, in which the second transparent layer further includes solvents, and a viscosity at 20° C. of a solvent having a highest viscosity among the solvents is 3.0 mPa·s or more.

<1-16> The transfer film according to any one of <1-1> to <1-15>, in which the metal oxide particles are at least one kind selected from zirconium oxide particles and titanium oxide particles.

<1-17> An electrode protective film obtained by removing the temporary support from the transfer film according to any one of <1-1> to <1-16>.

<1-18> A laminate comprising on a substrate including an electrode of an electrostatic capacitance-type input device: the third transparent layer; the second transparent layer; and the first transparent layer of the transfer film according to any one of <1-1> to <1-16> from which the temporary support has been removed in this order from a substrate side.

<1-19> A laminate sequentially comprising: a first transparent layer including at least a polymerizable monomer and a resin; a second transparent layer including at least metal oxide particles and a resin and having an average thickness of less than 200 nm; a third transparent layer having an average thickness that is smaller than the average thickness of the second transparent layer and having a percentage of metal atoms in all atoms of 2% or less in a 300 μm×300 μm area in the case of being measured from an outermost surface opposite to a surface in contact with the second transparent layer using XPS; and a substrate including an electrode of an electrostatic capacitance-type input device.

<1-20> The laminate according to <1-19>, in which the third transparent layer includes a component included in the first transparent layer.

<1-21> An electrostatic capacitance-type input device comprising: the electrode protective film according to <1-17> or the laminate according to any one of <1-18> to <1-20>.

<1-22> A method for manufacturing a transfer film comprising in this order: a step of forming a first transparent layer by applying a coating fluid including an organic solvent, a polymerizable monomer, and a resin onto a temporary support; and a step of forming a second transparent layer having an average thickness of less than 200 nm by applying a coating fluid including water, metal oxide particles, and a resin onto the first transparent layer before curing of the first transparent layer, in which a transfer film having a third transparent layer having an average thickness that is smaller than the average thickness of the second transparent layer and having a percentage of metal atoms in all atoms of 2% or less in a 300 μm×300 μm area in the case of being measured from an outermost surface opposite to a surface in contact with the second transparent layer using XPS disposed on the second transparent layer is manufactured.

<1-23> A method for manufacturing an electrostatic capacitance touch panel comprising in this order: a step of attaching a surface of the third transparent layer of the transfer film according to any one of <1-1> to <1-16> to a substrate including an electrode of an electrostatic capacitance-type input device; a step of exposing the substrate to which the transfer film has been attached; a step of developing the exposed transfer film; and a step of peeling the temporary support between the step of attaching the transfer film and the exposure step and/or between the exposure step and the development step.

The second embodiment includes the following aspects.

<2-1> A transfer film comprising on a temporary support: a first transparent layer including at least a polymerizable monomer and a resin; a second transparent layer including at least metal oxide particles and a resin and having an average thickness of less than 200 nm; and a third transparent layer having an average thickness that is smaller than the average thickness of the second transparent layer and having a percentage of metal atoms in all atoms in the layer which is smaller than a percentage of metal atoms in all atoms in the second transparent layer sequentially from a temporary support side.

<2-2> The transfer film according to <2-1>, in which the average thickness of the third transparent layer is 10 nm or less.

<2-3> The transfer film according to <2-1> or <2-2>, in which the first transparent layer further contains a polymerization initiator and a compound capable of reacting with an acid by heating.

<2-4> The transfer film according to any one of <2-1> to <2-3>, in which the third transparent layer includes a compound included in the first transparent layer.

<2-5> The transfer film according to <2-4>, in which the compound is a curing component included in the first transparent layer.

<2-6> The transfer film according to any one of <2-1> to <2-5>, in which the second transparent layer satisfies Expression (1), $$100 \times H2/T2 \leq 80.0 \quad \text{Expression (1):}$$

(in Expression (1), H2 represents an absolute value of a difference between a maximum value and a minimum value of a thickness of the second transparent layer, and T2 represents the average thickness of the second transparent layer).

<2-7> The transfer film according to any one of <2-1> to <2-6>, in which the second transparent layer satisfies Expression (2), $$100 \times H2/T2 \leq 40.0 \quad \text{Expression (2):}$$

(in Expression (2), H2 represents an absolute value of a difference between a maximum value and a minimum value of a thickness of the second transparent layer, and T2 represents the average thickness of the second transparent layer).

<2-8> The transfer film according to any one of <2-1> to <2-7>, in which the second transparent layer satisfies Expression (3), $$100 \times H2/T2 \leq 20.0 \quad \text{Expression (3):}$$

(in Expression (3), H2 represents an absolute value of a difference between a maximum value and a minimum value of a thickness of the second transparent layer, and T2 represents the average thickness of the second transparent layer).

<2-9> The transfer film according to any one of <2-1> to <2-8>, in which the second transparent layer includes at least two kinds of resins.

<2-10> The transfer film according to <2-9>, in which at least one kind of the at least two kinds of resins is a resin having a weight-average molecular weight of 1,000 or more and 20,000 or less.

<2-11> The transfer film according to <2-9> or <2-10>, in which at least one kind of the at least two kinds of resins is a resin having an acid value of 150 mgKOH/g or more.

<2-12> The transfer film according to any one of <2-1> to <2-11>, in which the resin included in the second transparent layer includes a copolymer having a (meth)acrylic acid-derived structural unit and a styrene-derived structural unit.

<2-13> The transfer film according to any one of <2-1> to <2-11>, in which the resin included in the second transparent layer includes a copolymer having a (meth)acrylic acid-derived structural unit and a styrene-derived structural unit and having an acid value of 150 mgKOH/g or more.

<2-14> The transfer film according to any one of <2-1> to <2-13>, in which the resin included in the second transparent layer includes a copolymer having a (meth)acrylic acid-derived structural unit, a styrene-derived structural unit, and a (meth)acrylic acid ester-derived structural unit having an ethyleneoxy chain.

<2-15> The transfer film according to any one of <2-1> to <2-14>, in which the second transparent layer further includes solvents, and a viscosity at 20° C. of a solvent having a highest viscosity among the solvents is 3.0 mPa·s or more.

<2-16> The transfer film according to any one of <2-1> to <2-15>, in which the metal oxide particles are at least one kind selected from zirconium oxide particles and titanium oxide particles.

<2-17> An electrode protective film obtained by removing the temporary support from the transfer film according to any one of <2-1> to <2-16>.

<2-18> A laminate comprising on a substrate including an electrode (preferably an electrode of an electrostatic capacitance-type input device): the third transparent layer; the second transparent layer; and the first transparent layer of the transfer film according to any one of <2-1> to <2-16> from which the temporary support has been removed in this order from a substrate side.

<2-19> A laminate sequentially comprising: a first transparent layer including at least a polymerizable monomer and a resin; a second transparent layer including at least metal oxide particles and a resin and having an average thickness of less than 200 nm; a third transparent layer having an average thickness that is smaller than the average thickness of the second transparent layer and having a percentage of metal atoms in all atoms in the layer which is smaller than a percentage of metal atoms in all atoms in the second transparent layer; and a substrate including an electrode (preferably an electrode of an electrostatic capacitance-type input device).

<2-20> The laminate according to <2-19>, in which the third transparent layer includes a compound included in the first transparent layer.

<2-21> A method for manufacturing a transfer film comprising in this order: a step of forming a first transparent layer by applying a coating fluid including an organic solvent, a polymerizable monomer, and a resin onto a temporary support; and a step of forming a second transparent layer having an average thickness of 200 nm or less by applying a coating fluid including water, metal oxide particles, and a resin onto the first transparent layer before curing of the first transparent layer, in which a transfer film having a third transparent layer having an average thickness that is smaller than the average thickness of the second transparent layer and having a percentage of metal atoms in all atoms in the layer which is smaller than a percentage of metal atoms in all atoms in the second transparent layer disposed on the second transparent layer is manufactured.

<2-22> An electrostatic capacitance-type input device comprising: the electrode protective film according to <2-17> or the laminate according to any one of <2-18> to <2-20>.

<2-23> An electrostatic capacitance-type input device comprising in this order: a first resin layer including a cured substance of a polymerizable monomer and a resin; a second resin layer including metal oxide particles and a resin and having an average thickness of less than 200 nm; a third resin layer having an average thickness that is smaller than the average thickness of the second resin layer and having a percentage of metal atoms in all atoms in the layer which is smaller than a percentage of metal atoms in all atoms in the second resin layer; and a substrate including an electrode.

<2-24> The electrostatic capacitance-type input device according to <2-23> which is a touch panel.

<2-25> A method for manufacturing an electrostatic capacitance-type input device (preferably an electrostatic capacitance touch panel) comprising in this order: a step of bringing a surface of the third transparent layer of the transfer film according to any one of <2-1> to <2-16> into contact with a substrate including an electrode (preferably an electrode of an electrostatic capacitance-type input device) and attaching the transfer film to the substrate; a step of exposing the substrate to which the transfer film has been attached; a step of developing the exposed transfer film; and a step of peeling the temporary support between the step of attaching the transfer film and the exposure step and/or between the exposure step and the development step.

According to the first embodiment of the present invention, a transfer film which has excellent adhesiveness to a transfer target body and can be used to produce a laminate having a favorable transparent electrode pattern-masking property, an electrode protective film, a laminate, an electrostatic capacitance-type input device, and a method for manufacturing a transfer film are provided.

According to the second embodiment of the present invention, a transfer film which has excellent adhesiveness to a transfer target body and can be used to produce a laminate having a favorable transparent electrode pattern-masking property is provided. In addition, according to the second embodiment of the present invention, an electrode protective film which has excellent adhesiveness to a transfer target body and has a favorable transparent electrode pattern-masking property, a laminate, an electrostatic capacitance-type input device, a method for manufacturing an electrostatic capacitance-type input device, and a method for manufacturing a transfer film are provided.

BRIEF DESCRIPTION OF THE DRAWINGS

FIG. 1 is a schematic cross-sectional view illustrating an example of a constitution of a transfer film.

DESCRIPTION OF THE PREFERRED EMBODIMENTS

Hereinafter, a transfer film, an electrode protective film, a laminate, an electrostatic capacitance-type input device, a method for manufacturing an electrostatic capacitance-type input device, and a method for manufacturing a transfer film of the present disclosure will be described in detail.

Individual constituent requirements in the present disclosure which will be described below are based on typical embodiments or specific examples of the present invention, but the present invention is not limited to embodiments, specific examples, and the like described below.

In the present specification, numerical ranges expressed using "to" include numerical values before and after "to" as the lower limit value and the upper limit value. In numerical ranges described stepwise in the present disclosure, the upper limit value or the lower limit value described in a certain numerical range may be substituted into the upper limit value or the lower limit value of another numerical range described stepwise. In addition, in numerical ranges described in the present disclosure, the upper limit value or the lower limit value described in a certain numerical range may be substituted into a value described in examples.

In addition, in a case in which only one of numerical values described before and after "to" has a unit, all of the values in the numerical range have the same unit.

The expression "(meth)acryl" is used to refer to "acryl" and/or "methacryl", and the expression "(meth)acrylate" is used to refer to "acrylate" and/or "methacrylate".

In the present specification, unless particularly otherwise described, "room temperature" refers to 25° C.

In addition, in the present specification, unless particularly otherwise described, the content ratio between individual structural units of a polymer is the molar ratio.

In the present specification, unless particularly otherwise described, a refractive index refers to a value measured at a wavelength of 550 nm using ellipsometry.

[Transfer Film]

A transfer film of a first embodiment is a transfer film having on a temporary support, a first transparent layer including at least a polymerizable monomer and a resin, a second transparent layer including at least metal oxide particles and a resin and having an average thickness of less than 200 nm, and a third transparent layer having an average thickness that is smaller than the average thickness of the second transparent layer and having a percentage of metal atoms in all atoms of 2% or less in a 300 μm×300 μm area in the case of being measured from an outermost surface opposite to a surface in contact with the second transparent layer using XPS sequentially from a temporary support side.

Due to the above-described constitution, the transfer film of the present embodiment provides a laminate having excellent adhesiveness to a transfer target body and having a favorable transparent electrode pattern-masking property.

A transfer film of a second embodiment is a transfer film having, on a temporary support, a first transparent layer including at least a polymerizable monomer and a resin, a second transparent layer including at least metal oxide particles and a resin and having an average thickness of less than 200 nm, and a third transparent layer having an average thickness that is smaller than the average thickness of the second transparent layer and having a percentage of metal atoms in all of the atoms in the layer which is smaller than a percentage of metal atoms in all of the atoms in the second transparent layer sequentially from a temporary support side.

Due to the above-described constitution, the transfer film of the present embodiment provides a laminate having excellent adhesiveness to a transfer target body and having a favorable transparent electrode pattern-masking property.

In the present specification, the expression "being transparent" means that the transmittance of visible light having a wavelength of 400 nm to 700 nm is 80% or more. Therefore, the expression "transparent layer" refers to layers having a transmittance of visible light having a wavelength of 400 nm to 700 nm of 80% or more. The transmittance of visible light of the "transparent layer" is preferably 90% or more.

In addition, the light transmittances of the transfer film and the respective transparent layers of the transfer film are values measured using a spectrophotometer and can be measured using, for example, a spectrophotometer U-3310 manufactured by Hitachi, Ltd.

In the second embodiment, the third transparent layer is preferably a layer in which the percentage of metal atoms in all of the atoms in a 300 μm×300 μm area is 2% or less in the case of being measured from the outermost surface opposite to a surface in contact with the second transparent layer using X-ray photoelectron spectroscopy (XPS) from the viewpoint of further enhancing the adhesiveness to transfer target bodies.

The action mechanism in the first embodiment and the second embodiment of the present invention is still not clear, but is assumed as described below.

The second transparent layer of the transfer film of the first embodiment or the second embodiment of the present invention includes at least metal oxide particles and a resin and thus has a high refractive index and has an average thickness of less than 200 nm, and thus the transparent electrode pattern-masking property becomes favorable.

Furthermore, in a case in which the second transparent layer including metal oxide particles and a resin and having an average thickness of less than 200 nm is laminated on the first transparent layer including a polymerizable monomer and a resin, a low-molecular-weight component such as the polymerizable monomer included in the non-cured first resin layer passes through the second transparent layer including metal oxide particles and emerges on the surface of the second transparent layer, that is, the surface of the second transparent layer opposite to the side on which the temporary support is disposed, and the third transparent layer having a smaller thickness than the second transparent layer is formed on the second transparent layer.

In the case of forming the second transparent layer, a coating fluid for forming the second transparent layer is applied and dried on the first transparent layer that is not yet cured. During the formation of the second transparent layer by means of coating and drying, metal oxide particles that are included in the coating fluid for forming the second transparent layer barely move onto the second transparent layer while the low-molecular-weight component included in the first transparent layer passes through the second transparent layer and emerges on the surface of the second transparent layer. Therefore, the third transparent layer that is formed on the surface of the second transparent layer includes no metal oxide particles or an extremely small amount of metal oxide particles in the case of including metal oxide particles. That is, in the third transparent layer of the first embodiment, the percentage of metal atoms in all of the atoms in a 300 μm×300 μm area becomes 2% or less in the case of being measured from the outermost surface opposite to the surface in contact with the second transparent layer using XPS, and, in the second embodiment, the percentage of metal atoms in all of the atoms in the third transparent layer becomes smaller than the percentage of metal atoms in all of the atoms in the second transparent layer.

In the case of adhering the transfer film to a transfer target body, the transfer target body does not include any metal atoms or the third transparent layer having an extremely small content rate of metal atoms is in contact with the transfer target body, and thus the adhesiveness to the transfer target body becomes favorable. Furthermore, in a case in which the thickness of the second transparent layer is not even in the plane, there are cases in which defects attributed to metal oxide particles are generated at the time of compressing the second transparent layer including the metal oxide particles and the transfer target body during the transfer of the transfer film in a portion in which the thickness of the second transparent layer is thin. In a case in which the thickness of the second transparent layer is even in the plane, the generation of the above-described defects attributed to metal oxide particles is suppressed.

Meanwhile, the defect refers to a defect caused by the generation of cracks.

In addition, in a case in which the thickness of the third transparent layer is thin, there is no concern that the favourable transparent electrode pattern-masking property of the second transparent layer which is attributed to the refractive index of the second transparent layer may be adversely affected.

Therefore, it is assumed that the transfer film of the first embodiment and the transfer film of the second embodiment are capable of satisfying both the adhesiveness to transfer target bodies and the transparent electrode pattern-masking property attributed to the presence of a low-refractive index layer.

Meanwhile, the present invention is not limited to the assumed mechanism described above.

An example of the transfer film of the first embodiment or the second embodiment will be described with reference to FIG. 1.

FIG. 1 is a schematic cross-sectional view illustrating an aspect of the transfer film of the first embodiment or the second embodiment of the present invention. In a transfer film 10 illustrated in FIG. 1, a temporary support 12, a first transparent layer 14, a second transparent layer 16, and a third transparent layer 18 are disposed sequentially from a temporary support 12 side.

Hereinafter, the transfer film of the first embodiment and the transfer film of the second embodiment will be described in detail.

<Temporary Support>

In the first embodiment and the second embodiment, the temporary support that is used in the transfer film is not particularly limited as long as the temporary support has a necessary strength and a necessary flexibility. From the viewpoint of the handleability, the shape is preferably a film shape.

(Thickness)

The thickness of the temporary support is not particularly limited, and it is possible to randomly use a film having a thickness in a range of 5 µm to 200 µm. The thickness is preferably in a range of 10 µm to 150 µm from the viewpoint of ease of handling, versatility, and the like.

(Material)

The material of the temporary support is not particularly limited as long as the material has a necessary strength and a necessary flexibility in the case of being used to form the film. The material is preferably a resin film from the viewpoint of the formability and the cost.

As the film that is used as the temporary support, flexible films that do not significantly deform, contract, or extend under pressurization or under pressurization and heating are preferred.

More specific examples of the temporary support include polyethylene terephthalate (PET) films, triacetylcellulose (TAC) films, polystyrene (PS) films, polycarbonate (PC) films, and the like, and, among these, biaxially-stretched polyethylene terephthalate films are preferred.

The appearance of the temporary support is also not particularly limited and can be selected depending on the purpose. That is, the temporary support may be a transparent film or a colored film. Examples of the colored film include resin films containing dyed silicon, an alumina sol, a chromium salt, a zirconium salt, or the like.

The temporary support can be imparted with a conductive property using the method described in JP2005-221726A.

<First Transparent Layer>

In the first embodiment and the second embodiment, the first transparent layer includes at least a polymerizable monomer and a resin. The first transparent layer is a layer that cures by the imparting of energy. The first transparent layer may further include a polymerization initiator and a compound capable of reacting with an acid by heating.

The first transparent layer may be photocurable, thermocurable, or thermocurable and photocurable. Among these, the first transparent layer is preferably a thermocurable and photocurable composition since it is possible to further improve the reliability of films.

The first transparent layer in the transfer films of the first embodiment and the second embodiment is preferably an alkali-soluble resin layer. It is preferable that the first transparent layer can be developed using a weak alkaline aqueous solution.

(Thickness)

The thickness of the first transparent layer in the first embodiment and the second embodiment is not particularly limited and can be appropriately selected according to the purpose.

For example, in a case in which the transfer film of the first embodiment and the transfer film of the second embodiment are used to form an electrode protective film in an electrostatic capacitance-type input device, the thickness of the first transparent layer can be set to 1 µm to 20 µm from the viewpoint of the transparency. The thickness of the first transparent layer is preferably in a range of 2 µm to 15 µm, more preferably in a range of 3 µm to 12 µm, and still more preferably in a range of 6 µm to 12 µm.

(Refractive Index)

The refractive index of the first transparent layer is preferably 1.5 to 1.53, more preferably 1.5 to 1.52, and particularly preferably 1.51 to 1.52.

A method for controlling the refractive index of the first transparent layer is not particularly limited. Examples thereof include a method in which a transparent resin layer having a desired refractive index is singly used, a method in which a transparent resin layer to which particles such as metal particles, or metal oxide particles are added is used, a method in which a complex of a metal salt and a macromolecule is used, and the like.

(Composition)

The first transparent layer is formed of a negative-type material including a polymerizable monomer. Therefore, the first transparent layer is favorable in terms of the strength and the reliability.

Hereinafter, components that the first transparent layer may include will be described.

—Resin—

The first transparent layer in the transfer film of the first embodiment and the transfer film of the second embodiment contains at least one kind of resin. The resin that is included in the first transparent layer is capable of functioning as a binder polymer.

The resin that is included in the first transparent layer is preferably an alkali-soluble resin.

The alkali-soluble resin is preferably, for example, a resin having an acid value of 60 mgKOH/g or more from the viewpoint of the developability. In addition, a resin having a carboxyl group is preferred since the resin reacts with a crosslinking component and thus forms a thermal cross-link and easily forms a strong film.

From the viewpoint of the developability and the transparency, the alkali-soluble resin is preferably an acrylic resin. The acrylic resin refers to a resin having a structural unit derived from at least one kind of (meth)acrylic acid and a (meth)acrylic acid ester.

The acid value of the alkali-soluble resin is not particularly limited, but a carboxyl group-containing acrylic resin having an acid value of 60 mgKOH/g or more is preferred. In a case in which the resin includes a carboxyl group, it is possible to increase the three-dimensional crosslinking density during the formation of a thermal cross-link by adding a blocked isocyanate. In addition, it is assumed that the carboxyl group in the carboxyl group-containing acrylic resin is dehydrated and hydrophobilized and thus contributes to the improvement of the heat and moisture resistance.

(Carboxyl Group-Containing Acrylic Resin Having Acid Value of 60 mgKOH/g or More)

The carboxyl group-containing acrylic resin having an acid value of 60 mgKOH/g or more which is included in the first transparent layer (hereinafter, referred to as the specific binder in some cases) is not particularly limited as long as the carboxyl group-containing acrylic resin satisfies the condition of the acid value and can be appropriately selected and used from well-known resins.

For example, it is possible to preferably use binder polymers that are carboxyl group-containing acrylic resins having an acid value of 60 mgKOH/g or more among the polymers described in Paragraph 0025 of JP2011-95716A and carboxyl group-containing acrylic resins having an acid value of 60 mgKOH/g or more among the polymers described in Paragraphs 0033 to 0052 of JP2010-237589A as the specific binder in the first embodiment and the second embodiment.

In the specific binder, a preferred range of the copolymerization ratio of a monomer having a carboxyl group is in a range of 5% by mass to 50% by mass, more preferably 5% by mass to 40% by mass, and still more preferably 20% by mass to 30% by mass with respect to 100% by mass of the polymer.

The specific binder may have a reactive group, and examples of means for introducing a reactive group into the specific binder include methods in which an epoxy compound, a blocked isocyanate, an isocyanate, a vinylsulfone compound, an aldehyde compound, a methylol compound, a carboxylic acid anhydride, or the like is reacted with a hydroxyl group, a carboxyl group, a primary or secondary amino group, an acetoacetyl group, a sulfonic acid group, or the like.

The specific binder is preferably Compound A illustrated below. Meanwhile, the content ratio between individual structural units illustrated below can be appropriately changed depending on the purpose.

Compound A

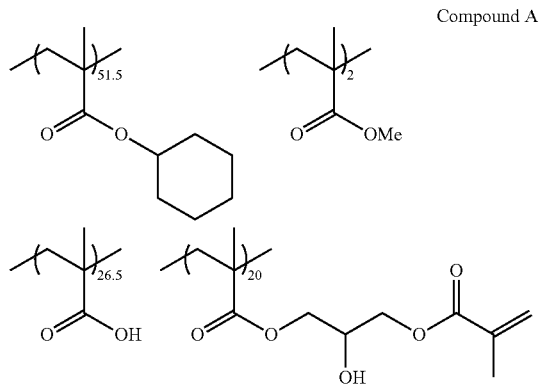

The acid value of the specific binder is, specifically, preferably 60 mgKOH/g to 200 mgKOH/g, more preferably 60 mgKOH/g to 150 mgKOH/g, and still more preferably 60 mgKOH/g to 110 mgKOH/g.

In the present specification, the acid value of the resin refers to a value measured using a titration method regulated in JIS K0070 (1992).

In a case in which both the first transparent layer and the second transparent layer contain the acrylic resin, it is possible to enhance the interlayer adhesiveness between the first transparent layer and the second transparent layer.

The weight-average molecular weight of the specific binder is preferably 10,000 or more and more preferably 20,000 to 100,000.

The first transparent layer may also include an additional resin other than the carboxyl group-containing acrylic resin having an acid value of 60 mgKOH/g or more which is the preferred specific binder described above (hereinafter, an additional resin that can be included in the first transparent layer will be referred to as the "additional resin (1)" in some cases).

As the additional resin (1), a random film-forming resin can be appropriately selected and used depending on the purpose. From the viewpoint of using the transfer film as an electrode protective film in an electrostatic capacitance-type input device, a film having a favorable surface hardness and a favorable heat resistance is preferred, an alkali-soluble resin is more preferred, and, among alkali-soluble resins, well-known photosensitive siloxane resin materials and the like can be preferably exemplified.

From the viewpoint of the handleability of films to be cured and the hardness of cured films, the content of the resin is preferably in a range of 20% by mass to 80% by mass and more preferably in a range of 40% by mass to 60% by mass of the total amount of the solid contents of the first transparent layer. In a case in which the content of the resin is 80% by mass or less, the amount of monomers does not excessively decrease, the crosslinking density of cured films is favorably maintained, the hardness becomes excellent. In addition, in a case in which the content of the resin is 20% by mass or more, films to be cured do not become excessively flexible, and such a content is advantageous in terms of the handleability in the middle.

—Polymerizable Monomer—

The first transparent layer in the first embodiment and the second embodiment includes a polymerizable monomer. As the polymerizable monomer, the first transparent layer preferably includes a polymerizable monomer having an ethylenic unsaturated group and more preferably includes a photopolymerizable compound having an ethylenic unsaturated group. The polymerizable monomer preferably has at least one ethylenic unsaturated group as a photopolymerizable group and may have a cationic polymerizable group such as an epoxy group in addition to the ethylenic unsaturated group. As the polymerizable monomer included in the first transparent layer, a compound having a (meth)acryloyl group is preferred.

As the polymerizable monomer, the first transparent layer preferably includes a compound having two ethylenic unsaturated groups and a compound having at least three ethylenic unsaturated groups and more preferably includes a compound having two (meth)acryloyl groups and a compound having at least three (meth)acryloyl groups.

In addition, at least one kind of polymerizable monomer included in the first transparent layer preferably contains a carboxyl group since the carboxyl group in the specific binder and the carboxyl group in the polymerizable monomer form a carboxylic acid anhydride, whereby the heat and moisture resistance can be enhanced.

The polymerizable monomer containing a carboxyl group is not particularly limited, and commercially available compounds can be used. Preferred examples of the commercially available products include ARONIX TO-2349 (Toagosei Co., Ltd.), ARONIX M-520 (Toagosei Co., Ltd.), ARONIX M-510 (Toagosei Co., Ltd.), and the like. In a case in which the polymerizable monomer having a carboxyl group is included, the content of the polymerizable monomer used is preferably in a range of 1% to 50% by mass, more preferably in a range of 1% to 30% by mass, and still more preferably in a range of 5% to 15% by mass of all of the polymerizable monomers included in the first transparent layer.

The polymerizable monomer included in the first transparent layer preferably includes an urethane (meth)acrylate compound.

In a case in which the urethane (meth)acrylate compound is included, the content thereof is preferably 10% by mass or more and more preferably 20% by mass or more of all of the polymerizable monomers included in the first transparent layer. In the urethane (meth)acrylate compound, the number of functional groups in a photopolymerizable group, that is, the number of (meth)acryloyl groups is preferably three or more and more preferably four or more.

Photopolymerizable monomers having a difunctional ethylenic unsaturated group are not particularly limited as long as the monomers are a compound having two ethylenic unsaturated groups in the molecule, and commercially available (meth)acrylate compounds can be used. Preferred examples of the commercially available products include tricyclodecane dimethanol diacrylate (A-DCP, Shin-Nakamura Chemical Co., Ltd.), tricyclodecane dimethanol dimethacrylate (DCP, Shin-Nakamura Chemical Co., Ltd.), 1,9-nonanediol diacrylate (A-NOD-N, Shin-Nakamura Chemical Co., Ltd.), 1,6-hexanediol diacrylate (A-HD-N, Shin-Nakamura Chemical Co., Ltd.), and the like.

Photopolymerizable monomers having a tri- or higher-functional ethylenic unsaturated group are not particularly limited as long as the monomers have three or more ethylenic unsaturated groups in the molecule, and, for example, it is possible to use (meth)acrylate compounds having a skeleton of dipentaerythritol (triketra/penta/hexa)acrylate, pentaerythritol (tri/tetra)acrylate, trimethylolpropane triacrylate, ditrimethylolpropane tetraacrylate, isocyanurate acrylate, glycerine triacrylate, or the like. Among these, compounds having a long span length between (meth)acrylates are preferred, and specific preferred examples thereof include caprolactone-modified compounds (Nippon Kayaku Co., Ltd.: KAYARAD DPCA, Shin-Nakamura Chemical Co., Ltd.: A-9300-1CL, and the like), alkylene oxide-modified compounds (Nippon Kayaku Co., Ltd.: KAYARAD RP-1040, Shin-Nakamura Chemical Co., Ltd.: ATM-35E and A-9300, Daicel-Allnex Ltd: EBECRYL 135, and the like), ethoxylated glycerine triacrylate (Shin-Nakamura Chemical Co., Ltd.: A-GLY-9E, and the like), and the like of the above-described (meth)acrylate compounds having a skeleton of dipentaerythritol (tri/tetra/penta/hexa)acrylate, pentaerythritol (tri/tetra)acrylate, trimethylolpropane triacrylate, ditrimethylolpropane tetraacrylate (Shin-Nakamura Chemical Co., Ltd.: AD-TMP and the like), and isocyanurate acrylate. In addition, it is also preferable to use tri- or higher-functional urethane (meth)acrylates. Preferred examples of the tri- or higher-functional urethane (meth)acrylates include 8UX-015A: Taisei Fine Chemical Co., Ltd., UA-32P: Shin-Nakamura Chemical Co., Ltd., UA-1100H: Shin-Nakamura Chemical Co., Ltd., and the like.

The weight-average molecular weight of the polymerizable monomer included in the first transparent layer is preferably 200 to 3,000, more preferably 250 to 2,600, and particularly preferably 280 to 2,200.

Only one kind of the polymerizable monomer may be used or two or more kinds of the polymerizable monomers may be used. Two or more kinds of the polymerizable monomers are preferably used from the viewpoint of the capability of controlling the properties of films in the first transparent layer.

Among them, as the polymerizable monomer that the first transparent layer contains in the transfer film of the first embodiment and the transfer film of the second embodiment, a combination of a tri- or higher-functional polymerizable monomer and a di- or higher-functional polymerizable monomer is preferably used from the viewpoint of improving the film properties of the transferred first transparent layer after exposure.

In a case in which a difunctional polymerizable monomer is used, the content of the difunctional polymerizable monomer used is preferably in a range of 10% by mass to 90% by mass, more preferably in a range of 20% by mass to 85% by mass, and still more preferably in a range of 30% by mass to 80% by mass of all of the polymerizable monomers that are included in the first transparent layer.

In a case in which a tri- or higher-functional polymerizable monomer is used, the content of the difunctional polymerizable monomer used is preferably in a range of 10% by mass to 90% by mass, more preferably in a range of 15% by mass to 80% by mass, and still more preferably in a range of 20% by mass to 70% by mass of all of the polymerizable monomers that are included in the first transparent layer.

In the transfer film of the first embodiment and the transfer film of the second embodiment, in a case in which the first transparent layer and the second transparent layer are in direct contact with each other, the molecular weight of the polymerizable monomer having the minimum molecular weight among all of the polymerizable monomers that are included in the first transparent layer is preferably 250 or more, more preferably 280 or more, and particularly preferably 300 or more since the low-molecular-weight component included in the first transparent layer easily emerges on the surface of the laminated second transparent layer through the second transparent layer.

In the transfer film of the first embodiment and the transfer film of the second embodiment, in a case in which the first transparent layer and the second transparent layer are in direct contact with each other, the proportion of the content of polymerizable monomers having a molecular weight of 300 or less in the content of the polymerizable monomers that are included in the first transparent layer is preferably 30% by mass or less, more preferably 25% by mass or less, and particularly preferably 20% by mass or less since the low-molecular-weight component included in the first transparent layer easily emerges on the surface of the laminated second transparent layer in the thickness direction of the second transparent layer.

In addition, the mass ratio of the polymerizable monomers to the resin included in the first transparent layer is preferably 0.1 to 0.9, more preferably 0.2 to 0.9, and particularly preferably 0.3 to 0.7.

Furthermore, the first transparent layer may contain a variety of components according to the purpose in addition to the resin and the polymerizable monomers.

Examples of random components include a polymerization initiator, a compound capable of reacting with an acid by heating, and the like.

—Polymerization Initiator—

The first transparent layer of the first embodiment and the second embodiment preferably includes a polymerization initiator and more preferably includes a photopolymerization initiator.

In a case in which the first transparent layer includes a polymerization initiator in addition to the resin and the polymerizable monomer, it is possible to facilitate the formation of patterns of the first transparent layer.

Examples of the polymerization initiator include the photopolymerization initiators described in Paragraphs 0031 to 0042 of JP2011-95716A. Preferred examples of the photopolymerization initiator include 1,2-octane dione, 1-[4-(phenylthio)-, 2-(O-benzoyloxime)] (trade name: IRGACURE OXE-01, BASF), additionally, ethanone,1-[9-ethyl-6-(2-methylbenzoyl)-9H-carbazole-3-yl]-, 1-(O-acetyloxime) (trade name: IRGACURE OXE-02, BASF), 2-(dimethylamino)-2-[(4-methylphenyl)methyl]-1-[4-(4-morpholinyl)phenyl]-1-butanone (trade name: IRGACURE 379EG, BASF), 2-methyl-1-(4-methyl thiophenyl)-2-morpholino propan-1-one (trade name: IRGACURE 907, BASF), 2-hydroxy-1-{4-[4-(2-hydroxy-2-methyl-propionyl)-benzyl] phenyl}-2-methyl-propan-1-one (trade name: IRGACURE 127, BASF), 2-benzyl-2-dimethylamino-1-(4-morpholinophenyl)-butanone-1 (trade name: IRGACURE 369, BASF), 2-hydroxy-2-methyl-1-phenyl-erypropan-1-one (trade name: IRGACURE 1173, BASF), 1-hydroxy-cyclohexyl-phenyl-ketone (trade name: IRGACURE 184, BASF), 2,2-dimethoxy-1,2-diphenyl ethan-1-one (trade name: IRGACURE 651, BASF), oxime ester initiator (trade name: Lunar 6, DKSH Japan K.K.), and the like.

In a case in which the first transparent layer includes the polymerization initiator, the content of the polymerization initiator in the solid contents of the first transparent layer is preferably 0.01% by mass or more and more preferably 0.1% by mass or more. In addition, the content is preferably 10% by mass or less and more preferably 5% by mass or less. The content of the polymerization initiator is preferably in the above-described range from the viewpoint of further improving the pattern formability in the transfer film and the adhesiveness to transfer target bodies.

The first transparent layer in the first embodiment and the second embodiment may further include at least one selected from a sensitizer and a polymerization inhibitor in order to adjust the curing sensitivity.

—Sensitizer—

The first transparent layer in the first embodiment and the second embodiment may include a sensitizer.

The sensitizer in the first embodiment and the second embodiment has an action of further improving the sensitivities of a sensitizing dye, the polymerization initiator, and the like that are included in the first transparent layer with respect to active radioactive rays, an action of suppressing the inhibition of polymerization of the polymerizable compound by oxygen, or the like.

Examples of the sensitizer in first embodiment and the second embodiment include amine compounds, for example, the compounds described in M. R. Sander et al., "Journal of Polymer Society" Vol. 10, p. 3,173 (1972), JP1969-20189B (JP-S44-20189B), JP1976-82102A (JP-S51-82102A), JP1977-134692A (JP-S52-134692A), JP1984-138205A (JP-S59-138205A), JP1985-84305A (JP-S60-84305A), JP1987-18537A (JP-S62-18537A), JP1989-33104A (JP-S64-33104A), and Research Disclosure Issue. 33825, and the like. More specific examples thereof include triethanolamine, ethyl p-dimethylamino benzoate, p-formyl dimethylaniline, p-methylthio dimethylaniline, and the like.

Additional examples of the sensitizer in first embodiment and the second embodiment include thiol and sulphide compounds, for example, the thiol compounds of JP1978-702A (JP-S53-702A), JP1980-500806B (JP-S55-500806B), and JP1993-142772A (JP-H5-142772A), the disulphide compound of JP1981-75643A (JP-S56-75643A), and the like. More specific examples thereof include 2-mercapto-benzothiazole, 2-mercaptobenzoxazole, 2-mercaptobenz-imidazole, 2-mercapto-4(3H)-quinazoline, β-mercaptonaphthalene, and the like.

Additional examples of the sensitizer in first embodiment and the second embodiment include amino acid compounds such as N-phenylglycine, the organic metal compounds (for example, tributyltin acetate) described in JP1973-42965B (JP-S48-42965B), the hydrogen donors described in JP1980-34414B (JP-S55-34414B), the sulfur compounds (for example, trithiane) described in JP1994-308727A (JP-H6-308727A), and the like.

In a case in which the first transparent layer in the first embodiment and the second embodiment includes the sensitizer, the content of the sensitizer is preferably in a range of 0.01% by mass to 30% by mass and more preferably in a range of 0.05% by mass to 10% by mass of the total amount of the solid contents of the first transparent layer since the curing rate further improves due to the balance between the polymerization growth rate and the chain transfer.

In a case in which the first transparent layer in the first embodiment and the second embodiment includes the sensitizer, the first transparent layer may include only one kind of sensitizer or two or more kinds of sensitizers.

—Polymerization Inhibitor—

The first transparent layer in the first embodiment and the second embodiment may include a polymerization inhibitor.

The polymerization inhibitor has a function of preventing the undesired polymerization of the polymerizable monomer during the manufacturing or storing of the first transparent layer.

The polymerization inhibitor in the first transparent layer in the first embodiment and the second embodiment is not particularly limited, and well-known polymerization inhibitors can be used depending on the purpose. Examples of the well-known polymerization inhibitors include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), N-nitrosophenylhydroxyamine primary cerium salt, phenothiazine, phenoxazine, and the like.

In a case in which the first transparent layer in the first embodiment and the second embodiment includes the polymerization inhibitor, the amount of the polymerization inhibitor added is preferably 0.01% by mass to 20% by mass of the total amount of the solid contents of the first transparent layer.

In a case in which the first transparent layer in the first embodiment and the second embodiment includes the polymerization inhibitor, the first transparent layer may include only one kind of polymerization inhibitor or two or more kinds of polymerization inhibitors.

—Compound Capable of Reacting with Acid by Heating—

The first transparent layer in the first embodiment and the second embodiment preferably includes a compound capable of reacting with an acid by heating.

The compound capable of reacting with an acid by heating is not particularly limited within the scope of the gist of the present invention. The compound capable of reacting with an acid by heating is preferably a compound having a higher reactivity with an acid after being heated to higher than 25° C. compared with the reactivity at 25° C. The compound capable of reacting with an acid by heating is preferably a compound which has a group capable of reacting with an acid that is temporarily inactivated by a blocking agent and in which blocking agent-derived groups are dissociated at a previously-specified dissociation temperature.

Examples of the compound capable of reacting with an acid by heating include carboxylic acid compounds, alcohol compounds, amine compounds, blocked isocyanates, epoxy compounds, and the like, and the compound capable of reacting with an acid by heating is preferably a blocked isocyanate.

The compound capable of reacting with an acid by heating which has a hydrophilic group in the molecule is not particularly limited, and well-known compounds can be used. A method for preparing the compound capable of reacting with an acid by heating which has a hydrophilic group in the molecule is not particularly limited, and the compound can be prepared by means of, for example, synthesis.

The compound capable of reacting with an acid by heating which has a hydrophilic group in the molecule is preferably a blocked isocyanate having a hydrophilic group in the molecule. The detail of the compound capable of reacting with an acid by heating which has a hydrophilic group in the molecule will be described in the section of a blocked isocyanate below.

The blocked isocyanate refers to "a compound having a structure in which isocyanate groups in an isocyanate are protected (masked) with a blocking agent".

The initial glass transition temperature (Tg) of the blocked isocyanate is preferably −40° C. to 10° C. and more preferably −30° C. to 0° C.

The initial Tg of the blocked isocyanate is advantageously in the above-described range from the viewpoint of the level difference followability during transfer and the suppression of bubble incorporation.

The dissociation temperature of the blocked isocyanate is preferably 100° C. to 160° C. and more preferably 130° C. to 150° C.

In the present specification, the dissociation temperature of the blocked isocyanate refers to "the temperature of an endothermic peak generated by a deprotection reaction of the blocked isocyanate in the case of being measured by means of differential scanning calorimetry (DSC) using a differential scanning calorimeter (manufactured by Seiko Instruments Inc., DSC6200)".

Examples of the blocking agent having a dissociation temperature of 100° C. to 160° C. include pyrazole compounds (3,5-dimethylpyrazole, 3-methylpyrazole, 4-bromo-3,5-dimethylpyrazole, 4-nitro-3,5-dimethylpyrazole, and the like), active methylene compounds (malonic acid diesters (dimethyl malonate, diethyl malonate, di-n-butyl malonate, and di-2-ethylhexyl malonate) and the like), triazole compounds (1,2,4-triazole and the like), oxime compounds (compounds having a structure represented by —C(=N—OH)— in the molecule such as formaldoxime, acetoaldoxime, acetoxime, methyl ethyl ketoxime, and cyclohexanone oxime), and the like. Among these, oxime compounds and pyrazole compounds are preferred from the viewpoint of storage stability, and oxime compounds are particularly preferred.

In the transfer film of the present invention, the blocked isocyanate preferably has an isocyanurate structure from the viewpoint of improving the brittleness of films, improving the adhesive force to transfer target bodies, and the like. The blocked isocyanate having an isocyanurate structure can be prepared by, for example, turning hexamethylene diisocyanate into isocyanurate.

Among blocked isocyanates having an isocyanurate structure, compounds having an oxime structure for which an oxime compound is used as a blocking agent are more preferred than compounds not having an oxime structure since it is easy to set the dissociation temperature in a preferred range and decrease development residues.

In the blocked isocyanate, the number of blocked isocyanate groups per molecule is preferably 1 to 10, more preferably 2 to 6, and particularly preferably 3 or 4.

The number of blocked isocyanate groups in the blocked isocyanate is advantageously in the above-described range from the viewpoint of a low moisture permeability and flexibility after thermal curing.

As the blocked isocyanate, the blocked isocyanate compounds described in Paragraphs [0074] to [0085] of JP2006-208824A may be used, the content of which is incorporated into the present specification.

Specific examples of the blocked isocyanate that is used in the transfer film of the present invention include the following compounds. However, the blocked isocyanate that is used in the first embodiment and the second embodiment is not limited to the following specific examples.

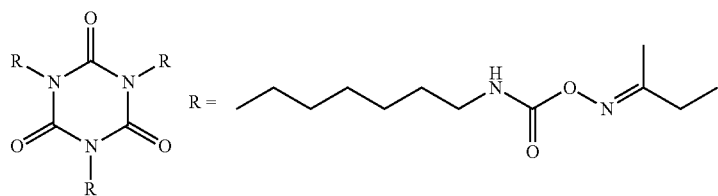

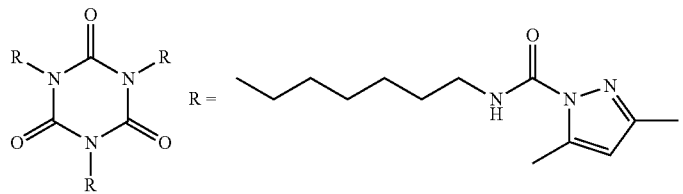

-continued

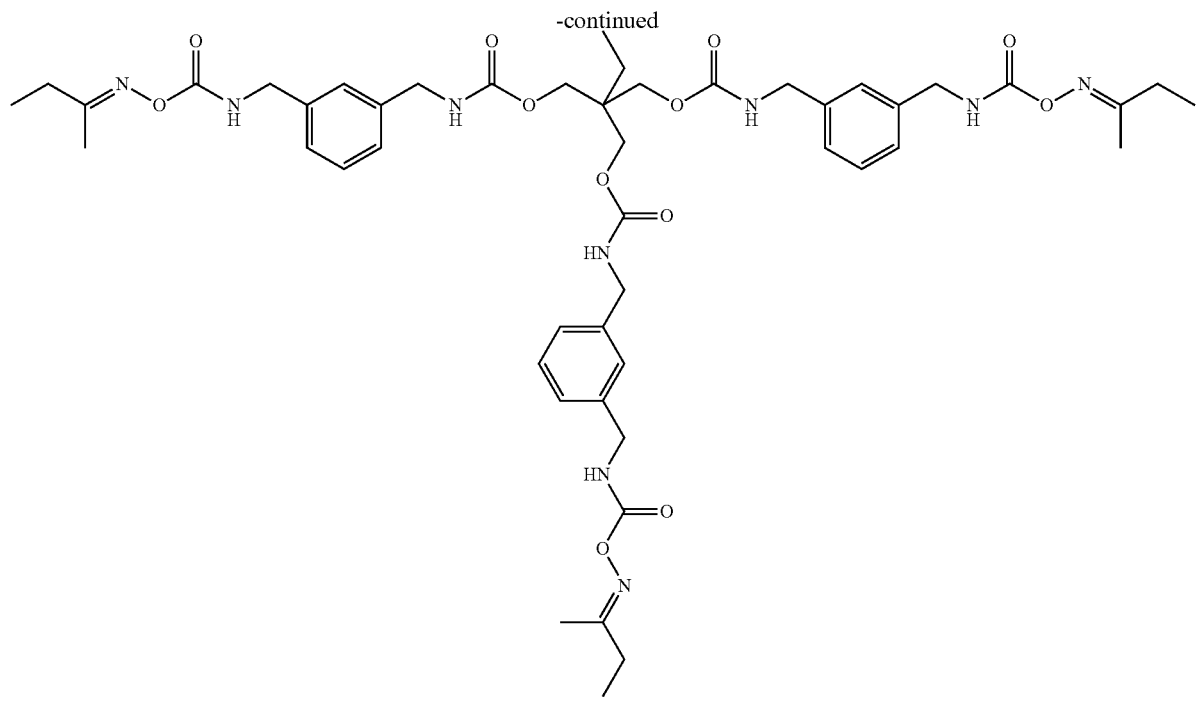

As the blocked isocyanate that is used in the transfer film, it is possible to use commercially available blocked isocyanates. Examples thereof include TAKENATE (registered trademark) B870N (Mitsui Chemicals, Inc.) which is a methyl ethyl ketone oxime blocked body of isophorone diisocyanate, DURANATE (registered trademark) MF-K60B, TPA-B80E, X3071.04 (all Asahi Kasei Corporation) which are hexamethylene diisocyanate-based blocked isocyanate compounds, and the like.

In the blocked isocyanate having a hydrophilic group in the molecule, at least some of isocyanate groups are preferably blocked isocyanates which are aqueous isocyanate groups to which a hydrophilic group is added. The blocked isocyanate having a hydrophilic group in the molecule can be obtained by reacting an isocyanate group in a polyisocyanate and a blocking agent (in some cases, also referred to as an amine-based compound). Examples of the reaction method include a method in which a hydrophilic group is added to some of isocyanate groups in a polyisocyanate by chemical reactions.

The hydrophilic group in the compound capable of reacting with an acid by heating is not particularly limited, and specific examples thereof include nonionic hydrophilic groups, cationic hydrophilic groups, and the like.

The nonionic hydrophilic groups are not particularly limited, and specific examples thereof include compounds obtained by adding ethylene oxide or propylene oxide to hydroxyl groups of alcohols such as methanol, ethanol, butanol, ethylene glycol, or diethylene glycol. That is, the hydrophilic group in the compound capable of reacting with an acid by heating which has the hydrophilic group in the molecule is preferably an ethylene oxide chain or a propylene oxide chain. These compounds have active hydrogen that reacts with isocyanate groups and can be added to isocyanate groups due to the active hydrogen. Among these, monoalcohols that can be dispersed in water in a small amount used are preferred.

In addition, the addition number of ethylene oxide chains or propylene oxide chains is preferably 4 to 30 and more preferably 4 to 20. In a case in which the addition number is 4 or more, there is a tendency that the water dispersibility further improves. In addition, in a case in which the addition number is 30 or less, there is a tendency that the initial Tg of the obtained blocked isocyanate further improves.

Examples of a method for adding the cationic hydrophilic group include a method in which a compound having both the cationic hydrophilic group and active hydrogen that reacts with isocyanate groups is used; a method in which, for example, a functional group such as a glycidyl group is introduced in advance into a polyisocyanate and then, for example, a specific compound such as sulfide or phosphine is reacted with the functional group such as a glycidyl group, and the like, and the former method is easy.

The active hydrogen that reacts with isocyanate groups is not particularly limited, and specific examples thereof include a hydroxyl group, a thiol group, and the like. The compound having both the cationic hydrophilic group and active hydrogen that reacts with isocyanate groups is not particularly limited, and specific examples thereof include dimethylethanolamine, diethylethanolamine, diethanolamine, methyl diethanolamine, and the like. Tertiary amino groups that are introduced using the above-described method can also be quaternized using dimethyl sulfate, diethyl sulfate, or the like.

The equivalent ratio between the isocyanate group to which the hydrophilic group is added and the blocked isocyanate group is preferably 1:99 to 80:20, more preferably 2:98 to 50:50, and particularly preferably 5:95 to 30:70. The equivalent ratio is preferably set in the above-described range from the viewpoint of satisfying both the isocyanate reactivity and the suppression of development residues.

As the blocked isocyanate having a hydrophilic group in the molecule and a method for synthesizing the blocked isocyanate, the aqueous blocked polyisocyanate described in 0010 to 0045 of JP2014-065833A can be preferably used, and the content of the publication is incorporated into the present specification by reference.

In a case in which the blocked isocyanate having a hydrophilic group in the molecule is synthesized, the addition reaction of a hydrophilic group or the blocking reaction of an isocyanate group can be caused in the presence of synthesis solvents. The synthesis solvents in this case are preferably solvents not including an active hydrogen, and examples thereof include dipropylene glycol monomethyl ether, propylene glycol monomethyl ether acetate, methoxy propyl acetate, and the like.

In a case in which the blocked isocyanate having a hydrophilic group in the molecule is synthesized, the amount of the compound having a hydrophilic group added is preferably 1% by mass to 100% by mass and more preferably 2% by mass to 80% by mass of the polyisocyanate.

In a case in which the blocked isocyanate having a hydrophilic group in the molecule is synthesized, the amount of a blocking agent added is preferably 20% by mass to 99% by mass and more preferably 10% by mass to 100% by mass of the polyisocyanate.

The weight-average molecular weight of the blocked isocyanate included in the first transparent layer is preferably 200 to 3,000, more preferably 250 to 2,600, and particularly preferably 280 to 2,200.

The content of the blocked isocyanate is preferably in a range of 1% by mass to 30% by mass and more preferably in a range of 5% by mass to 20% by mass of the total amount of the solid contents of the first transparent layer from the viewpoint of the handleability before a heating step after transfer and the low moisture permeability after the heating step.

—Metal Oxide Particles—

The first transparent layer may include particles (preferably metal oxide particles) for the purpose of adjusting the refractive index or the light transmittance or may not include particles. In order to control the refractive index of the first transparent layer in the above-described range, the first transparent layer may include metal oxide particles at a random proportion depending on the kind of the resin or the polymerizable monomer being used.

The content of the metal oxide particles in the first transparent layer is preferably 0% by mass to 35% by mass, more preferably 0% by mass to 10% by mass, and particularly preferably 0% by mass (the metal oxide particles are not included) of the first transparent layer.

The metal oxide particles have a high transparency and light transmittance. Therefore, in a case in which the first transparent layer contains the metal oxide particles, a first transparent layer having a high refractive index and excellent transparency can be obtained.

The refractive index of the metal oxide particles is preferably higher than the refractive index of a transparent film formed using a coating fluid obtained by removing the metal oxide particles from the coating fluid for forming the first transparent layer.

Meanwhile, the metal of the above-described metal oxide particles may also be a semi-metal such as B, Si, Ge, As, Sb, or Te.

The metal oxide particles which are light-transmissible and have a high refractive index are preferably oxide particles including atoms such as Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, and Te, more preferably titanium oxide, titanium complex oxide, zinc oxide, zirconium oxide, indium/tin oxide, or antimony/tin oxide, still more preferably titanium oxide, titanium complex oxide, or zirconium oxide, particularly preferably titanium oxide or zirconium oxide, and most preferably titanium dioxide. Particularly, titanium dioxide is preferably rutile-type titanium oxide having a high refractive index. The surfaces of these metal oxide particles can also be treated with an organic material in order to impart dispersion stability.

From the viewpoint of the transparency of the first transparent layer, the average primary particle diameter of the metal oxide particles is preferably 1 nm to 200 nm and particularly preferably 3 nm to 80 nm. Here, the average primary particle diameter of particles refers to the arithmetic average of the diameters of 200 arbitrary particles measured using an electronic microscope. In addition, in a case in which the shapes of particles are not spherical, the longest sides are considered as the diameters.

In addition, one kind of the metal oxide particles may be used or two or more kinds of the metal oxide particles can be jointly used.

In addition, examples of other additives included in the first transparent layer include the surface-activating agents described in Paragraph 0017 of JP4502784B and Paragraphs 0060 to 0071 of JP2009-237362A, well-known fluorine-based surface-activating agents, the thermal polymerization inhibitors described in Paragraph 0018 of JP4502784B, and, furthermore, other additives described in Paragraphs 0058 to 0071 of JP2000-310706A. Examples of additives that are preferably used in the first transparent layer include MEGAFACE (registered trademark) F-551 (DIC Corporation) which is a well-known fluorine-based surface-activating agent.

—Formation of First Transparent Layer—

The first transparent layer is formed by applying and drying a solution obtained by dissolving a resin composition for forming the first transparent layer including at least the polymerizable monomer and the resin in a solvent (referred to as the coating fluid for forming the first transparent layer).

<Second Transparent Layer>

Each of the transfer film of the first embodiment and the transfer film of the second embodiment has a second transparent layer, and the second transparent layer includes metal oxide particles and a resin.

The second transparent layer may be photocurable, thermocurable, or thermocurable and photocurable. Among these, the second transparent layer is preferably a thermocurable and photocurable composition since it is possible to easily cure the layer by light irradiation and form a film not only during the formation of the transfer film but also after the transfer of the transfer film to a transfer target body. Furthermore, after the photocuring, it is possible to further improve the reliability of the film by thermally curing the film by heating.

In the transfer film of the first embodiment and the transfer film of the second embodiment, the first transparent layer and the second transparent layer are preferably in contact with each other from the viewpoint of the ease of production, particularly, the convenience of forming the third transparent layer described below.

The second transparent layer preferably satisfies Expression (1).

In Expression (1), H2 represents the absolute value of the difference between the maximum value and the minimum value of the thickness of the second transparent layer, and T2 represents the average thickness of the second transparent layer.

$$100 \times H2/T2 \leq 80.0 \qquad \text{Expression (1):}$$

Furthermore, the second transparent layer preferably satisfies Expression (2) and more preferably satisfies Expression (3).

In Expression (2) and Expression (3), H2 represents the absolute value of the difference between the maximum value and the minimum value of the thickness of the second transparent layer, and T2 represents the average thickness of the second transparent layer. That is, in the thickness of the second transparent layer, in a case in which the variation of the thickness with respect to the average film thickness is small, the formability of the third transparent layer described below becomes more favorable, and the refractive index of the second transparent layer is also in a more preferred range.

$100 \times H2/T2 \leq 40.0$     Expression (2):

$100 \times H2/T2 \leq 20.0$     Expression (3):

The thickness of the second transparent layer can be measured using a transmission electron microscope (TEM). Specifically, a piece of the transfer film is produced using an ultramicrotome, a 5 mm-long region in a cross section of the piece of the transfer film is scanned using TEM, and the thickness of a region including metal oxide particles which is the second transparent layer is measured. Next, the average thickness of the second transparent layer and the difference between the maximum value and the minimum value of the thicknesses are computed in this region.

The arithmetic average of the measurement values of the thickness at 20 places obtained by dividing the above-described region at equal intervals is obtained and considered as the average thickness of each of the layers.

Means for forming the second transparent layer satisfying the conditions of Expression (1) to Expression (3) is not particularly limited, and, for example, as means for obtaining a uniform film thickness, a method of adding at least two kinds of resins to the second transparent layer as described below in detail can be preferably exemplified.

In addition, means for increasing the viscosity of the coating fluid for forming the second transparent layer by adding a high-viscosity solvent to the coating fluid, in detail, a method in which solvents are added to the coating fluid for forming the second transparent layer and a solvent having a viscosity of 3.0 mPa·s or more at 20° C., which is the solvent having a highest viscosity among the solvents, is added is also exemplified.

Meanwhile, a method for measuring the viscosity of the solvent at 20° C. will be described below.

In addition, examples of additional means for obtaining a uniform film thickness include a method a surface-activating agent selected from a fluorine-based surface-activating agent and a silicone-based surface-activating agent which improve the coated surface properties and other surface-activating agents including a hydrophilic portion and a hydrophobic portion are added thereto, a method in which, in the case of applying the coating fluid for forming the second transparent layer onto the first transparent layer, the coating fluid is dried by blowing a highly uniform air in the surface thereto, and the like.

In a case in which the second transparent layer is formed using a negative-type material, the second transparent layer preferably further includes a polymerizable monomer and a polymerization initiator in addition to the metal oxide particles and the resin (preferably an alkali-soluble resin). Furthermore, it is possible to use other additives depending on the necessity.

A method for controlling the refractive index of the second transparent layer is not particularly limited, and examples thereof include a method in which a transparent resin layer having a desired refractive index is singly used, a method in which a transparent resin layer to which particles such as metal particles, or metal oxide particles are added is used, a method in which a complex of a metal salt and a macromolecule is used, and the like.

—Resin—

The second transparent layer includes a resin. The resin may have a function of a binder. The resin is preferably an alkali-soluble resin and more preferably a resin having a constituent unit derived from at least one kind of (meth) acrylic acid or a (meth)acrylic acid ester (a (meth)acrylic resin). The detail of the alkali-soluble resin is the same as that of the alkali-soluble resin in the first transparent layer. Among them, in the second transparent layer, the ammonium salt of a resin having an acidic group can be exemplified as an example of a preferred resin.

A composition for forming the second transparent layer may include the ammonium salt of a monomer having an acidic group as a curing component.

—Ammonium Salt of Resin Having Acidic Group—

The ammonium salt of a resin having an acidic group is not particularly limited, and examples thereof include ammonium salts of a (meth)acrylic resin.

In the case of preparing the composition for forming the second transparent layer, it is preferable to include a step of preparing the coating fluid for forming the second transparent layer including a resin for which the resin having an acidic group is dissolved in an ammonia aqueous solution and at least a part of the acidic group is turned into an ammonium salt.

—Resin Having Acidic Group—

The resin having an acidic group is preferably a resin having a monovalent acidic group (a carboxyl group or the like). The resin included in the second transparent layer is particularly preferably a resin having a carboxyl group.

The resin which can be used in the second transparent layer and is soluble in aqueous solvents (preferably water or solvent mixtures of a lower alcohol having 1 to 3 carbon atoms and water) is not particularly limited within the scope of the gist of the present invention and can be appropriately selected from well-known resins.

The resin having an acidic group which is used in the second transparent layer is preferably an alkali-soluble resin.

The alkali-soluble resin can be appropriately selected from linear organic macromolecular polymers having at least one group that accelerates alkali solubility in a molecule. Examples of the group that accelerates alkali solubility, that is, the acidic group include a carboxyl group, a phosphoric acid group, a sulfonic acid group, and the like, and a carboxyl group is preferred.

Preferred examples of the alkali-soluble resin include copolymers including a structural unit selected from (meth) acrylic acid and styrene in the main chain. More preferred examples of the alkali-soluble resin include resins which are soluble in organic solvents and can be developed using a weak alkaline aqueous solution.

To the manufacturing of the alkali-soluble resin, it is possible to apply, for example, a method in which a well-known radical polymerization method is used. The polymerization conditions such as temperature, pressure, the kind and amount of radical initiators, and the kind of solvents in the case of manufacturing the alkali-soluble resin using a radical polymerization method can be easily set by persons skilled in the art, and the conditions can also be experimentally determined.

The linear organic macromolecular polymer is preferably a resin having a carboxylic acid in a side chain. Examples thereof include poly(meth)acrylates, methacrylic acid copolymers, acrylic acid copolymers, itaconic acid copolymers, crotonic acid copolymers, maleic acid copolymers such as styrene/maleic acid, partially-esterified maleic acid copolymers, and the like as described in JP1984-44615A (JP-S59-44615A), JP1979-34327B (JP-S54-34327B), JP1983-12577B (JP-S58-12577B), JP1979-25957B (JP-S54-25957B), JP1984-53836A (JP-S59-53836A), JP1984-71048A (JP-S59-71048A), JP1971-2121A (JP-S46-2121A), or JP1981-40824B (JP-S56-40824B) and acidic cellulose derivatives having a carboxylic acid in a side chain such as carboxyalkyl cellulose and carboxyalkyl starch, resins obtained by adding an acid anhydride to a resin having a hydroxyl group, and the like, and, furthermore, preferred examples thereof include macromolecular polymers having a reactive functional group such as a (meth)acryloyl group in a side chain.

Among these, particularly, benzyl (meth)acrylate/(meth)acrylic acid copolymers or multicomponent copolymers made of benzyl (meth)acrylate/(meth)acrylic acid/other monomers are preferred.

Additionally, copolymers obtained by copolymerizing 2-hydroxyethylmethacrylate are also exemplified as useful examples.

Additionally, examples thereof include 2-hydroxypropyl (meth)acrylate/polystyrene macromonomer/benzyl methacrylate/methacrylic acid copolymers, 2-hydroxy-3-phenoxypropyl acrylate/polymethyl methacrylate macromonomer/benzyl methacrylate/methacrylic acid copolymers, 2-hydroxyethyl methacrylate/polystyrene macromonomer/methyl methacrylate/methacrylic acid copolymers, 2-hydroxyethyl methacrylate/polystyrene macromonomer/benzyl methacrylate/methacrylic acid copolymers, and the like which are described in JP1995-140654A (JP-H07-140654A).

Regarding the specific constitutional unit of the alkali-soluble resin, particularly, copolymers of (meth)acrylic acid and a monomer capable of being copolymerized with (meth)acrylic acid are preferred.

Examples of the additional monomer capable of being copolymerized with (meth)acrylic acid include alkyl (meth)acrylates, aryl (meth)acrylates, vinyl compounds, and the like. Here, hydrogen atoms in alkyl groups and aryl groups may be substituted with substituents.

Specific examples of alkyl (meth)acrylate and aryl (meth)acrylate include methyl (meth)acrylates, ethyl (meth)acrylates, propyl (meth)acrylates, butyl (meth)acrylates, isobutyl (meth)acrylates, pentyl (meth)acrylates, hexyl (meth)acrylates, octyl (meth)acrylates, phenyl (meth)acrylates, benzyl acrylates, tolyl acrylates, naphthyl acrylates, cyclohexyl acrylates, and the like.

In addition, examples of the vinyl compounds include styrene, α-methyl styrene, vinyl toluene, glycidyl methacrylate, acrylonitrile, vinyl acetate, N-vinyl pyrrolidone, tetrahydrofurfuryl methacrylate, polystyrene macromonomers, polymethyl methacrylate macromonomers, $CH_2=CR^1R^2$, $CH_2=C(R^1)(COOR^3)$ [here, $R^1$ represents a hydrogen atom or an alkyl group having 1 to 5 carbon atoms, $R^2$ represents an aromatic hydrocarbon ring having 6 to 10 carbon atoms, and $R^3$ represents an alkyl group having 1 to 8 carbon atoms or an aralkyl group having 6 to 12 carbon atoms] and the like.

The additional monomer capable of being copolymerized with (meth)acrylic acid can be used singly or a combination of two or more monomers capable of being copolymerized with (meth)acrylic acid can be used.

A preferred additional monomer capable of being copolymerized with (meth)acrylic acid is at least one monomer selected from $CH_2=CR^1R^2$, $CH_2=C(R^1)(COOR^3)$, phenyl (meth)acrylates, benzyl (meth)acrylates, and styrene and particularly preferably at least one selected from $CH_2=CR^1R^2$ and $CH_2=C(R^1)(COOR^3)$.

Additionally, examples thereof include resins having an ethylene unsaturated double bond introduced into a linear macromolecule by reacting a (meth)acrylic compound having a reactive functional group, cinnamic acid, or the like with the linear macromolecule having a substituent capable of reacting with this reactive functional group. Examples of the reactive functional group include a hydroxyl group, a carboxyl group, an amino group, and the like, and examples of the substituent capable of being reacted with this reactive functional group include an isocyanate group, an aldehyde group, an epoxy group, and the like.

The second transparent layer in the first embodiment and the second embodiment preferably includes at least two kinds of resins. Among the at least two kinds of resins, at least one kind is preferably a resin having a weight-average molecular weight of 1,000 or more and 20,000 or less, and, among the at least two kinds of resins, at least one kind is preferably a resin having an acid value of 150 mgKOH/g or more.

In more detail, the second transparent layer preferably includes, among the at least two kinds of resins, a resin having a weight-average molecular weight of 1,000 or more and 20,000 or less and, furthermore, includes a resin having a weight-average molecular weight of more than 20,000.

In addition, from the viewpoint of the alkali solubility, the second transparent layer preferably includes at least one kind of resin having an acid value of 150 mgKOH/g or more, and, furthermore, includes a resin having an acid value of less than 150 mgKOH/g.

In a case in which the second transparent layer includes the at least two kinds of resins described above, the low-molecular-weight component included in the first transparent layer easily passes through the second transparent layer and emerges on the surface of the second transparent layer, and it becomes easy to form the third transparent layer described below.

From the viewpoint of the interaction with the metal oxide particles and the ease of maintenance of the viscosity of the coating fluid in a preferred range during drying, the weight-average molecular weight of at least one kind of resin among the at least two kinds of resins is preferably in the above-described range, more preferably 1,000 or more and 18,000 or less, and still more preferably 2,000 or more and 17,000 or less.

From the viewpoint of the favourable interaction with the metal oxide particles, the acid value of at least one kind of resin among the at least two kinds of resins is preferably in the above-described range, more preferably 180 or more, and still more preferably 200 or more.

In a case in which at least one condition of the fact that at least one kind of the at least two kinds of resins that are included in the second transparent layer is a resin having a weight-average molecular weight of 1,000 or more and 20,000 or less and the fact that at least one kind of the at least two kinds of resins is a resin having an acid value of 150 mgKOH/g or more is satisfied, the film thickness uniformity during the formation of the second transparent layer becomes more favourable.

In the present specification, as the weight-average molecular weight of the resin, a value measured using gel permeation chromatography (GPC) is used.

In the measurement using gel permeation chromatography (GPC), it is possible to use HLC (registered trademark)-8020GPC (Tosoh Corporation) as a measurement instrument, three TSKgel (registered trademark) Super Multipore HZ-H's (4.6 mmID×15 cm, Tosoh Corporation) as columns, and tetrahydrofuran (THF) as an eluent.

In addition, regarding the measurement conditions, the specimen concentration is set to 0.45% by mass, the flow rate is set to 0.35 ml/min, the sample injection amount is set to 10 µl, and the measurement temperature is set to 40° C., and a differential refractive index (RI) detector can be used.

The calibration curve can be produced from Tosho Corporation's "standard specimen TSK standard, polystyrene": eight samples of "F-40", "F-20", "F-4", "F-1", "A-5000", "A-2500", "A-1000", and "n-propylbenzene".

In addition, the resin having an acidic group which is included in the second transparent layer is preferably a (meth)acrylic resin having an acidic group, more preferably a copolymer resin of (meth)acrylic acid/vinyl compound, and particularly preferably a copolymer resin of (meth)acrylic acid/allyl (meth)acrylate.

Among these, the second transparent layer preferably includes, as the resin, a copolymer having a (meth)acrylic acid-derived structural unit and a styrene-derived structural unit and more preferably includes a copolymer having a (meth)acrylic acid-derived structural unit, a styrene-derived structural unit, and a (meth)acrylic acid ester-derived structural unit having an ethyleneoxy chain.

In a case in which the second transparent layer includes, as the resin, a copolymer having a (meth)acrylic acid-derived structural unit and a styrene-derived structural unit and, furthermore, includes a copolymer having a (meth)acrylic acid-derived structural unit, a styrene-derived structural unit, and a (meth)acrylic acid ester-derived structural unit having an ethyleneoxy chain, the film thickness uniformity during the formation of the second transparent layer becomes more favorable.

Examples of the copolymer having a (meth)acrylic acid-derived structural unit and a styrene-derived structural unit and the copolymer having a (meth)acrylic acid-derived structural unit, a styrene-derived structural unit, and a (meth) acrylic acid ester-derived structural unit having an ethyleneoxy chain will be illustrated below, but the present disclosure is not limited thereto.

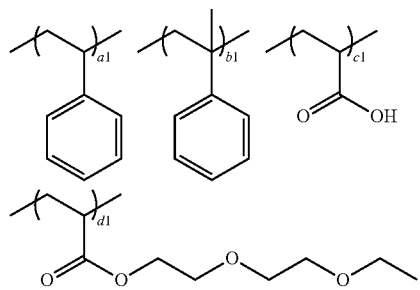

-continued

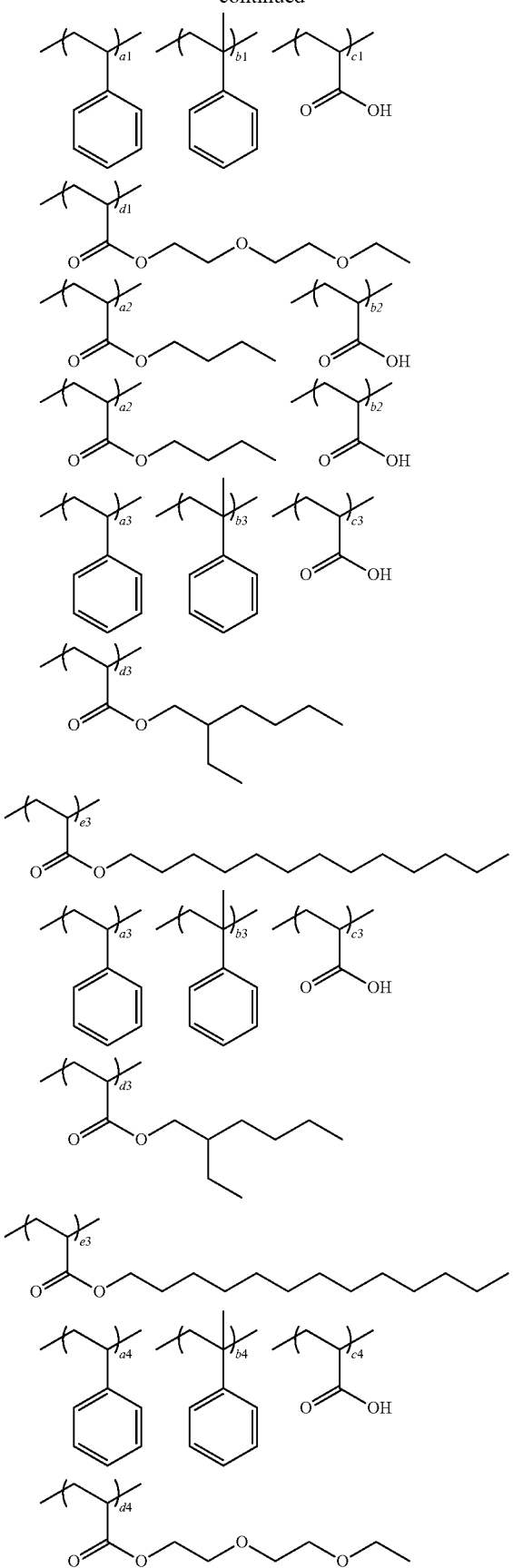

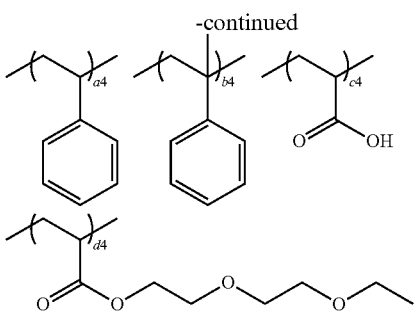

In the above-illustrated exemplary compounds, a1 to d4 each represent the content ratio (molar ratio) of the described structural units and are appropriately adjusted depending on the purpose in a range in which the above-described preferred acid value and weight-average molecular weight can be achieved.

As the resin having an acidic group which is included in the second transparent layer, commercially available products may be used. The commercially available products of the resin having an acidic group which is included in the second transparent layer are not particularly limited and can be appropriately selected depending on the purpose. Examples of the commercially available products of the resin having an acidic group which can be used in the second transparent layer in the first embodiment and the second embodiment include ARUFON (registered trademark) UC3000, UC3510, UC3080, UC3920, UF5041 (all trade names) manufactured by Toagosei Co., Ltd., JONCRYL (registered trademark) 67, JONCRYL 611, JONCRYL 678, JONCRYL 690, JONCRYL 819 (all trade names) manufactured by BASF, and the like.

The content of the resin having an acidic group is preferably 10% by mass to 80% by mass, more preferably 15% by mass to 65% by mass, and particularly preferably 20% by mass to 50% by mass of the second transparent layer.

—Monomer Having Acidic Group—

The second transparent layer may contain a monomer having an acidic group as a curing component. As the monomer having an acidic group, it is possible to preferably use a (meth)acrylic monomer such as (meth)acrylic acid or a derivative thereof and the following monomers.

Examples thereof include trifunctional or tetrafunctional radical polymerizable monomers (monomers obtained by introducing a carboxylic acid group into a pentaerythritol tri- and tetraacrylate [PETA] skeleton (acid value=80 mgKOH/g to 120 mgKOH/g)), pentafunctional or hexafunctional radical polymerizable monomers (compounds obtained by introducing a carboxylic acid group into a dipentaerythritol penta- or hexaacrylate [DPHA] skeleton (acid value=25 mgKOH/g to 70 mgKOH/g)), and the like. Specific titles will not be described, but difunctional alkali-soluble radical polymerizable monomers may also be used as necessary.

Additionally, it is possible to preferably use the monomers having an acidic group described in [0025] to [0030] of JP2004-239942A, the content of which is incorporated into the present disclosure.

In addition, among the monomers exemplified as the polymerizable monomer that is used in the first transparent layer, the monomers having an acidic group can also be preferably used.

Among these, polymerizable monomers containing a carboxyl group are preferred, acrylic monomers such as (meth) acrylic acids or derivatives thereof can be more preferably used, and, among these, ARONIX TO-2349 (Toagosei Co., Ltd.) is particularly preferred. Meanwhile, in the present specification, acrylic monomers refer to both methacrylic monomers and acrylic monomers.

In the second transparent layer, the content of the monomer having an acidic group is preferably 1% by mass to 50% by mass, more preferably 3% by mass to 20% by mass, and particularly preferably 6% by mass to 15% by mass of the resin having an acidic group.

—Additional Resin—

An additional resin having no acidic group which is used in the second transparent layer is not particularly limited, and the additional resin (1) that is used in the coating fluid for forming the first transparent layer which is used to form the first transparent layer can be used in the same manner.

—Metal Oxide Particles—

The second transparent layer includes metal oxide particles for the purpose of adjusting the refractive index or the light transmittance.

To the second transparent layer, it is possible to add the metal oxide particles in a random proportion depending on the kinds and contents of the resin and the polymerizable monomer being used, the kind of the metal oxide particles being used, and the like.

The kind of the metal oxide particles is not particularly limited, and well-known metal oxide particles can be used. The metal oxide particles exemplified in the above-described section of the first transparent layer can also be used in the second transparent layer.

The second transparent layer in the first embodiment and the second embodiment preferably has at least one of zirconium oxide particles ($ZrO_2$ particles), $Nb_2O_5$ particles, or titanium oxide particles ($TiO_2$ particles) from the viewpoint of controlling the refractive index to the above-described range of the refractive index of the second transparent layer, and the metal oxide particles are more preferably zirconium oxide particles or titanium oxide particles and particularly preferably zirconium oxide particles.

In a case in which zirconium oxide particles are used as the metal oxide particles, the content of the zirconium oxide particles is preferably 40% by mass to 95% by mass, more preferably 60% by mass to 95% by mass, and still more preferably 60% by mass or more and less than 80% by mass of all of the components of the second transparent layer since the defects of the second resin layer having the metal oxide particles are not easily visible after transfer, and laminates having a favourable transparent electrode pattern-masking property can be produced.

In a case in which titanium oxide particles are used as the metal oxide particles, the content of the titanium oxide particles is preferably 30% by mass to 70% by mass and more preferably 40% by mass or more and less than 60% by mass of the second transparent layer since the defects of the second transparent layer having the metal oxide particles are not easily visible after transfer, and laminates having a favourable transparent electrode pattern-masking property can be produced.

The refractive index of the metal oxide particles is preferably higher than the refractive index of a transparent film formed using a composition obtained by removing the metal oxide particles from the coating fluid for forming the second transparent layer.

Specifically, in the transfer film, the second transparent layer preferably contains metal oxide particles having a refractive index of 1.50 or higher, more preferably contains particles having a refractive index of 1.55 or higher, still more preferably contains particles having a refractive index of 1.70 or higher, particularly preferably contains particles having a refractive index of 1.90 or higher, and most preferably contains particles having a refractive index of 2.00 or higher with respect to light rays having wavelengths of 400 nm to 750 nm.

Here, the refractive index being 1.50 or higher with respect to light rays having wavelengths of 400 nm to 750 nm means that the average refractive index is 1.50 or higher with respect to light having wavelengths in the above-described range, and the refractive index is not necessarily 1.50 or higher with respect to all of the light rays having wavelengths in the above-described range. In addition, the average refractive index refers to a value obtained by dividing the sum of the measured values of refractive indexes with respect to individual light rays having a wavelength in the above-described range by the number of measurement points.

The average primary particle diameter of the metal oxide particles is preferably 100 nm or less, more preferably 50 nm or less, and still more preferably 20 nm or less from the viewpoint of optical performance such as the haze.

The average primary particle diameter of the metal oxide particles refers to a value obtained by measuring the diameters of 100 random particles during observation using a transmission electron microscope (TEM) and computing the arithmetic average of the 100 diameters.

The second transparent layer may include only one kind of metal oxide particles or two or more kinds of metal oxide particles.

The content of the metal oxide particles in the second transparent layer is preferably 30% by mass to 95% by mass, more preferably 30% by mass to 85% by mass, and still more preferably 30% by mass or more and less than 80% by mass of all of the components of the second transparent layer regardless of the kind of the metal oxide particles. In a case in which the content of the metal oxide particles is in the above-described range, the transparent electrode pattern-masking property after transfer further improves.

The second transparent layer may include other components in addition to the resin and the metal oxide particles.

—Metal Oxidation Suppressor—

The second transparent layer preferably includes a metal oxidation suppressor.

The metal oxidation suppressor that is used in the first embodiment and the second embodiment is preferably a compound having an aromatic ring including a nitrogen atom in the molecule.

In addition, in the metal oxidation suppressor, the aromatic ring including a nitrogen atom is preferably at least one ring selected from the group consisting of an imidazole ring, a triazole ring, a tetrazole ring, a thiadiazole ring, and fused rings of the above-described ring and an additional aromatic ring, and the aromatic ring including a nitrogen atom is more preferably an imidazole ring or a fused ring of an imidazole ring and an additional aromatic ring.

The additional aromatic ring may be a homocyclic ring or a heterocyclic ring, but is preferably a homocyclic ring, more preferably a benzene ring or a naphthalene ring, and still more preferably a benzene ring.

As a preferred metal oxidation suppressor, imidazole, benzimidazole, tetrazole, mercaptothiadiazole, and benzotriazole are preferably exemplified, and imidazole, benzimidazole, and benzotriazole are more preferred. As the metal oxidation suppressor, commercially available products may be used, and, for example, BT120, Johoku Chemical Co., Ltd. which includes benzotriazole can be preferably used.

In addition, the content of the metal oxidation suppressor is preferably 0.1% by mass to 20% by mass, more preferably 0.5% by mass to 10% by mass, and particularly preferably 1% by mass to 5% by mass of the total mass of the second transparent layer.

—Compound Capable of Reacting with Acid by Heating—

The second transparent layer in the first embodiment and the second embodiment may include a compound capable of reacting with an acid by heating. In the present specification, the compound capable of reacting with an acid by heating refers to a compound which does not have any reactivity with acid at normal temperature (25° C.), but develops reactivity with an acid in the case of being heated to a specific temperature or higher depending on the properties of the compound.

The compound capable of reacting with an acid by heating is not particularly limited as long as the compound has an intended reactivity, and well-known compounds can be appropriately selected and used. The compound capable of reacting with an acid by heating is preferably a compound having a higher reactivity with an acid in the case of being heated to higher than 25° C. compared with the reactivity with an acid at a temperature of 25° C.

The compound capable of reacting with an acid by heating is preferably a compound which has a group capable of reacting with an acid that is temporarily inactivated by a blocking agent-derived partial structure and in which the blocking agent-derived partial structure is dissociated at a previously-specified dissociation temperature.

Examples of the compound capable of reacting with an acid by heating include carboxylic acid compounds, alcohol compounds, amine compounds, blocked isocyanates, epoxy compounds, and the like, and, among them, blocked isocyanates are preferred from the viewpoint of the storage stability.

As the blocked isocyanates, it is possible to use the blocked isocyanates described in the section of the coating fluid for forming the first transparent layer in the same manner, and preferred examples thereof are also identical thereto.

Furthermore, in the second transparent layer, additives may also be used. Examples of the additives include the surface-activating agents described in Paragraph 0017 of JP4502784B and Paragraphs 0060 to 0071 of JP2009-237362A, the thermal polymerization inhibitors described in Paragraph 0018 of JP4502784B, and, furthermore, other additives described in Paragraphs 0058 to 0071 of JP2000-310706A. Examples of additives that are preferably used in the second transparent layer include MEGAFACE (registered trademark) F-444 (DIC Corporation) which is a well-known fluorine-based surface-activating agent.

—Polymerizable Monomer—

The second transparent layer preferably includes a polymerizable monomer such as a photopolymerizable monomer or a thermopolymerizable monomer from the viewpoint of increasing the strength and the like of films by curing the polymerizable monomer. The second transparent layer may include only the monomer having an acidic group as the polymerizable monomer or may include other polymerizable monomers other than the monomer having an acidic group.

As the polymerizable monomer that is used in the second transparent layer, it is possible to use the polymerizable compounds described in Paragraphs 0023 and 0024 of JP4098550B. Among them, pentaerythritol tetraacrylate, pentaerythritol triacrylate, and tetraacrylates of pentaerythritol ethylene oxide adducts can be preferably used. These polymerizable monomers may be used singly or a plurality of polymerizable compounds may be used in combination. In a case in which a mixture of pentaerythritol tetraacrylate and pentaerythritol triacrylate is used, the percentage of pentaerythritol triacrylate is preferably 0% to 80% by mass and more preferably 10% to 60% by mass in terms of the mass ratio.

Specific examples of the polymerizable monomer that is used in the second transparent layer include mixtures of a water-soluble polymerizable monomer represented by Structural Formula 1 and pentaerythritol tetraacrylate (NK ester A-TMMT, Shin-Nakamura Chemical Co., Ltd., containing approximately 10% of triacrylate as an impurity), mixtures of pentaerythritol tetraacrylate and triacrylate (NK ester A-TMM3LM-N, Shin-Nakamura Chemical Co., Ltd., 37% of triacrylate), mixtures of pentaerythritol tetraacrylate and triacrylate (NK ester A-TMM-3L, Shin-Nakamura Chemical Co., Ltd., 55% of triacrylate), mixtures of pentaerythritol tetraacrylate and triacrylate (NK ester A-TMM3, Shin-Nakamura Chemical Co., Ltd., 57% of triacrylate), tetraacrylates of a pentaerythritol ethylene oxide adduct (KAYARAD RP-1040, Nippon Kayaku Co., Ltd.), and the like.

Structural Formula 1

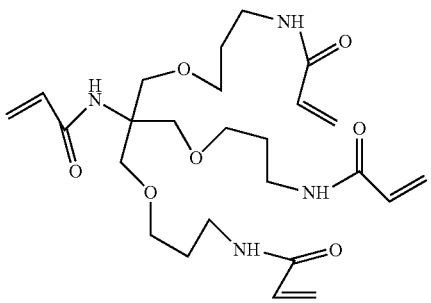

The other photopolymerizable compounds that are used in the second transparent layer are preferably polymerizable monomers that are soluble in water or aqueous solvents such as solvent mixtures of a lower alcohol having 1 to 3 carbon atoms and water, and the like. Examples of the polymerizable monomers that are soluble in aqueous solvents include monomers having a hydroxyl group and monomers having an ethylene oxide or polypropylene oxide and a phosphoric acid group in the molecule.

—Polymerization Initiator—

The second transparent layer may include a polymerization initiator.

The polymerization initiator that is used in the second transparent layer is preferably a polymerization initiator that is soluble in aqueous solvents. Examples of the polymerization initiator that is soluble in aqueous solvents include IRGACURE 2959, photopolymerization initiators of Structural Formula 2, and the like.

Structural Formula 2

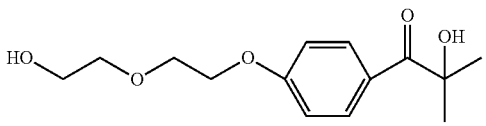

Hitherto, a case in which the transfer film is a negative-type material has been mainly described, but the transfer film may be a positive-type material. In a case in which the transfer film is a positive-type material, for example, the material and the like described in JP2005-221726A can be used in the second transparent layer, but the above-described materials are not limited thereto.

The coating fluid for forming the second transparent layer that is used to form the second transparent layer may include a solvent that dissolves the specific binder and the like.

It is preferable that the second transparent layer further includes solvents and the viscosity at 20° C. of a solvent having the highest viscosity among the solvents is 3.0 mPa·s or more. In a case in which the viscosity of the solvent having the highest viscosity among the solvents included in the second transparent layer is 3.0 mPa·s or more, the viscosity of the coating fluid for forming the second transparent layer that is used to form the second transparent layer becomes higher, the components that are included in the first transparent layer becoming compatible with the components that are included in the second transparent layer are suppressed, and the film thickness uniformity of the second transparent layer further improves.

Meanwhile, the viscosity of the solvent at 20° C. refers to a value measured using a TV25-type viscometer (TVE-25) manufactured by Toki Sangyo Co., Ltd. from a solvent having an adjusted temperature in a constant-temperature tank (20° C.).

Examples of the solvent having a viscosity of 3.0 mPa·s or more at 20° C. include diacetone alcohol (3.2 mPa·s), ethylene glycol (32.5 mPa·s), propylene glycol (56 mPa·s), isobutyl alcohol (4.2 mPa·s), and the like.

~Formation of Second Transparent Layer~

The second transparent layer is formed by applying and drying a solution obtained by dissolving a resin composition for forming the second transparent layer including the metal oxide particles and the resin in a solvent (referred to as the coating fluid for forming the second transparent layer).

Meanwhile, in the present specification, the coating fluid for forming the second transparent layer refers to a solution obtained by dissolving a resin composition for forming the second transparent layer including the metal oxide particles and the resin in a solvent including an aqueous solvent such as water or an alcohol.

In addition, in the case of forming the second transparent layer, it is preferable to laminate the first transparent layer on the temporary support and then laminate the second transparent layer without curing the first transparent layer. A preferred aspect is an aspect in which the first transparent layer is formed using the coating fluid for forming the first transparent layer containing an organic solvent and the second transparent layer is formed using the coating fluid for forming the second transparent layer containing an aqueous solvent such as water or an alcohol, and, in such a case, the differentiation of two adjacent layers becomes favorable, and the transparent electrode pattern visibility can be improved with the above-described mechanism. Furthermore, refractive index-adjusting layers (that is, the first transparent layer and the second transparent layer) are transferred onto the transparent electrode pattern from the transfer film and then can be developed in a desired pattern by means of photolithography. Meanwhile, in a case in which the differentiation of the first transparent layer and the second transparent layer is favorable, the effect of adjusting the refractive index with the above-described mechanism is likely to be sufficient, and the transparent electrode pattern-masking property becomes more favorable.

(Refractive Index)

Each of the transfer film of the first embodiment and the transfer film of the second embodiment preferably has the second transparent layer on the first transparent layer. The refractive index of the second transparent layer is preferably higher than the refractive index of the first transparent layer.

In a case in which the refractive index difference between a transparent electrode pattern (preferably indium tin oxide: ITO) and the second transparent layer and the refractive index difference between the second transparent layer and the first transparent layer in the transfer target body are decreased, the light reflection decreases, the transparent electrode pattern does not easily become visible, and it is possible to improve the transparent electrode pattern-masking property.

The refractive index of the second transparent layer is preferably 1.60 or more.

The refractive index of the second transparent layer needs to be adjusted depending on the refractive index of a transparent electrode, and the upper limit value of the value is not particularly limited, but is preferably 2.1 or less, more preferably 1.78 or less, and may be 1.74 or less.

In a case in which the refractive index of the transparent electrode is more than 2.0 as in a case in which an oxide of In and Zn (indium zinc oxide: IZO) is used, the refractive index of the second transparent layer is preferably 1.7 or more and 1.85 or less.

Meanwhile, unless particularly otherwise described, the refractive index refers to a value measured at a wavelength of 550 nm using ellipsometry.

(Thickness)

The average thickness of the second transparent layer is less than 200 nm, preferably 110 nm or less, and more preferably 100 nm or less.

The average thickness of the second transparent layer is preferably more than 0 nm and 20 nm or less.

The average thickness of the second transparent layer is preferably 55 nm to 100 nm, preferably 60 nm to 100 nm, and still more preferably 70 nm to 100 nm.

In a case in which the average thickness is in the above-described range, a preferred refractive index is maintained, and the transparent electrode pattern-masking property becomes more favorable.

<Third Transparent Layer>

Third Transparent Layer in First Embodiment

The transfer film of the first embodiment has, on the second transparent layer, a third transparent layer having an average thickness that is smaller than the average thickness of the second transparent layer and having a percentage of metal atoms in all of the atoms of 2% or less in a 300 µm×300 µm area in the case of being measured from the outermost surface opposite to a surface in contact with the second transparent layer using XPS.

In the third transparent layer in the first embodiment, the percentage of metal atoms in all of the atoms is 2% or less and preferably 1% or less, and, more preferably, the third transparent layer does not include any metal atoms except for inevitable impurities.

(Average Thickness of Third Transparent Layer)

In the first embodiment, the average thickness of the third transparent layer formed using a preferred method described below is not particularly limited as long as the average thickness is smaller than the average thickness of the second transparent layer, but the third transparent layer is preferably a thin layer from the viewpoint of the effect, and specifically, the average thickness of the third transparent layer is preferably 30 nm or less, more preferably 20 nm or less, and more preferably 10 nm or less.

The average thickness of the third transparent layer needs to be larger than 0 nm and is preferably 1 nm or more.

An extremely thin transparent layer as described above cannot be easily formed using an ordinary coating method.

The average thickness of the third transparent layer can be measured using the following method.

The thickness of the third transparent layer can be measured at the same time as the thickness of the second transparent layer. That is, in the same manner as in the method described in the section of the method for measuring the thickness of the second transparent layer, a cross section is cut out, the thickness of the second transparent layer is measured using a transmission electron microscope (TEM), a 5 mm-long region in the cross section of the measurement target is scanned, the thickness of a region including the metal oxide particles is considered as the thickness of the second transparent layer, and the thickness of a region not including the metal oxide particles is considered as the thickness of the third transparent layer, whereby the thickness of the third transparent layer can be measured. The average thickness of the third transparent layer refers to a value obtained by computing the average of the measurement values of the thicknesses at 20 places obtained by dividing the measurement target region at equal intervals.

The third transparent layer is preferably a layer including the components that are included in the first transparent layer and preferably includes a curing component as the component included in the first transparent layer.

Here, the curing component refers to a component that reacts due to the supply of energy of light, heat, or the like and forms a crosslinking structure or is polymerized, and examples thereof include polymerizable monomers, blocked isocyanates, and the like.

Examples of the low-molecular-weight component which is the component included in the first transparent layer and passes through the second transparent layer and emerges on the second transparent layer include the polymerizable monomer, the polymerization initiator, the compound capable of reacting with an acid by heating such as blocked isocyanates, the surface-activating agent, and the like.

Among the low-molecular-weight components included in the first transparent layer which have emerged on the second transparent layer, the curing component that contributes to curing, for example, the polymerizable monomer, the polymerization initiator, the compound capable of reacting with an acid by heating such as blocked isocyanates, and the like are cured on the second transparent layer during the curing of the second transparent layer, thereby forming the cured third transparent layer.

The components of the first transparent layer which are included in the third transparent layer can be analysed and confirmed by analysing the surface of the third transparent layer using, for example, Time-of-Flight Secondary Ion Mass Spectrometry (TOF-SIMS).

The fact that the third transparent layer is formed of the components included in the first transparent layer which have emerged on the second transparent layer can be confirmed from the fact that the third transparent layer includes the components that are included in the first transparent layer, particularly, the curing component that contributes to curing and the fact that the third transparent layer is an extremely thin layer having an average thickness of 10 nm or less.

(Content of Metal Atoms in Third Transparent Layer)

The percentage of metal atoms in all of the atoms in a 300 μm×300 μm area in the case of being measured from the outermost surface opposite to the surface in contact with the second transparent layer according to the first embodiment using XPS can be measured using the following method.

Using Quantera SXM-type XPS (manufactured by ULVAC-PHI, Inc.) and X-ray Photoelectron Spectroscopy (XPS), the percentage of metal atoms (M) constituting the metal oxide particles on the outermost surface opposite to the surface of the third transparent layer on the surface of the transfer film in contact with the second transparent layer can be measured.

Regarding the measurement conditions, the measurement can be carried out under the following conditions.

X-ray: Al-Kα ray (100 μm, 25 W, 15 kV)
Measurement area: 300 μm (square micrometers)
Photoelectron Take Off Angle: 45°
Pass Energy: 112 eV, Step Energy: 0.1 eV As a result of measuring the percentage under the above-described conditions, it is determined that, in a case in which the percentage of the metal atoms in all of the atoms is 2% or less in the 300 μm×300 μm measurement target region, the third transparent layer is a region barely including the metal oxide particles.

(Formation of Third Transparent Layer)

The third transparent layer in the first embodiment can be formed by applying the coating fluid including an organic solvent, the polymerizable monomer, and the resin onto the temporary support so as to form the first transparent layer, then, applying the coating fluid including water, the metal oxide particles, and the resin onto the first transparent layer, and forming the second transparent layer having an average thickness of less than 200 nm. That is, it is preferable that the low-molecular-weight component and the organic solvent that are included in the first transparent layer are not dissolved together with the aqueous component included in the second transparent layer, pass through the second transparent layer, emerge on the second transparent layer, and form the third transparent layer.

Meanwhile, the method for forming the third transparent layer is not limited to what has been described above.

<Third Transparent Layer>

Third Transparent Layer in Second Embodiment

The transfer film of the second embodiment has, on the second transparent layer, a third transparent layer having a percentage of metal atoms in all of the atoms in the layer which is smaller than the percentage of the metal atoms in all of the atoms in the second transparent layer.

From the viewpoint of more favourable adhesiveness to transfer target bodies, the third transparent layer in the second embodiment is preferably a layer in which the average thickness is smaller than the average thickness of the second transparent layer and the percentage of the metal atoms in all of the atoms is 2% or less in a 300 μm×300 μm area in the case of being measured from the outermost surface opposite to a surface in contact with the second transparent layer using XPS.

In the third transparent layer, the percentage of metal atoms in all of the atoms is preferably 2% or less and more preferably 1% or less, and still more preferably, the third transparent layer does not include any metal atoms except for inevitable impurities.

A specific method for measuring the percentage of the metal atoms using XPS will be described below.

(Thickness)

The third transparent layer is formed as a layer having an average thickness that is smaller than the average thickness of the second transparent layer. The third transparent layer is preferably a thin layer from the viewpoint of the effect. Specifically, the average thickness of the third transparent layer is preferably 30 nm or less, more preferably 20 nm or less, and still more preferably 10 nm or less.

The average thickness of the third transparent layer is larger than 0 nm and preferably 1 nm or more.

An extremely thin transparent layer as described above cannot be easily formed using an ordinary coating method.

The average thickness of the third transparent layer is a value measured using the following method.

The average thickness of the third transparent layer can be measured at the same time as the thickness of the second transparent layer.

That is, a piece of the transfer film is produced using an ultramicrotome, the average thickness of the layer on the first transparent layer in the specimen of the transfer film is measured using a transmission electron microscope (TEM), a 5 mm-long region in the cross section of the specimen is scanned, the thickness of a region including the metal oxide particles is considered as the thickness of the second transparent layer, and the thickness of a region not including the metal oxide particles is considered as the thickness of the third transparent layer. In this manner, the thickness of the third transparent layer can be measured.

The average thickness refers to a value obtained by computing the average of the measurement values of the thicknesses at 20 places obtained by dividing the measurement target region at equal intervals.

The third transparent layer is preferably a layer including the components that are included in the first transparent layer, the component included in the first transparent layer is preferably the low-molecular-weight component, and the third transparent layer preferably includes a curing component as the low-molecular-weight component.

The curing component refers to a component that reacts due to the supply of energy of light, heat, or the like and causes a polymerization reaction or a crosslinking reaction, and examples thereof include polymerizable monomers, polymerization initiators, blocked isocyanates, and the like.

Examples of the low-molecular-weight component which is the component included in the first transparent layer and passes through the second transparent layer and emerges on the second transparent layer include the polymerizable monomer, the polymerization initiator, the compound capable of reacting with an acid by heating such as blocked isocyanates, the surface-activating agent, and the like.

Among the low-molecular-weight components included in the first transparent layer which have emerged on the second transparent layer, the curing component that contributes to curing (for example, the polymerizable monomer, the polymerization initiator, the compound capable of reacting with an acid by heating such as blocked isocyanates, and the like) imparts a curing property to the third transparent layer.

The components of the first transparent layer which are included in the third transparent layer can be confirmed by analysing the surface of the third transparent layer using, for example, Time-of-Flight Secondary Ion Mass Spectrometry (TOF-SIMS).

The fact that the third transparent layer is formed of the components included in the first transparent layer which have emerged on the second transparent layer can be confirmed from the fact that the third transparent layer includes the components that are included in the first transparent layer, particularly, the curing component that contributes to curing and the fact that the third transparent layer is an extremely thin (30 nm or less) layer.

(Content of Metal Atoms in Third Transparent Layer)

The proportion of metal atoms in all of the atoms in the layer of the third transparent layer and the proportion of metal atoms in all of the atoms in the layer of the second transparent layer can be measured by cutting the transfer film using an ultramicrotome and observing the cross section of the specimen having an exposed cross section using HD2300-type STEM manufactured by Hitachi High-Technologies Corporation and Energy Dispersive X-ray Spectroscopy (EDX).

In addition, the percentage of metal atoms in all of the atoms in a 300 μm×300 μm area in the case of being measured from the outermost surface opposite to the surface in contact with the second transparent layer using XPS can be measured using the following method.

Using Quantera SXM-type XPS (manufactured by ULVAC-PHI, Inc.) and X-ray Photoelectron Spectroscopy (XPS), the percentage of metal atoms (M) constituting the metal oxide particles on the outermost surface opposite to the surface of the third transparent layer on the surface of the transfer film in contact with the second transparent layer can be measured.

Regarding the measurement conditions, the measurement can be carried out under the following conditions.

X-ray: Al-Kα ray (100 μm, 25 W, 15 kV)
Measurement area: 300 μm (square micrometers)
Photoelectron Take Off Angle: 45°
Pass Energy: 112 eV, Step Energy: 0.1 eV As a result of measuring the percentage under the above-described conditions, it is determined that, in a case in which the percentage of the metal atoms in all of the atoms is 2% or less in the 300 μm×300 μm measurement target region, the third transparent layer is a region barely including the metal oxide particles.

~Formation of Third Transparent Layer~

The third transparent layer is preferably formed on the second transparent layer after the coating fluid for forming the first transparent layer including an organic solvent, the polymerizable monomer, and the resin is applied onto the temporary support so as to form the first transparent layer, the coating fluid for forming the second transparent layer including an aqueous solvent, the metal oxide particles, and the resin is applied onto the formed first transparent layer, and the second transparent layer having an average thickness of less than 200 nm is formed.

Specifically, it is preferable that, in a case in which the second transparent layer is laminated on the first transparent layer, the low-molecular-weight component and the organic solvent that are included in the first transparent layer are not dissolved together with the aqueous component included in the second transparent layer, pass through the second transparent layer, and emerge on the second transparent layer, thereby forming the layer.

<Random Resin Layer>

The transfer film of the first embodiment may have an additional random layer in addition to the first transparent layer, the second transparent layer, and the third transparent layer as long as the effects of the first embodiment are not impaired. The transfer film of the second embodiment may have an additional random layer in addition to the first transparent layer, the second transparent layer, and the third transparent layer as long as the effects of the second embodiment are not impaired.

(Thermoplastic Resin Layer)

In the transfer film, it is possible to provide a thermoplastic resin layer between the temporary support and the first transparent layer.

In a case in which the transfer film is transferred to a transfer target object, and a laminate is formed by providing the thermoplastic resin layer, the generation of air bubbles in the respective layers is suppressed, and image unevenness or the like attributed to air bubbles is not easily caused, which is preferable.

The thermoplastic resin layer preferably includes an alkali-soluble resin. In the case of being provided, the thermoplastic resin layer preferably functions as a cushion material that absorbs protrusions and recesses on the surface of the transfer target object and is preferably a resin layer capable of transforming in accordance with protrusions and recesses on the subject surface.

The thermoplastic resin layer preferably includes the organic macromolecular substance described in JP1993-72724A (JP-H05-72724A) as a component and particularly preferably includes at least one substance selected from organic macromolecular substances having a softening point of approximately 80° C. or lower obtained using the Vicat method [specifically, the polymer softening point measurement method by American Society for Testing and Materials (ASTM International) ASTM D1235].

In a case in which the thermoplastic resin layer is provided, the layer thickness is preferably 3 μm to 30 μm. In a case in which the layer thickness of the thermoplastic resin layer is in the above-described range, the thermoplastic resin layer has favorable followability during transfer, is capable of absorbing protrusions and recesses on the surface of the transfer target body, and can be easily dried and developed during the formation of the thermoplastic resin layer, which is preferable. The layer thickness of the thermoplastic resin layer is more preferably 4 μm to 25 μm and particularly preferably 5 μm to 20 μm.

<Interlayer>

In the transfer film, it is possible to provide an interlayer between the thermoplastic resin layer that is randomly provided and the first transparent layer.

As the interlayer, the layer described in JP1993-72724A (JP-H05-72724A) as "separation layer" can be applied.

<Protective Film>

In the transfer film, it is possible to provide a protective film on the surface of the third transparent layer. In a case in which the protective film is provided, it is possible to protect the surface of the third transparent layer which is a surface of the transfer film that adheres to the transfer target body.

As the protective film, it is possible to appropriately use the protective film described in Paragraphs 0083 to 0087 and 0093 of JP2006-259138A.

~Method for Manufacturing Transfer Film~

A method for manufacturing the transfer film is not particularly limited, and well-known methods can be used. Among them, the transfer film is preferably manufactured using a manufacturing method described below from the viewpoint of the ease of forming the intended third transparent layer.

It is preferable that a method for manufacturing the transfer film of the first embodiment and the second embodiment includes a step of forming the first transparent layer by applying the coating fluid for forming the first transparent layer including an organic solvent, the polymerizable monomer, and the resin onto the temporary support and a step of forming the second transparent layer having an average thickness of less than 200 nm by applying the coating fluid for forming the second transparent layer including an aqueous solvent, the metal oxide particles, and the resin onto the first transparent layer and a transfer film having the third transparent layer having an average thickness that is smaller than the average thickness of the second transparent layer and having a percentage of the metal atoms in all the atoms of 2% or less in a 300 µm×300 µm area in the case of being measured from the outermost surface opposite to the surface in contact with the second transparent layer using XPS disposed on the second transparent layer is manufactured.

In a case in which the second transparent layer is formed after the formation of the first transparent layer on the temporary support, it is preferable to apply the coating fluid for forming the first transparent layer for forming the first transparent layer onto the temporary support and then form the second transparent layer before the coating fluid for forming the first transparent layer is fully dried and cured. That is, it is preferable to carry out a second transparent layer formation step of applying the coating fluid for forming the second transparent layer.

It is preferable that the step of forming the first transparent layer is a step of applying the coating fluid for forming the first transparent layer onto the temporary support and the step of forming the second transparent layer is a step of forming the second transparent layer directly on the first transparent layer. Particularly, the step of forming the second transparent layer is more preferably a step of applying the coating fluid for forming the second transparent layer including an ammonium salt of the monomer having an acidic group or the ammonium salt of a resin having an acid group.

According to the manufacturing method of the first embodiment and the second embodiment, the differentiation of the first transparent layer and the second transparent layer becomes favorable, and the low-molecular-weight component included in the first transparent layer is capable of easily passing through the second transparent layer and emerging on the second transparent layer, thereby forming the third transparent layer.

In a case in which the second transparent layer is formed by applying the coating fluid for forming the second transparent layer including the resin having an acidic group, preferably, a resin having an acid value of 150 mgKOH/g or more (water-based resin composition) onto the first transparent layer obtained using the coating fluid for forming the first transparent layer, the layers are not mixed together even in a case in which the second transparent layer is formed before the curing the first transparent layer, and the differentiation becomes favourable.

In addition, in a case in which the above-described constitution is provided, all of the resin having an acidic group constituting the second transparent layer is not dissolved in water in a case in which the second transparent layer is aged at a high temperature and a high humidity and absorbs moisture, and thus a problem generated in a case in which the transfer film absorbs moisture can also be suppressed.

(Step of Forming First Transparent Layer)

The method for manufacturing the transfer film has a step of forming the first transparent resin layer on the temporary support.

The step of forming the first transparent layer is preferably a step of applying the coating fluid for forming the first transparent layer onto the temporary support.

The coating fluid for forming the first transparent layer refers to a solution obtained by dissolving a resin composition for forming the first transparent layer including the polymerizable monomer and the resin in a solvent. The solvent is preferably an organic solvent.

As the organic solvents, well-known organic solvents of the related art can be used. Examples of the organic solvents include methyl ethyl ketone, propylene glycol monomethyl ether, propylene glycol monomethyl ether acetate (1-methoxy-2-propylacetate), cyclohexanone, methyl isobutyl ketone, ethyl lactate, methyl lactate, caprolactam, and the like.

The coating fluid for forming the first transparent layer preferably includes the polymerizable monomer, the resin, the organic solvent, and the polymerization initiator.

(Step of Forming Second transparent layer)

The method for manufacturing the transfer film preferably has a step of forming the second transparent layer directly on the first transparent layer.

The step of forming the second transparent layer is preferably a step of applying a solution obtained by dissolving a resin composition for forming the second transparent layer including at least the metal oxide particles and the resin in an aqueous solvent including water or the like (a coating fluid for forming the second transparent layer (water-based resin composition)).

The aqueous solvent that is used in the coating fluid for forming the second transparent layer is preferably water or a solvent mixture of a lower alcohol having 1 to 3 carbon atoms and water. In a preferred aspect of the method for manufacturing the transfer film, the solvent in the coating fluid for forming the second transparent layer that is used to form the second transparent layer preferably includes water and an alcohol having 1 to 3 carbon atoms and more preferably includes a solvent mixture in which the mass ratio of an alcohol having 1 to 3 carbon atoms to water is 20/80 to 80/20.

The solvent mixture is preferably is preferably a solvent mixture of water and methanol or a solvent mixture of water and ethanol, and a solvent mixture of water and methanol is preferred from the viewpoint of the drying and coating property.

Particularly, in a case in which a solvent mixture of water and methanol (MeOH) is used in the formation of the second transparent layer, the mass ratio (percentage by mass ratio) of MeOH/water is preferably 20/80 to 80/20, more preferably 30/70 to 70/30, and still more preferably 40/60 to 70/30. In a case in which the mass ratio is controlled in the above-described range, the first transparent layer and the second transparent layer are not dissolved and mixed together in the interface, and coating and rapid drying can be realized.

The power of hydrogen (pH) of the coating fluid for forming the second transparent layer at 25° C. is preferably 7.0 or more and 12.0 or less, more preferably 7.0 to 10.0, and particularly preferably 7.0 to 8.5. The pH of the coating fluid for forming the second transparent layer can be adjusted to the above-described preferred range by, for example, adding the monomer having an acidic group or the resin having an acidic group to the acidic groups using an excess amount of ammonia.

In addition, in the method for manufacturing the transfer film, the coating fluid for forming the second transparent layer which is used to form the second transparent layer is preferably at least one of a thermocurable coating fluid or a photocurable coating fluid. In a case in which the first transparent layer and the second transparent layer are preferably curable transparent resin layers as described above since, according to the method for manufacturing the transfer film, even in a case in which the first transparent layer is laminated and then the second transparent layer is laminated without curing the first transparent layer, the layer differentiation becomes favorable, which enables the improvement of the transparent electrode pattern visibility, and it is possible to develop the refractive index-adjusting layers (that is, the first transparent layer and the second transparent layer) in a desired pattern by means of photolithography after the refractive index-adjusting layers are transferred onto the transparent electrode pattern from the obtained transfer film (a transfer material, preferably a transfer film).

In the method for manufacturing the transfer film, the coating fluid for forming the second transparent layer which is used to form the second transparent layer includes an ammonium salt of the monomer having an acidic group or the ammonium salt of a resin having an acid group and preferably includes a binder polymer, a photo- or thermopolymerizable monomer, and a photo- or thermopolymerization initiator. Only the ammonium salt of a resin having an acid group may be the binder polymer, and another binder polymer other than the ammonium salt of a resin having an acid group may be jointly used. The ammonium salt of the monomer having an acid group may be the photo- or thermopolymerizable monomer, and another photo- or thermopolymerizable monomer other than the ammonium salt of the monomer having an acid group may be jointly used.

~Volatilization of Ammonia~

Furthermore, the method for manufacturing the transfer film preferably includes a step of generating an acidic group by volatilizing ammonia from the ammonium salt of a monomer having an acidic group or the ammonium salt of a resin having an acidic group. The step of generating an acidic group by volatilizing ammonia from the ammonium salt of a monomer having an acidic group or the ammonium salt of a resin having an acidic group is preferably a step of heating the applied coating fluid for forming the second transparent layer.

Preferred ranges of the detailed conditions of the step of heating the applied coating fluid for forming the second transparent layer will be described below.

Examples of the heating and drying method include a method in which the composition is passed through a furnace including a heating device and a method in which the composition is heated and dried by means of blasting. The heating and drying conditions may be appropriately set depending on organic solvents and the like being used, and the composition may be heated to a temperature of 40° C. to 150° C. or the like. Among these conditions, the composition is particularly preferably heated to a temperature of 50° C. to 120° C. and more preferably heated to a temperature of 60° C. to 100° C. since it is easy to control the value of P/A of the profile of the depth-direction distribution of M/C of the second transparent layer to a preferred range. In the heated and dried composition, the moisture content is preferably set to 5% by mass or less, more preferably set to 3% by mass or less, and still more preferably set to 1% by mass or less.

(Formation of Third Transparent Layer)

As described above, the coating fluid for forming the first transparent layer is applied and dried, and then the coating fluid for forming the second transparent layer is applied before the coating fluid for forming the first transparent layer is cured, whereby the components that are included in the first transparent layer pass through the second transparent layer and emerge on the second transparent layer, thereby forming the third transparent layer.

(Other Steps)

The method for manufacturing the transfer film in the first embodiment and the second embodiment may include a step of further forming the thermoplastic resin layer before the formation of the first transparent layer on the temporary support and a step of forming the interlayer, which is carried out as desired, after the step of forming the thermoplastic resin layer.

As a method for manufacturing other transparent resin layers, it is possible to employ the method for producing a photosensitive transfer material described in Paragraphs 0094 to 0098 of JP2006-259138A.

~Uses~

Each of the transfer film of the first embodiment and the transfer film of the second embodiment is preferably used to form an electrode protective film in an electrostatic capacitance-type input device and preferably used for, among electrode protective films, a transparent insulating layer or a transparent protective layer. In the transfer film, the first transparent layer may be in a non-cured state, and, in such a case, the transfer film can be used as a transfer film for forming a laminate pattern of an electrode protective film in an electrostatic capacitance-type input device on a transparent electrode pattern using a photolithography method and more preferably used as a transfer film for forming a laminate pattern of the refractive index-adjusting layer and the overcoat layer (transparent protective layer).

[Electrode Protective Film]

An electrode protective film of the first embodiment is a laminate film obtained by removing the temporary support from the transfer film of the first embodiment. An electrode protective film of the second embodiment is a laminate film obtained by removing the temporary support from the transfer film of the second embodiment.

A laminate of the first embodiment which will be described below has the electrode protective film of the first embodiment on a substrate, and an electrode of the substrate including the electrode is protected by being covered with the third transparent layer, the second transparent layer, and the first transparent layer. A laminate of the second embodiment has the electrode protective film of the second embodiment on a substrate, and an electrode of the substrate including the electrode is protected by being covered with the third transparent layer, the second transparent layer, and the first transparent layer.

[Laminate]

The laminate of the first embodiment is a laminate having, on the substrate including the electrode, the third transparent layer, the second transparent layer, and the first transparent layer of the transfer film of the first embodiment from which the temporary support has been removed in this order from the substrate side. The laminate of the second embodiment is a laminate having, on the substrate including the electrode, the third transparent layer, the second transparent layer, and the first transparent layer of the transfer film of the second embodiment from which the temporary support has been removed in this order from the substrate side.

Basically, the laminate of the first embodiment is a laminate sequentially having the first transparent layer including at least the polymerizable monomer and the resin, the second transparent layer including at least the metal oxide particles and the resin and having an average thickness of less than 200 nm, the third transparent layer having an average thickness that is smaller than the average thickness of the second transparent layer and having a percentage of the metal atoms in all of the atoms of 2% or less in a 300 µm×300 µm area in the case of being measured from the outermost surface opposite to the surface in contact with the second transparent layer using X-ray photoelectron spectroscopy, and the substrate including the electrode. The laminate of the second embodiment is a laminate sequentially having the first transparent layer including at least the polymerizable monomer and the resin, the second transparent layer including at least the metal oxide particles and the resin and having an average thickness of less than 200 nm, the third transparent layer having an average thickness that is smaller than the average thickness of the second transparent layer and having a percentage of the metal atoms in all of the atoms in the layer which is smaller than the percentage of the metal atoms in all of the atoms in the second transparent layer, and the substrate including the electrode.

Meanwhile, in the laminate of the second embodiment, an aspect in which the third transparent layer has a percentage of the metal atoms in all of the atoms of 2% or less in a 300 µm×300 µm area in the case of being measured from the outermost surface opposite to the surface in contact with the second transparent layer using XPS is preferred.

In addition, in the laminate of the first embodiment and the laminate of the second embodiment, an aspect in which the third transparent layer includes the components that are included in the first transparent layer is preferred.

An electrode of the electrostatic capacitance-type input device may be a transparent electrode pattern or a guidance wire. In the laminate, the electrode of the electrostatic capacitance-type input device is preferably an electrode pattern and more preferably a transparent electrode pattern.

The laminate of the first embodiment and the second embodiment has a substrate including an electrode of an electrostatic capacitance-type input device and the first transparent layer, the second transparent layer, and the third transparent layer formed on the substrate in this order from the substrate side.

It is preferable that the laminate has the substrate, the transparent electrode pattern, the third transparent layer disposed adjacent to the transparent electrode pattern, the second transparent layer disposed adjacent to the third transparent layer, and the first transparent layer disposed adjacent to the second transparent layer, and the refractive index of the second transparent layer is higher than the refractive index of the first transparent layer. The refractive index of the second transparent layer is preferably 1.6 or more.

In a case in which the above-described constitution of the laminate is provided, the transparent electrode pattern-masking property becomes favourable.

(Substrate)

Each of the laminates of the first embodiment and the second embodiment has a substrate including an electrode (preferably the electrode of the electrostatic capacitance-type input device). In the substrate including the electrode of the electrostatic capacitance-type input device, the substrate and the electrode are preferably separate members.

As the substrate, a glass substrate or a film substrate can be used.

Examples of the film substrate include base materials of well-known resins such as polyethylene terephthalate (PET), triacetate cellulose (TAC), cycloolefin copolymers (COP), polyimides (PI), and polybenzoxazole (PBO).

The substrate is selected depending on the purpose and, generally, preferably a transparent substrate.

The refractive index of the substrate is particularly preferably 1.5 to 1.52.

(Transparent Electrode Pattern)

The refractive index of the transparent electrode pattern in the input device is preferably 1.75 to 2.1.

The material of the transparent electrode pattern is not particularly limited, and well-known materials can be used. The transparent electrode pattern can be produced using, for example, a translucent conductive metal oxide films such as indium tin oxide (ITO) or indium zinc oxide (IZO). Examples of the above-described metal film include ITO films; metal films of Al, Zn, Cu, Fe, Ni, Cr, Mo, Ag, Au, or the like; alloy films of a plurality of metals such as a copper nickel alloy; metal oxide films of $SiO_2$, and the like. At this time, the film thicknesses of the respective elements can be set to 10 nm to 200 nm. In addition, amorphous ITO films are turned into polycrystalline ITO films by means of firing, and thus it is possible to reduce the electrical resistance.

In a case in which the conductive pattern and the like are formed using ITO or the like, it is possible to refer to Paragraphs 0014 to 0016 of JP4506785B.

An electrode to which the transfer film of the first embodiment is applied is not limited to a transparent electrode. The transfer film of the first embodiment can also be used as a protective film of a metal film or a metal oxide film that is not transparent. An electrode to which the transfer film of the second embodiment is applied is not limited to a transparent electrode. The transfer film of the second embodiment can also be used as a protective film of a metal film or a metal oxide film that is not transparent.

The material of the metal film or the metal oxide film that is not transparent is not particularly limited, and, for example, the materials and the like exemplified as the material of the transparent electrode can be used to form the metal film or the metal oxide film that is not transparent.

[Method for Manufacturing Laminate]

In a method for manufacturing the laminate, the laminate can be manufactured by adhering (laminating) the transfer film to the substrate including the electrode (preferably the electrode of the electrostatic capacitance-type input device) by bringing the third transparent layer side of the transfer film into contact with the substrate and transferring the third transparent layer, the second transparent layer, and the first transparent layer to the substrate. The temporary support is peeled off and removed after the transfer.

During the transfer of the respective transparent layers of the transfer film, it is possible to carry out a surface treatment on the contact surface of the substrate which is a transfer target body with the transfer film in advance in order to enhance the adhesiveness between the substrate and the third transparent layer during the lamination. Examples of the surface treatment include a silane coupling treatment using a silane compound.

The transfer film of the first embodiment or the second embodiment from which the randomly-provided protective film has been removed is transferred to a transfer target body having a transparent electrode pattern, and a laminate is formed.

The transfer film is transferred to the transfer target body by overlaying, pressurizing, and heating the third transparent layer side of the transfer film of the first embodiment or the second embodiment on the surface of the transparent electrode pattern. For the attachment, well-known laminators such as a laminator, a vacuum laminator, and an auto-cut laminator capable of enhancing productivity can be used.

The patterns can be formed as necessary, and an exposure step and a development step are carried out as necessary. As the examples of the exposure step, the development step, and other steps, the method described in Paragraphs 0035 to 0051 of JP2006-23696A is referred to, and the steps can be preferably carried out in the first embodiment and the second embodiment.

The exposure step is a step of exposing the first transparent layer, the second transparent layer, and the third transparent layer which have been transferred onto the transparent electrode pattern.

Specific examples thereof include a method in which a predetermined mask is disposed above the transfer film that has been transferred onto the transparent electrode pattern and the transfer film is exposed in a pattern shape to the above of the mask through the mask and the temporary support. The pattern exposure may be scanning exposure in which the transfer film is exposed by scanning a desired region using a laser or the like.

As a light source for the exposure, it is possible to appropriately select and use a light source as long as the light source is capable of radiating light having wavelengths in a range (for example, 365 nm, 405 nm, or the like) with which at least any of the respective transparent layers described above can be cured. Specific examples thereof include an ultrahigh-pressure mercury lamp, a high-pressure mercury lamp, a metal halide lamp, and the like. The exposure amount is generally approximately 5 mJ/cm$^2$ to 200 mJ/cm$^2$ and preferably approximately 10 mJ/cm$^2$ to 100 mJ/cm$^2$.

The development step that is carried out after the exposure is a step of developing the exposed photocurable resin layer.

In the first embodiment and the second embodiment, the development step is a development step in which the respective transparent layers which have been pattern-exposed are pattern-developed using a developer.

The development can be carried out using a developer. The developer is not particularly limited, and it is possible to use well-known developers such as the developer described in JP1993-72724A (JP-H05-72724A). As the developer, a developer including an alkali aqueous solution is preferably exemplified.

The development method may be any one of puddle development, shower development, shower and spin development, dip development, and the like.

Meanwhile, in a case in which the transfer film has the thermoplastic resin layer, the interlayer, and the like, it is preferable to shower an alkaline liquid that does not easily dissolve photocurable resin layers so as to remove the thermoplastic resin layer, the interlayer, and the like before development and then carry out development. In addition, after the development, it is preferable to shower a cleaning agent or the like and remove development residue by rubbing the surface with a brush or the like. The liquid temperature of the developer is preferably 20° C. to 40° C., and the pH of the developer is preferably 8 to 13.

[Electrostatic Capacitance-Type Input Device]

The electrostatic capacitance-type input device of the first embodiment is an electrostatic capacitance-type input device having the electrode protective film or the laminate of the first embodiment. The electrostatic capacitance-type input device of the second embodiment is an electrostatic capacitance-type input device having the electrode protective film or the laminate of the second embodiment.

The electrostatic capacitance-type input device of the first embodiment is preferably a device produced by transferring the third transparent layer, the second transparent layer, and the first transparent layer from the transfer film of the first embodiment onto the transparent electrode pattern. The electrostatic capacitance-type input device of the second embodiment is preferably a device produced by transferring the third transparent layer, the second transparent layer, and the first transparent layer from the transfer film of the second embodiment onto the transparent electrode pattern.

Specifically, the electrostatic capacitance-type input device of the first embodiment is preferably an electrostatic capacitance-type input device having the first resin layer including at least a cured substance of the polymerizable monomer and the resin, the second resin layer including at least the metal oxide particles and the resin and having an average thickness of less than 200 nm, and the third resin layer having an average thickness that is smaller than the average thickness of the second resin layer and having a percentage of the metal atoms in all of the atoms of 2% or less in a 300 μm×300 μm area in the case of being measured from the outermost surface opposite to the surface in contact with the second transparent layer using X-ray photoelectron spectroscopy, and the substrate having the electrode (preferably the electrode of the electrostatic capacitance-type input device) in this order. The electrostatic capacitance-type input device of the second embodiment is preferably an electrostatic capacitance-type input device having the first resin layer including at least a cured substance of the polymerizable monomer and the resin, the second resin layer including at least the metal oxide particles and the resin and having an average thickness of less than 200 nm, and the third resin layer having an average thickness that is smaller than the average thickness of the second resin layer and having a percentage of the metal atoms in all of the atoms in the layer which is smaller than the percentage of the metal atoms in all of the atoms in the second transparent layer, and the substrate having the electrode (preferably the electrode of the electrostatic capacitance-type input device) in this order.

From the viewpoint of further enhancing the adhesiveness to the transfer target body, the third resin layer is preferably a layer having a percentage of the metal atoms in all of the atoms of 2% or less in a 300 μm×300 μm area in the case of being measured from the outermost surface opposite to the surface in contact with the second resin layer using X-ray photoelectron spectroscopy.

In the electrostatic capacitance-type input device of the first embodiment and the electrostatic capacitance-type input device of the second embodiment, the first resin layer is a cured layer obtained by a curing reaction of the curing component in the first transparent layer of the transfer film (in the present specification, also referred to as "the first cured layer").

The second resin layer is a layer including at least the metal oxide particles and the resin and may be a uncured layer or a cured layer obtained by a curing reaction of a curing component in the case of including the curing component in the layer (in the present specification, in the case of being a cured layer, the second resin layer will also be referred to as "the second cured layer").

In addition, the third resin layer is a cured layer obtained by a curing reaction of a curing component in the third transparent layer of the transfer film (in the present specification, also referred to as "the third cured layer").

The electrostatic capacitance-type input device of the first embodiment has the following elements and, furthermore, preferably has the electrode protective film in the electrostatic capacitance-type input device of the first embodiment or the laminate of the first embodiment. The electrostatic capacitance-type input device of the second embodiment has the following elements and, furthermore, preferably has the electrode protective film in the electrostatic capacitance-type input device of the second embodiment or the laminate of the second embodiment.

(Element 1) a plurality of first transparent electrode patterns in which a plurality of pad portions are formed so as to extend in a first direction through a connection portion;

(Element 2) a plurality of second electrode patterns which are electrically insulated from the first transparent electrode patterns and are made of a plurality of pad portions formed so as to extend in a direction orthogonal to the above-described first direction; and (Element 3) an insulating layer that electrically insulates the first transparent electrode pattern and the second electrode pattern.

The above-described transparent resin layer is, generally, preferably a so-called transparent protective layer in a well-known electrostatic capacitance-type input device.

The electrostatic capacitance-type input device of the first embodiment and the electrostatic capacitance-type input device of the second embodiment are excellent in terms of the transparent electrode pattern-masking property due to the function of the laminate disposed adjacent to the transparent electrode pattern even in the case of including a variety of members described above.

Touch panels and the like can also be considered as the electrostatic capacitance-type input device.

To the electrostatic capacitance-type input device of the first embodiment, the electrostatic capacitance-type input device of the second embodiment, and an image display device provided as a constituent element of the electrostatic capacitance-type input device, it is possible to apply the constitution disclosed by "Advanced touch panel technology" (published by Techno Times Co., Ltd. on Jul. 6, 2009), "Technology and development of touch panels" edited by Yuji Mitani, CMC Publishing Co., Ltd. (December 2004), FPD International 2009 Forum T-11 lecture textbook, Cypress Semiconductor Corporation application note AN2292, and the like.

[Method for Manufacturing Electrostatic Capacitance-Type Input Device]

A method for manufacturing an electrostatic capacitance touch panel of the first embodiment has, in this order, a step of bringing the surface of the third transparent layer of the transfer film into contact with the substrate including the electrode (preferably the electrode of the electrostatic capacitance-type input device) and attaching the transfer film of the first embodiment to the substrate, a step of exposing the substrate to which the transfer film has been attached, a step of developing the exposed transfer film, and a step of peeling the temporary support between the step of attaching the transfer film and the exposure step and/or between the exposure step and the development step. A method for manufacturing an electrostatic capacitance touch panel of the second embodiment has, in this order, a step of bringing the surface of the third transparent layer of the transfer film into contact with the substrate including the electrode (preferably the electrode of the electrostatic capacitance-type input device) and attaching the transfer film of the second embodiment to the substrate, a step of exposing the substrate to which the transfer film has been attached, a step of developing the exposed transfer film, and a step of peeling the temporary support between the step of attaching the transfer film and the exposure step and/or between the exposure step and the development step.

Meanwhile, the step of attaching the transfer film to the substrate, the step of exposing the transfer film, and the step of developing the transfer film have been described in detail in the section of the method for manufacturing the laminate, which can also be applied to the method for manufacturing the electrostatic capacitance-type input device (preferably the electrostatic capacitance touch panel).

EXAMPLES

Hereinafter, the present invention will be more specifically described using examples. Materials, amounts used, ratios, processing contents, processing orders, and the like described in the following examples can be appropriately modified within the scope of the gist of the present invention. Therefore, the scope of the present invention is not limited to specific examples described below. Meanwhile, unless particularly otherwise described, "parts", "%" are mass-based.

Meanwhile, in the following examples, the weight-average molecular weight of a resin is a weight-average molecular weight obtained in terms of polystyrene using gel permeation chromatography (GPC). In addition, a theoretical acid value was used as the acid value.

Examples 1 to 21 and Comparative Examples 1 and 2

<Preparation of Coating Fluid for Forming First Transparent Layer>

Materials A-1 to A-10 having a composition shown in Table 1 (coating fluids for forming a first transparent layer) were prepared.

Numerical values provided beside individual structural units in Compound A represent the content ratios (molar ratios) of the individual structural units, and the weight-average molecular weight of Compound A is 29,000.

Meanwhile, cells with no numerical value in Table 1 represent that the corresponding materials are not included.

TABLE 1

| | Material | Material A-1 | Material A-2 | Material A-3 | Material A-4 | Material A-5 | Material A-6 | Material A-7 | Material A-8 | Material A-9 | Material A-10 |
|---|---|---|---|---|---|---|---|---|---|---|---|
| Photo-polymerizable compound | Tricyclodecane dimethanol diacrylate (A-DCP, manufactured by Shin-Nakamura Chemical Co., Ltd.) | 5.63 | | 3.76 | 6.19 | 4.23 | 5.63 | 5.63 | 5.63 | 5.60 | 5.60 |
| | Carboxylic acid-containing monomer ARONIX TO-2349, (manufactured by Toagosei Co., Ltd.) | 0.93 | 0.93 | 0.83 | 1.02 | 0.93 | 0.93 | 0.93 | 0.93 | 0.93 | 0.93 |
| | Ditrimethylolpropane tetraacrylate (AD-TMP | | 5.63 | | | | | | | | |

TABLE 1-continued

| | Material | Material A-1 | Material A-2 | Material A-3 | Material A-4 | Material A-5 | Material A-6 | Material A-7 | Material A-8 | Material A-9 | Material A-10 |
|---|---|---|---|---|---|---|---|---|---|---|---|
| | manufactured by Shin-Nakamura Chemical Co., Ltd.) | | | | | | | | | | |
| | 1,9-Nonanediol diacrylate (A-NOD-N, manufactured by Shin-Nakamura Chemical Co., Ltd.) | | | 1.25 | | 1.40 | | | | | |
| | Urethane acrylate 8UX-015A (manufactured by Taisei Fine Chemical Co., Ltd.) | 2.81 | 2.81 | 2.50 | | 2.81 | 2.81 | 2.81 | 2.81 | 2.80 | 2.80 |
| | ARONIX M-270 (manufactured by Toagosei Co., Ltd.) | | | | 3.09 | | | | | | |
| Binder polymer | Compound A (acid value: 95 mgKOH/g, Mw: 29,000, Mn: 13,700) | 15.63 | 15.63 | 16.67 | 14.70 | 15.63 | 15.63 | 15.63 | 15.63 | 15.59 | 15.59 |
| Photo-polymerization initiator | Ethanone, 1-[9-ethyl-6-(2-methylbenzoyl)-9H-carbazole-3-yl]-, 1-(O-acetyloxime) (trade name: OXE-02, manufactured by BASF) | 0.11 | 0.11 | 0.11 | 0.11 | 0.11 | 0.11 | 0.11 | 0.11 | 0.11 | 0.11 |
| | 2-Methyl-1-(4-methyl thiophenyl)-2-morpholino-propan-1-one (trade name: Irgacure 907, manufactured by BASF) | 0.21 | 0.21 | 0.21 | 0.21 | 0.21 | 0.21 | 0.21 | 0.21 | 0.21 | 0.21 |
| Sensitizer | MTBD1 (manufactured by Showa Denko K. K.) | | | | | | 0.03 | | | | |
| | α-Methylstyrene dimer (manufactured by Tokyo Chemical Industry Co., Ltd.) | | | | | | 0.15 | | | | |
| | N-phenylglycine (manufactured by Yodo Kagaku Co., Ltd.) | | | | | | | 0.03 | 0.15 | 0.03 | 0.03 |
| Polymerization inhibitor | MQ (p-methoxyphenol (manufactured by Kawaguchi Chemical Co., Ltd.)) | | | | | | 0.001 | | | | |
| | Phenothiazine (manufactured by Tokyo Chemical Industry Co., Ltd.) | | | | | | | | 0.001 | | |
| Blocked isocyanate | DURANATE TPA-B80E (manufactured by Asahi Kasei Corporation) | 3.63 | | 3.63 | 3.63 | 3.60 | 3.47 | 3.60 | 3.47 | | 3.63 |
| | DURANATE X3071.04 (manufactured by Asahi Kasei Corporation) | | 3.63 | | | | | | | 3.63 | |
| Additive | MEGAFACE F551 (manufactured by DIC Corporation) | 0.02 | 0.02 | 0.02 | 0.02 | 0.02 | 0.02 | 0.02 | 0.02 | 0.02 | 0.02 |
| | 5-Amino-1H-tetrazole (manufactured by Toyobo Co., Ltd.) | | | | | | 0.15 | | | | |
| | Benzoimidazole (manufactured by Tokyo Chemical Industry Co., Ltd.) | | | | | | | | 0.15 | 0.09 | |
| | 1,2,4 triazole (manufactured by Otsuka Chemical Co., Ltd.) | | | | | | | | | | 0.09 |
| Solvent | 1-Methoxy-2-propylacetate | 31.03 | 31.03 | 31.02 | 31.03 | 31.03 | 31.03 | 31.03 | 31.03 | 31.08 | 31.08 |
| | Methyl ethyl ketone | 40.00 | 40.00 | 40.00 | 40.00 | 40.00 | 40.00 | 40.00 | 40.00 | 40.00 | 40.00 |
| | Photopolymerizable compound/ binder polymer ratio | 0.60 | 0.60 | 0.50 | 0.70 | 0.60 | 0.60 | 0.60 | 0.60 | 0.60 | 0.60 |
| | Total (parts by mass) | 100 | 100 | 100 | 100 | 100 | 100 | 100 | 100 | 100 | 100 |

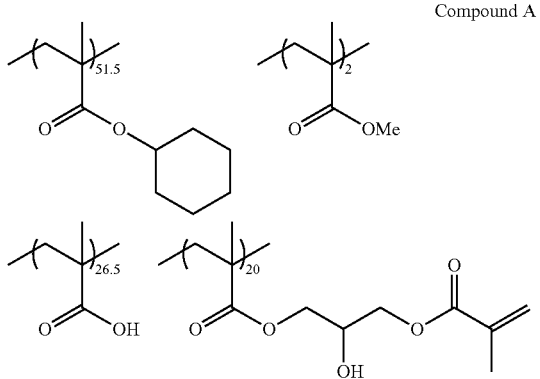

Compound A

<Preparation of Coating Fluid for Forming Second Transparent Layer>

Next, Materials B-1 to B-18 having a composition shown in Table 2 to Table 4 (coating fluids for forming a second transparent layer) were prepared.

Meanwhile, cells with no numerical value in Table 2 to Table 4 represent that the corresponding materials are not included.

In addition, the viscosity of a solvent at 20° C. was measured using a TV25-type viscometer (TVE-25) manufactured by Toki Sangyo Co., Ltd. from the solvent having an adjusted temperature in a constant-temperature tank (20° C.).

TABLE 2

| Material | Mw | Acid value | Viscosity of solvent mPs·s (20° C.) | Material B-1 | Material B-2 | Material B-3 | Material B-4 | Material B-5 | Material B-6 | Material B-7 | Material B-8 | Material B-9 |
|---|---|---|---|---|---|---|---|---|---|---|---|---|
| NANOUSE OZ-S30M: $ZrO_2$ particles, methanol dispersion liquid (nonvolatile component: 30.5%) manufactured by Nissan Chemical Industries, Ltd. | | | | 4.26 | 4.37 | 4.37 | 4.37 | 4.37 | 4.26 | 4.26 | 4.26 | 4.26 |
| TS-020: $TiO_2$ particles water dispersion (nonvolatile component: 25.6%) manufactured by TAYCA | | | | | | | | | | | | |
| Ammonia water (25%) | | | | 7.84 | 7.84 | 7.84 | 7.84 | 7.84 | 7.84 | 7.84 | 7.84 | 7.84 |
| Binder polymer Copolymer resin of methacrylic acid/allyl methacrylate (Mw: 38,000, Mn: 8,500, compositional ratio = 40/60, nonvolatile component: 99.8%) | 38000 | 130 | | 0.42 | 0.15 | 0.18 | 0.20 | 0.23 | 0.28 | 0.42 | 0.38 | 0.38 |
| Compound B | 15500 | 240 | | 0.05 | 0.10 | 0.08 | 0.05 | 0.03 | | | | |
| Compound C | 2000 | 70 | | | | | | | 0.19 | | | |
| Compound D | 7500 | 260 | | | | | | | | 0.05 | | |
| Compound E | 14000 | 230 | | | | | | | | | 0.05 | |
| Compound F | 12500 | 210 | | | | | | | | | | 0.05 |
| Carboxylic acid-containing monomer ARONIX TO-2349 (manufactured by Toagosei Co., Ltd.) | | | | 0.04 | 0.03 | 0.03 | 0.03 | 0.03 | 0.04 | 0.04 | 0.04 | 0.04 |
| Blocked isocyanate DURANATE WM44-L70G (manufactured by Asahi Kasei Corporation) | | | | | | | | | | | 0.06 | |
| TAKENATE WB-3021 (manufactured by Mitsui Chemicals, Inc.) | | | | | | | | | | | | 0.10 |
| Benzotriazole BT-LX (manufactured by Johoku Chemical Co., Ltd.) | | | | 0.04 | 0.03 | 0.03 | 0.03 | 0.03 | 0.04 | 0.04 | | |
| 5-Amino-1H-tetrazole (manufactured by Toyobo Co., Ltd.) | | | | | | | | | | | 0.04 | |
| Benzoimidazole (manufactured by Tokyo Chemical Industry Co., Ltd.) | | | | | | | | | | | | 0.04 |
| MEGAFACE F444 (manufactured by DIC Corporation) | | | | 0.01 | 0.01 | 0.01 | 0.01 | 0.01 | 0.01 | 0.01 | 0.01 | 0.01 |
| Ion-exchange water | | | 1.0 | 21.6 | 21.5 | 21.5 | 21.5 | 21.5 | 21.6 | 21.6 | 21.6 | 21.5 |
| Methanol | | | 0.6 | 65.7 | 66.0 | 66.0 | 66.0 | 66.0 | 65.7 | 65.7 | 65.7 | 65.7 |
| Isopropyl alcohol | | | 2.4 | | | | | | | | | |
| Diacetone alcohol | | | 3.2 | | | | | | | | | |
| Ethylene glycol | | | 23.5 | | | | | | | | | |
| Total (parts by mass) | | | | 100 | 100 | 100 | 100 | 100 | 100 | 100 | 100 | 100 |

TABLE 3

| Material | Mw | Acid value | Viscosity of solvent mPs·s (20° C.) | Material B-10 | Material B-11 | Material B-12 | Material B-13 | Material B-14 | Material B-15 | Material B-16 |
|---|---|---|---|---|---|---|---|---|---|---|
| NANOUSE OZ-S30M: $ZrO_2$ particles, methanol dispersion liquid (nonvolatile component: 30.5%) manufactured by Nissan Chemical Industries, Ltd. | | | | | | 4.36 | 4.36 | 4.36 | 4.36 | |
| TS-020: $TiO_2$ particles water dispersion (nonvolatile component: 25.6%) manufactured by TAYCA | | | | 3.29 | 5.81 | | | | | |
| Ammonia water (25%) | | | | 7.84 | 7.84 | 7.84 | 7.84 | 7.84 | 7.84 | 7.84 |
| Binder polymer  Copolymer resin of methacrylic acid/allyl methacrylate (Mw: 38,000, Mn: 8,500, compositional ratio = 40/60, nonvolatile component: 99.8%) | 38000 | 130 | | 0.89 | 0.56 | 0.47 | 0.47 | 0.47 | 0.47 | 3.54 |
| Compound B | 15500 | 240 | | 0.05 | 0.11 | | | | | |
| Compound C | 2000 | 70 | | | | | | | | |
| Compound D | 7500 | 260 | | | | | | | | |
| Compound E | 14000 | 230 | | | | | | | | |
| Compound F | 12500 | 210 | | | | | | | | |
| Carboxylic acid-containing monomer ARONIX TO-2349 (manufactured by Toagosei Co., Ltd.) | | | | 0.04 | 0.04 | 0.04 | 0.04 | 0.04 | 0.04 | 0.04 |
| Blocked isocyanate  DURANATE WM44-L70G (manufactured by Asahi Kasei Corporation) | | | | | | | | | | |
| TAKENATE WB-3021 (manufactured by Mitsui Chemicals, Inc.) | | | | | | | | | | |
| Benzotriazole BT-LX (manufactured by Johoku Chemical Co., Ltd.) | | | | 0.04 | 0.04 | 0.04 | 0.04 | 0.04 | 0.04 | 0.04 |
| 5-Amino-1H-tetrazole (manufactured by Toyobo Co., Ltd.) | | | | | | | | | | |
| Benzoimidazole (manufactured by Tokyo Chemical Industry Co., Ltd.) | | | | | | | | | | |
| MEGAFACE F444 (manufactured by DIC Corporation) | | | | 0.01 | 0.01 | 0.01 | 0.01 | 0.01 | 0.01 | 0.01 |
| Ion-exchange water | | | 1.0 | 19.1 | 16.9 | 21.5 | 21.5 | 21.5 | 21.5 | 22.8 |
| Methanol | | | 0.6 | 68.7 | 68.7 | 60.7 | 60.7 | 65.7 | 60.7 | 65.7 |
| Isopropyl alcohol | | | 2.4 | | | | | | 5.0 | |
| Diacetone alcohol | | | 3.2 | | | | 5.0 | | | |
| Ethylene glycol | | | 23.5 | | | | | 5.0 | | |
| Total (parts by mass) | | | | 100 | 100 | 100 | 100 | 100 | 100 | 100 |

TABLE 4

| Material | Mw | Acid value | Viscosity of solvent [mPs·s] (20° C.) | Material B-17 | Material B-18 |
|---|---|---|---|---|---|
| NANOUSE OZ-S30M: $ZrO_2$ particles, methanol dispersion liquid (nonvolatile component: 30.5%) manufactured by Nissan Chemical Industries, Ltd. | | | | 4.34 | 4.34 |
| TS-020: $TiO_2$ particles water dispersion (nonvolatile component: 25.6%) manufactured by TAYCA | | | | | |
| Ammonia water (25%) | | | | 7.82 | 7.82 |
| Monoisopropanolamine (manufactured by Mitsui Fine Chemicals, Inc.) | | | | 0.02 | |
| Diisopropylamine (manufactured by Daicel-Allnex Ltd., and the like) | | | | | 0.02 |
| Binder polymer  Copolymer resin of methacrylic acid/allyl methacrylate (Mw: 38,000, Mn: 8,500, compositional ratio = 40/60, nonvolatile component: 99.8%) | 38000 | 130 | | 0.24 | 0.24 |

TABLE 4-continued

| Material | Mw | Acid value | Viscosity of solvent [mPs · s] (20° C.) | Material B-17 | Material B-18 |
|---|---|---|---|---|---|
| Compound B | 15500 | 240 | | 0.01 | 0.01 |
| Compound C | 2000 | 70 | | | |
| Compound D | 7500 | 260 | | | |
| Compound E | 14000 | 230 | | | |
| Compound F | 12500 | 210 | | | |
| Carboxylic acid-containing monomer ARONIX TO-2349 (manufactured by Toagosei Co., Ltd.) | | | | 0.03 | 0.03 |
| Blocked isocyanate DURANATE WM44-L70G (manufactured by Asahi Kasei Corporation) | | | | | |
| TAKENATE WB-3021 (manufactured by Mitsui Chemicals, Inc.) | | | | | |
| Benzotriazole BT-LX (manufactured by Johoku Chemical Co., Ltd.) | | | | 0.03 | 0.03 |
| MEGAFACE F444 (manufactured by DIC Corporation) | | | | 0.01 | 0.01 |
| Ion-exchange water | | | 1.0 | 21.5 | 21.5 |
| Methanol | | | 0.6 | 66.0 | 66.0 |
| Isopropyl alcohol | | | 2.4 | | |
| Diacetone alcohol | | | 3.2 | | |
| Ethylene glycol | | | 23.5 | | |
| Total (parts by mass) | | | | 100 | 100 |

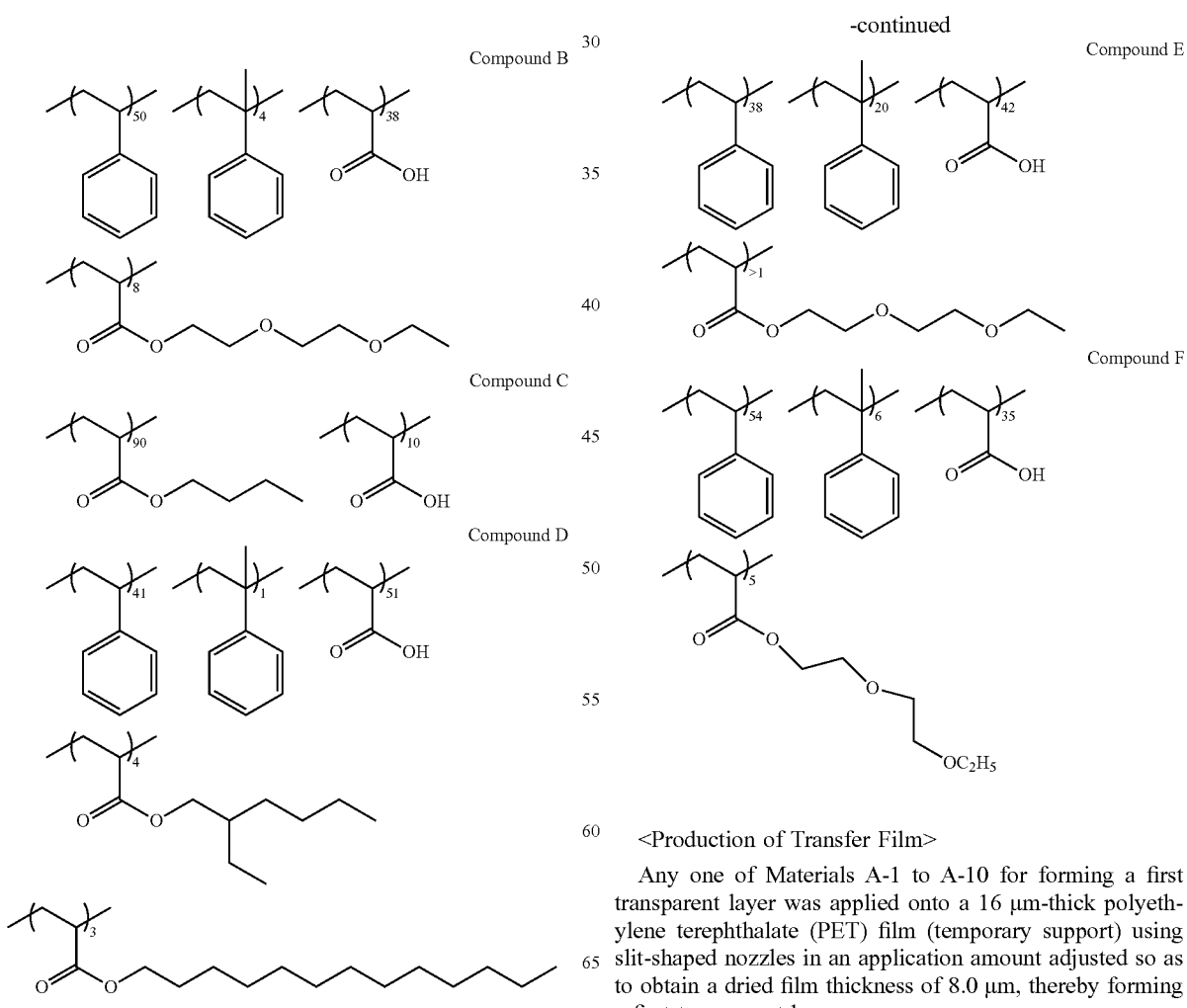

<Production of Transfer Film>

Any one of Materials A-1 to A-10 for forming a first transparent layer was applied onto a 16 μm-thick polyethylene terephthalate (PET) film (temporary support) using slit-shaped nozzles in an application amount adjusted so as to obtain a dried film thickness of 8.0 μm, thereby forming a first transparent layer.

Next, the solvent in the first transparent layer was volatilized in a drying zone at 100° C., and then at least one of Materials B-1 to B-18 for forming a second transparent layer was applied onto the first transparent layer from slit-shaped nozzles according to a combination shown in Table 6 and Table 7 in an application amount adjusted so that the dried film thickness reached a film thickness of 80 nm. After that, the formed second transparent layer was dried at a drying temperature of 70° C., thereby forming a second transparent layer. A protective film (12 μm-thick polypropylene film) was pressed onto the second transparent layer, thereby producing a transfer film of each of Examples 1 to 21.

Production of Transfer Film of Comparative Example 1

Material A-1 for a first transparent layer was applied on a temporary support which was a polyethylene terephthalate film using slit-shaped nozzles in an application amount adjusted so that the dried film thickness reached 8.0 μm. After the solvent was volatilized in a drying zone at 100° C., the material was irradiated using an UV lamp (at an exposure amount of 80 mJ/cm$^2$, a metal halide lamp). After that, Material B-13 for a second transparent layer was applied in an application amount adjusted so that the dried thickness reached a film thickness of 80 nm and dried, thereby producing a transfer film of Comparative Example 1.

Production of Transfer Film of Comparative Example 2

Material A-1 for a first transparent layer was applied on a temporary support which was a polyethylene terephthalate film using slit-shaped nozzles in an application amount adjusted so that the dried film thickness reached 8.0 μm. After the solvent was volatilized in a drying zone at 100° C., Material B-1 was applied using slit-shaped nozzles in an application amount adjusted so that the dried film thickness reached 90 nm and dried. Furthermore, Material B-16 for a second transparent layer was applied in an application amount adjusted so that the dried film thickness reached 200 nm and dried, thereby producing a transfer film of Comparative Example 2.

~Layer Structure of Transfer Film~

For a variety of the transfer films produced as described above, the formation of the third transparent layer on the first transparent layer and the second transparent layer was confirmed using a method described below.

Specifically, each of the produced transfer films was cut using an ultramicrotome, thereby producing a specimen having an exposed cross section. Next, the cross section of the specimen was observed using a transmission electron microscope (TEM). As a result, it was confirmed that, in the respective examples and Comparative Example 2, a layer structure in which the first transparent layer, the second transparent layer, and the third transparent layer were laminated was confirmed.

~Confirmation of Components Included in Third Transparent Layer~

Here, the surface of the third transparent layer in the transfer film of each of the examples and the comparative Example was analysed using Time-of-Flight Secondary Ion Mass Spectrometry (TOF-SIMS).

As a result, fragments indicating methyl ethyl ketone (MEK) oxime which was a protective group (blocking agent) that was included in DURANATE TPA-B80E and DURANATE X3071.04 (manufactured by Asahi Kasei Corporation) which were blocked isocyanates included in the first transparent layer were detected. Therefore, it was confirmed that the third transparent layer included a low-molecular-weight component included in the first transparent layer which had passed through the second transparent layer.

Furthermore, the percentage of metal atoms (M) constituting metal oxide particles was measured using a method described below and evaluated according to evaluation standards described below on the basis of the measured percentage. As a result, like the percentages shown in Table 6, 2% or less of metal atoms were confirmed.

(1) Each of the transfer films produced as described above was cut using an ultramicrotome, and Energy Dispersive X-ray Spectroscopy (EDX) was carried out on the cross section of the specimen having an exposed cross section using HD2300-type STEM manufactured by Hitachi High-Technologies Corporation.

As a result, it was confirmed that, in the respective examples and Comparative Example 2, the X-ray intensity of Zr or Ti in the third transparent layer was smaller than the X-ray intensity of Zr or Ti in the second transparent layer.

It was confirmed that the proportion of the metal atoms in all of the atoms in the layer of the third transparent layer was smaller than the proportion of the metal atoms in all of the atoms in the layer of the second transparent layer.

(2) Using Quantera SXM-type XPS (manufactured by ULVAC-PHI, Inc.) and X-ray Photoelectron Spectroscopy (XPS), the percentage of the metal atoms (M) constituting the metal oxide particles was measured from the outermost surface opposite to the interface of the third transparent layer on the surface of the transfer film in contact with the second transparent layer was measured. The measurement conditions are as described below. In the measurement conditions, the detection depth from the surface is, generally, approximately 10 nm.

<Measurement Conditions>
X-ray: Al-Kα ray (100 μm, 25 W, 15 kV)
Measurement area: 300 μm (μm=300 μm×300 μm)
Photoelectron Take Off Angle: 45°
Pass Energy: 112 eV, Step Energy: 0.1 eV The percentage was evaluated according to the following evaluation standards on the basis of the percentage measured under the above-described measurement conditions. The evaluation results are shown in Table 6.

<Evaluation Standards>
A: 2% or less
B: More than 2% and 3% or less
C: More than 3%

~Thicknesses of First Transparent Layer, Second Transparent Layer, and Third Transparent Layer~

Each of the transfer films produced as described above was cut using an ultramicrotome, a distance of 5 mm in the cross section of the specimen having an exposed cross section was observed as a measurement region using TEM, and the thicknesses of the first transparent layer, the second transparent layer, and the third transparent layer were measured. The thicknesses of 20 places obtained by dividing the measurement region at equal intervals were measured, the arithmetic average in each layer was computed on the basis of the respective measurement values, and the average values of the respective layers were considered as the average thicknesses.

In addition, 100×H2/T2 was computed and considered as the thickness distribution. Meanwhile, H2 represents the absolute value of the difference between the maximum value and the minimum value of the thickness of the second transparent layer, and T2 represents the average thickness of the second transparent layer.

The results are shown in Table 6.

<Production of Transparent Electrode Pattern Film Used to Produce Laminate>

(Formation of Transparent Film)

A corona discharge treatment was carried out on a cycloolefin resin film having a film thickness of 38 μm and a refractive index of 1.53 for three seconds using a high-frequency oscillator and a wire electrode having a diameter of 1.2 mm at an output voltage of 100% and an output of 250 W under conditions of an electrode length of 240 mm and a distance between working electrodes of 1.5 mm, thereby reforming the surface. The obtained film was used as a transparent film substrate.

Next, Material-C shown in Table 5 was applied onto the transparent film substrate using slit-shaped nozzles, then, was irradiated with ultraviolet rays (at an integral of light of 300 mJ/cm$^2$), and was dried at approximately 110° C., thereby producing a transparent film having a refractive index of 1.60 and a film thickness of 80 nm.

TABLE 5

| Material | Material-C |
|---|---|
| ZrO$_2$: manufactured by Solar Co., Ltd., ZR-010 | 2.08 |
| DPHA liquid (dipentaerythritol hexaacrylate: 38%, dipentaerythritol pentaacrylate: 38%, 1-methoxy-2-propyl acetate: 24%) | 0.29 |
| Urethane-based monomer: NK OLIGOMER UA-32P, manufactured by Shin-Nakamura Chemical Co., Ltd., nonvolatile component: 75%, 1-methoxy-2-propyl acetate: 25% | 0.14 |
| Monomer mixture (the polymerizable compound (b2-1) described in Paragraph [0111] of JP2012-78528A, n = 1: the content ratio of tripentaerythritol octaacrylate: 85%, the sum of n = 2 and n = 3 as impurities: 15%) | 0.36 |
| Polymer solution 1 (Structural Formula P-25 described in [0058] of JP2008-146018A: the weight-average molecular weight = 35,000, solid content: 45%, 1-methoxy-2-propyl acetate: 15%, 1-methoxy-2-propanol: 40%) | 1.89 |
| Photoradical photopolymerization initiator: 2-benzyl-2-dimethylamino-1-(4-morpholinophenyl)-butanone (IRGACURE (registered trademark) 379, manufactured by BASF) | 0.03 |
| Photopolymerization initiator: KAYACURE DETX-S (alkylthioxanthone manufactured by Nippon Kayaku Co., Ltd.) | 0.03 |
| Polymer solution 2 (polymer having a structural formula represented by Formula (3): solution having a weight-average molecular weight = 15,000, nonvolatile content: 30% by mass, methyl ethyl ketone: 70% by mass) | 0.01 |
| 1-Methoxy-2-propyl acetate | 38.73 |
| Methyl ethyl ketone | 56.80 |
| Total (parts by mass) | 100 |

Formula (3)

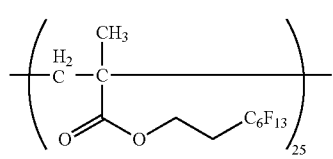

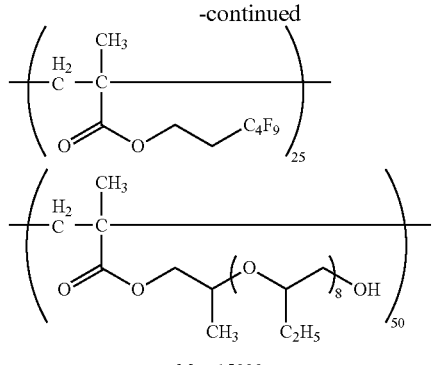

Mw: 15000

<Formation of Transparent Electrode Pattern>

A film having the transparent film laminated on the transparent film substrate was introduced into a vacuum chamber, and a 40 nm-thick ITO thin film having a refractive index of 1.82 was formed using an ITO target (indium:tin=95:5 (molar ratio)) in which the content ratio of SnO$_2$ was 10% by mass by means of direct current (DC) magnetron sputtering (conditions: the temperature of the transparent film substrate was 150° C., the argon pressure was 0.13 Pa, and the oxygen pressure was 0.01 Pa), thereby obtaining a film having the transparent film and a transparent electrode layer formed on the transparent film substrate. The surface electrical resistance of the ITO thin film was 80Ω/(Ω per square).

(Preparation of Photosensitive Film for Etching E1)

A coating fluid for a thermoplastic resin layer made of Formulation H1 was applied and dried on a 75 μm-thick polyethylene terephthalate film temporary support using slit-shaped nozzles. Next, a coating fluid for an interlayer made of Formulation P1 was applied and dried. Furthermore, a coating fluid for a photocurable resin layer for etching made of Formulation E1 was applied and dried. A laminate made up of a thermoplastic resin layer having a dried film thickness of 15.1 μm, an interlayer having a dried film thickness of 1.6 μm, and a photocurable resin layer for etching having a film thickness of 2.0 μm was obtained on the temporary support using the above-described method, and finally, a protective film (12 μm-thick polypropylene film) was pressed thereonto. A photosensitive film for etching E1 which is a transfer material in which the temporary support, the thermoplastic resin layer, the interlayer (oxygen-blocking film), and the photocurable resin layer for etching were integrated together was produced.

(Coating Fluid for Photocurable Resin Layer for Etching: Formulation E1)

| | |
|---|---|
| Methyl methacrylate/styrene/methacrylic acid copolymer (copolymer composition (% by mass): 31/40/29, weight-average molecular weight of 60,000, acid value: 163 mgKOH/g) | 16 parts by mass |
| Monomer 1 (trade name: BPE-500, Shin-Nakamura Chemical Co., Ltd.) | 5.6 parts by mass |
| Adduct of hexamethylene diisocyanate and 0.5 mol of tetraethylene oxide monomethacrylate | 7 parts by mass |
| Cyclohexane dimethanol monoacrylate as a compound having one polymerizable group in the molecule | 2.8 parts by mass |

-continued

| | |
|---|---|
| 2-Chloro-N-butylacridone | 0.42 parts by mass |
| 2,2-Bis(o-chlorophenyl)-4,4',5,5'-tetraphenyl biimidazole | 2.17 parts by mass |
| Malachite green oxalate | 0.02 parts by mass |
| Leuco crystal violet | 0.26 parts by mass |
| Phenothiazine | 0.013 parts by mass |
| Surface-activating agent (trade name: MEGAFACE F-780F, DIC Corporation) | 0.03 parts by mass |
| Methyl ethyl ketone | 40 parts by mass |
| 1-Methoxy-2-propanol | 20 parts by mass |

Meanwhile, the viscosity of the coating fluid for a photocurable resin layer for etching E1 after the removal of the solvent at 100° C. was 2,500 Pa·sec.

(Coating Fluid for Thermoplastic Resin Layer: Formulation H1)

| | |
|---|---|
| Methanol | 11.1 parts by mass |
| Propylene glycol monomethyl ether acetate | 6.36 parts by mass |
| Methyl ethyl ketone | 52.4 parts by mass |
| Methyl methacrylate/2-ethylhexyl acrylate/benzyl methacrylate/methacrylic acid copolymer (copolymerization compositional ratio (molar ratio) = 55/11.7/4.5/28.8, molecular weight = 100,000, Tg ≈ 70° C.) | 5.83 parts by mass |
| Styrene/acrylic acid copolymer (copolymerization compositional ratio (molar ratio) = 63/37, weight-average molecular weight = 10,000, Tg ≈ 100° C.) | 13.6 parts by mass |
| Monomer 1 (trade name: BPE-500, Shin-Nakamura Chemical Co., Ltd.) | 9.1 parts by mass |
| Fluorine-based polymer [trade name: MEGAFACE F780F, DIC Corporation, a copolymer of 40 parts by mass of $C_6F_{13}CH_2CH_2OCOCH=CH_2$, 55 parts by mass of $H(OCH(CH_3)CH_2)_7OCOCH=CH_2$, and 5 parts by mass of $H(OCHCH_2)_7OCOCH=CH_2$, weight-average molecular weight: 30,000, a solution of 30% by mass of methyl ethyl ketone] | 0.54 parts by mass |

(Coating Fluid for Interlayer: Formulation P1)

| | |
|---|---|
| Polyvinyl alcohol (trade name: PVA205, manufactured by Kuraray Co., Ltd., degree of saponification = 88%, degree of polymerization 550) | 32.2 parts by mass |
| Polyvinyl pyrrolidone (trade name: K-30, manufactured by ISB Corporation) | 14.9 parts by mass |
| Distilled water | 524 parts by mass |
| Methanol | 429 parts by mass |

—Formation of Transparent Electrode Pattern—

The film having the transparent film and the transparent electrode layer formed on the transparent film substrate was washed, and the photosensitive film for etching E1 from which the protective film had been removed was laminated on the washed film. Regarding the lamination conditions, the lamination was carried out at a temperature of the transparent film substrate of 130° C., a rubber roller temperature of 120° C., a linear pressure of 100 N/cm, and a transportation rate of 2.2 m/minute.

After the temporary support was peeled off, the distance between a surface of an exposure mask (a silica exposure mask having a transparent electrode pattern) and the above-described photocurable resin layer for etching was set to 200 μm, and pattern exposure was carried out at an exposure amount of 50 mJ/cm² (i rays).

Next, the laminate was treated at 25° C. for 100 seconds using a triethanolamine-based developer (containing 30% by mass of triethanolamine, a liquid obtained by diluting T-PD2 (trade name, Fujifilm Corporation) with pure water ten times) and at 33° C. for 20 seconds using a surface-activating agent-containing washing liquid (a liquid obtained by diluting T-SD3 (trade name, manufactured by Fujifilm Corporation) with pure water ten times), residues were removed using a rotary brush and ultrahigh-pressure washing nozzles, and furthermore, a post-baking treatment was carried out at 130° C. for 30 minutes, thereby obtaining a film having the transparent film, the transparent electrode layer, and a photocurable resin layer pattern for etching formed on the transparent film substrate.

The film having the transparent film, the transparent electrode layer, and the photocurable resin layer pattern for etching formed on the transparent film substrate was immersed in an etching tank filled with an etching liquid for ITO (hydrochloric acid or an aqueous solution of potassium chloride, liquid temperatures: 30° C.), was treated for 100 seconds, and the transparent electrode layer in exposed regions which were not covered with the photocurable resin layer for etching was dissolved and removed, thereby obtaining a transparent electrode pattern-attached film to which the photocurable resin layer pattern for etching was attached.

Next, this transparent electrode pattern-attached film to which the photocurable resin layer pattern for etching was attached was immersed in a resist peeling tank filled with a resist peeling liquid (N-methyl-2-pyrrolidone, monoethanolamine, surface-activating agent (trade name: SURFYNOL 465, manufactured by Air Products and Chemicals, Inc.), liquid temperatures: 45° C.) and treated for 200 seconds, and the photocurable resin layer for etching was removed, thereby obtaining a film having the transparent film and a transparent electrode pattern formed on the transparent film substrate.

<4. Production of Transparent Laminates of Examples and Comparative Examples>

Using the transfer film of each of the examples and the comparative examples from which the protective film had been peeled off, the transfer film was laminated on a location at which the transfer film covered a transparent film and a transparent electrode pattern of a film having the transparent film and the transparent electrode pattern formed on a transparent film substrate. As a result, the third transparent layer, the second transparent layer, the first transparent layer, and the temporary support were transferred in this order onto the transparent film and the transparent electrode pattern on the transparent film substrate due to the transfer film. The transfer was carried out under conditions of a temperature of the transparent film substrate of 40° C., a rubber roller temperature of 110° C., a linear pressure of 3 N/cm, and a transportation rate of 2 m/minute.

After that, using a proximity-type stepper having an ultrahigh-pressure mercury lamp (manufactured by Hitachi High-Tech Fielding Corporation), the distance between a surface of an exposure mask (a silica exposure mask having a pattern for forming an overcoat layer) and the temporary support was set to 125 μm, and pattern exposure was carried out at an exposure amount of 100 mJ/cm² (i rays) through the temporary support.

After the temporary support was peeled off, a washing treatment was carried out at 32° C. for 60 seconds using an aqueous solution of 2% of sodium carbonate. Ultrapure water was sprayed to the washing-treated transparent film substrate from ultrahigh-pressure washing nozzles, thereby removing residues. Subsequently, moisture on the transparent film substrate was removed by blowing the air, and a post-baking treatment was carried out at 145° C. for 30 minutes, thereby producing a transparent laminate in which the transparent film, the transparent electrode pattern, the third cured layer obtained by curing the third transparent layer, the second cured layer obtained by curing the second transparent layer, and the first cured layer obtained by curing the first transparent layer were laminated on the transparent film substrate in this order from the substrate.

~Layer Structure of Transparent Laminate~

For the transparent laminate produced as described above, the presence of the cured layer of the third transparent layer on the cured layer of the first transparent layer and the cured layer of the second transparent layer was confirmed using a method described below.

Specifically, the produced transparent laminate was cut using a FB-2100-type FIB manufactured by Hitachi High-Technologies Corporation, thereby producing a specimen having an exposed cross section. Next, the cross section of the specimen was observed using a transmission electron microscope (TEM).

As a result, in the respective examples and Comparative Example 2, a layer structure having the first cured layer which was the cured layer of the first transparent layer, the second cured layer which was the cured layer of the second transparent layer, and the third cured layer which was the cured layer of the third transparent layer was confirmed.

~Proportion of Metal Atoms in All Atoms in Third Cured Layer~

(1) Each of the transparent laminates produced as described above was cut using a FB-2100-type FIB manufactured by Hitachi High-Technologies Corporation, and Energy Dispersive X-ray Spectroscopy (EDX) was carried out on the cross section of a specimen having an exposed cross section using HD2300-type STEM manufactured by Hitachi High-Technologies Corporation.

As a result, it was confirmed that, in the respective examples and Comparative Example 2, the X-ray intensity of Zr or Ti in the third cured layer was smaller than the X-ray intensity of Zr or Ti in the second cured layer.

That is, it was confirmed that the proportion of the metal atoms in all of the atoms in the third cured layer was smaller than the proportion of the metal atoms in all of the atoms in the second cured layer.

(2) Using Quantera SXM-type XPS (manufactured by ULVAC-PHI, Inc.) and X-ray Photoelectron Spectroscopy (XPS), the percentage of the metal atoms (M) constituting the metal oxide particles was measured in the same manner as in the case of the transfer film from the outermost surface opposite to the interface of the third cured layer in the transparent laminate in contact with the second cured layer was measured and evaluated. The evaluation results are shown in Table 7.

<Evaluation Standards>

A: 2% or less
B: More than 2% and 3% or less
C: More than 3%

~Thickness of Third Cured Layer~

Each of the transparent laminates produced as described above was cut using a FB-2100-type FIB manufactured by Hitachi High-Technologies Corporation, a distance of 5 mm in the cross section of the specimen having an exposed cross section was observed as a measurement region using TEM, and the thicknesses of the first cured layer, the second cured layer, and the third cured layer were measured. The thicknesses of 20 places obtained by dividing the measurement region at equal intervals were measured, the arithmetic average in each layer was computed on the basis of the respective measurement values, and the average values of the respective layers were considered as the average thicknesses.

In addition, $100 \times H2/T2$ was computed and considered as the thickness distribution. Meanwhile, H2 represents the absolute value of the difference between the maximum value and the minimum value of the thickness of the second transparent layer, and T2 represents the average thickness of the second transparent layer.

The results are shown in Table 7.

[Evaluation of Transparent Laminate]

<Evaluation of Transparent Electrode Pattern-Masking Property>

The transparent film of a transparent laminate having the transparent film, the transparent electrode pattern, the third cured layer, the second cured layer, and the first cured layer in this order on the transparent film substrate and a black PET material were adhered to each other through transparent adhesive tape (manufactured by 3M Company, (trade name) OCA tape 8171CL), thereby blocking the entire substrate from light.

Light was incident on the laminate from the opposite side to the black PET material using a fluorescent lamp in a dark room, reflected light was visually observed at an inclined angle, and the transparent electrode pattern becoming visible was evaluated. A, B, C, or D is a practical level, A or B is preferred, and A is more preferred.

<Evaluation Standards>

A: The transparent electrode pattern was not visible in the case of being seen from a distance of 15 cm and not visible in the case of being normally seen from a distance of 40 cm.

B: The transparent electrode pattern was slightly visible in the case of being seen from a distance of 15 cm and not visible in the case of being normally seen from a distance of 40 cm.

C: The transparent electrode pattern was slightly visible in the case of being seen from a distance of 15 cm and slightly visible in the case of being normally seen from a distance of 40 cm.

D: The transparent electrode pattern was clearly visible in the case of being seen from a distance of 15 cm and slightly visible in the case of being normally seen from a distance of 40 cm.

E: The transparent electrode pattern was clearly visible in the case of being seen from a distance of 15 cm and clearly visible in the case of being normally seen from a distance of 40 cm.

<Evaluation of Defects of Second Cured Layer>

The respective transparent layers were transferred by adhering the transfer film of each of the examples to the transparent film substrate, then, using a proximity-type stepper having an ultrahigh-pressure mercury lamp (manufactured by Hitachi High-Tech Fielding Corporation), the distance between a surface of an exposure mask (a silica exposure mask having a pattern for forming an overcoat layer) and the temporary support was set to 125 μm, and pattern exposure was carried out at an exposure amount of 100 mJ/cm$^2$ (i rays) through the temporary support. After the temporary support was peeled off, dark-field observation was carried out using a microscope, the presence and absence of defects (that is, cracks) was observed, and the defects were evaluated according to the following evaluation standards.

Among the evaluation standards, the evaluation of the defects of the laminated second cured layer is preferably A, B, or C, more preferably A or B, and particularly preferably A. The evaluation results are shown in Table 7.

<Evaluation Standards>
A: Defects were not visible.
B: Defects were slightly visible.
C: Defects were visible.
D: Defects were clearly visible.

<Evaluation of Adhesiveness>

A 100-mess cross-cut test was carried out with reference to JIS Standard (K5400). A 1 mm×1 mm grid cut was made on the surface opposite to a transparent film base material which was a test surface of the transparent laminate of each of the examples and the comparative examples using a cutter knife, transparent adhesive tape #600 (3M Company) was strongly pressed thereon and peeled off in a 180° direction, the state of the grid was observed, and the adhesiveness was evaluated according to the following evaluation standards. A, B, or C is practically essential. The evaluation results are shown in Table 7.

<Evaluation Standards>
A: Almost 100% of the entire area was adhered.
B: 95% or more and less than 100% of the entire area remained adhered.
C: 65% or more and less than 95% of the entire area remained adhered.
D: 35% or more and less than 65% of the entire area remained adhered.
E: Less than 35% of the entire area remained adhered.

TABLE 6

| | First transparent layer | | | Second transparent layer | | | | | Third transparent layer | |
|---|---|---|---|---|---|---|---|---|---|---|
| | | | | | Metal oxide particles | | | | | |
| | Material | UV curing | Average thickness [μm] | Material | Kind | Amount added (% by mass) | Average thickness (H2) | 100 × H2/T2 (%) | Average thickness | Percentage of metal atoms [%] |
| Example 1 | Material A-1 | No | 8 | Material B-1 | ZrO$_2$ | 70 | 90 nm | 10 | 10 nm or less | A |
| Example 2 | Material A-1 | No | 8 | Material B-2 | ZrO$_2$ | 80 | 70 nm | 2 | 10 nm or less | A |
| Example 3 | Material A-1 | No | 8 | Material B-3 | ZrO$_2$ | 80 | 80 nm | 25 | 10 nm or less | A |
| Example 4 | Material A-2 | No | 8 | Material B-4 | ZrO$_2$ | 80 | 80 nm | 35 | 10 nm or less | A |
| Example 5 | Material A-3 | No | 8 | Material B-5 | TiO$_2$ | 80 | 80 nm | 50 | 20 nm | A |
| Example 6 | Material A-4 | No | 8 | Material B-6 | TiO$_2$ | 70 | 60 nm | 55 | 20 nm | A |
| Example 7 | Material A-2 | No | 8 | Material B-7 | ZrO$_2$ | 70 | 80 nm | 30 | 10 nm or less | A |
| Example 8 | Material A-1 | No | 8 | Material B-8 | ZrO$_2$ | 70 | 80 nm | 30 | 10 nm or less | A |
| Example 9 | Material A-1 | No | 8 | Material B-9 | ZrO$_2$ | 70 | 80 nm | 30 | 10 nm or less | A |
| Example 10 | Material A-5 | No | 8 | Material B-7 | ZrO$_2$ | 70 | 80 nm | 30 | 10 nm or less | A |
| Example 11 | Material A-6 | No | 8 | Material B-8 | ZrO$_2$ | 70 | 80 nm | 13 | 10 nm or less | A |
| Example 12 | Material A-7 | No | 8 | Material B-9 | ZrO$_2$ | 70 | 80 nm | 13 | 10 nm or less | A |
| Example 13 | Material A-8 | No | 8 | Material B-1 | ZrO$_2$ | 70 | 90 nm | 10 | 10 nm or less | A |
| Example 14 | Material A-1 | No | 8 | Material B-10 | TiO$_2$ | 45 | 100 nm | 18 | 10 nm or less | A |
| Example 15 | Material A-1 | No | 8 | Material B-11 | TiO$_2$ | 80 | 60 nm | 15 | 10 nm or less | A |
| Example 16 | Material A-1 | No | 8 | Material B-12 | ZrO$_2$ | 70 | 80 nm | 65 | 20 nm | A |
| Example 17 | Material A-1 | No | 8 | Material B-13 | ZrO$_2$ | 70 | 80 nm | 35 | 10 nm or less | A |
| Example 18 | Material A-1 | No | 8 | Material B-14 | ZrO$_2$ | 70 | 80 nm | 85 | 30 nm | A |
| Example 19 | Material A-1 | No | 8 | Material B-15 | ZrO$_2$ | 70 | 80 nm | 85 | 30 nm | A |
| Example 20 | Material A-9 | No | 8 | Material B-17 | ZrO$_2$ | 80 | 70 nm | 2 | 10 nm or less | A |
| Example 21 | Material A-10 | No | 8 | Material B-18 | ZrO$_2$ | 80 | 70 nm | 2 | 10 nm or less | A |
| Comparative Example 1 | Material A-1 | Yes | 8 | Material B-13 | ZrO$_2$ | 70 | 80 nm | 15 | N/A (0 nm) | C |
| Comparative Example 2 | Material A-1 | No | 8 | Material B-1/ Material B-16 | ZrO$_2$ | 70 | 90 nm | 10 | 200 nm | A |

TABLE 7

| | First cured layer | | Second cured layer | | | | | Third cured layer | | Evaluation of transparent laminate | | | |
|---|---|---|---|---|---|---|---|---|---|---|---|---|---|
| | | | | Metal oxide particles | | | | | | | | | |
| | Material | Average thickness [μm] | Material | Kind | Amount added (% by mass) | Average thickness (H2) | 100 × H2/T2 (%) | Average thickness | Percentage of metal atoms [%] | Adhesiveness | Defects in second cured layer | Transparent electrode pattern-masking property |
| Example 1 | Material A-1 | 8 | Material B-1 | ZrO$_2$ | 70 | 90 nm | 10 | 10 nm or less | A | A | A | A |
| Example 2 | Material A-1 | 8 | Material B-2 | ZrO$_2$ | 80 | 70 nm | 2 | 10 nm or less | A | A | A | A |
| Example 3 | Material A-1 | 8 | Material B-3 | ZrO$_2$ | 80 | 80 nm | 25 | 10 nm or less | A | A | B | A |
| Example 4 | Material A-2 | 8 | Material B-4 | ZrO$_2$ | 80 | 80 nm | 35 | 10 nm or less | A | A | B | A |
| Example 5 | Material A-3 | 8 | Material B-5 | TiO$_2$ | 80 | 80 nm | 50 | 20 nm | A | A | B | B |
| Example 6 | Material A-4 | 8 | Material B-6 | TiO$_2$ | 70 | 60 nm | 55 | 20 nm | A | A | B | B |
| Example 7 | Material A-2 | 8 | Material B-7 | ZrO$_2$ | 70 | 80 nm | 30 | 10 nm or less | A | A | B | A |
| Example 8 | Material A-1 | 8 | Material B-8 | ZrO$_2$ | 70 | 80 nm | 30 | 10 nm or less | A | A | B | A |

TABLE 7-continued

| | First cured layer | | Second cured layer | | | | | Third cured layer | | Evaluation of transparent laminate | | |
|---|---|---|---|---|---|---|---|---|---|---|---|---|
| | | | | Metal oxide particles | | | | | | | Defects | Transparent |
| | | Average thickness | | | Amount added | Average thickness | 100 × | | Percentage of metal | Ad- | in second | electrode |
| | Material | [μm] | Material | Kind | (% by mass) | (H2) | H2/T2 (%) | Average thickness | atoms [%] | hesiveness | cured layer | pattern-masking property |
| Example 9 | Material A-1 | 8 | Material B-9 | ZrO₂ | 70 | 80 nm | 30 | 10 nm or less | A | A | B | A |
| Example 10 | Material A-5 | 8 | Material B-7 | ZrO₂ | 70 | 80 nm | 30 | 10 nm or less | A | A | B | A |
| Example 11 | Material A-6 | 8 | Material B-8 | ZrO₂ | 70 | 80 nm | 13 | 10 nm or less | A | A | A | A |
| Example 12 | Material A-7 | 8 | Material B-9 | ZrO₂ | 70 | 80 nm | 13 | 10 nm or less | A | A | A | A |
| Example 13 | Material A-8 | 8 | Material B-1 | ZrO₂ | 70 | 90 nm | 10 | 10 nm or less | A | A | A | A |
| Example 14 | Material A-1 | 8 | Material B-10 | TiO₂ | 45 | 100 nm | 18 | 10 nm or less | A | A | A | A |
| Example 15 | Material A-1 | 8 | Material B-11 | TiO₂ | 80 | 60 nm | 15 | 10 nm or less | A | A | A | A |
| Example 16 | Material A-1 | 8 | Material B-12 | ZrO₂ | 70 | 80 nm | 65 | 20 nm | A | A | B | B |
| Example 17 | Material A-1 | 8 | Material B-13 | ZrO₂ | 70 | 80 nm | 35 | 10 nm or less | A | A | B | A |
| Example 18 | Material A-1 | 8 | Material B-14 | ZrO₂ | 70 | 80 nm | 85 | 30 nm | A | A | C | C |
| Example 19 | Material A-1 | 8 | Material B-15 | ZrO₂ | 70 | 80 nm | 85 | 30 nm | A | A | C | C |
| Example 20 | Material A-9 | 8 | Material B-17 | ZrO₂ | 80 | 70 nm | 2 | 10 nm or less | A | A | A | A |
| Example 21 | Material A-10 | 8 | Material B-18 | ZrO₂ | 80 | 70 nm | 2 | 10 nm or less | A | A | A | A |
| Comparative Example 1 | Material A-1 | 8 | Material B-13 | ZrO₂ | 70 | 80 nm | 15 | N/A (0 nm) | C | E | A | A |
| Comparative Example 2 | Material A-1 | 8 | Material B-1/ Material B-16 | ZrO₂ | 70 | 90 nm | 10 | 200 nm | A | A | A | E |

From Table 7, it is found that the transfer films of the examples became favourable in terms of adhesiveness due to the presence of the third transparent layer, the value of 100×H2/T2 was small, and it became possible to produce laminates having no defects in the laminated second transparent layer by making the thickness distribution of the second transparent layer uniform.

Meanwhile, as described above, as a result of analyzing the third transparent layer, it was confirmed that the third transparent layer contained the low-molecular-weight component (MEK oxime) which was a blocking agent of a blocked isocyanate that was included in the first transparent layer.

On the other hand, in the transfer film of Comparative Example 1 in which the second transparent layer was formed after the curing of the first transparent layer, the low-molecular-weight component included in the first transparent layer did not emerge on the second transparent layer, the third transparent layer was not formed, and the adhesiveness to the transfer target body was poor. Meanwhile, in Comparative Example 2 in which the third transparent layer was formed using the coating method, the thickness of the third transparent layer was thick, the favorable refractive index balance in the second transparent layer collapsed, and the transparent electrode pattern-masking property was poor.

<<Production of Image Display Device (Touch Panel)>>

To a liquid crystal display device manufactured using the method described in [0097] to [0119] of JP2009-47936A, a film including the previously-manufactured transparent laminate of each example was attached, and, furthermore, a front glass plate was bound, thereby producing an image display device including the transparent laminate of each of the examples which included the electrostatic capacitance-type input device as a constituent element using a well-known method.

<<Evaluation of Electrostatic Capacitance-Type Input Devices and Image Display Devices>>

The electrostatic capacitance-type input devices and the image display devices including the transparent laminate of each of the examples did not have a problem of the transparent electrode pattern being visible.

Defects such as air bubbles were not generated in both of the photosensitive transparent resin layer and the second transparent layer, and image display devices having excellent display characteristics were obtained.

The disclosure of JP2016-044831 filed on Mar. 8, 2016, the disclosure of JP2016-156904 filed on Aug. 9, 2016, the disclosure of JP2017-043227 filed on Mar. 7, 2017, and the disclosure of JP2017-043289 filed on Mar. 7, 2017 are respectively and fully incorporated into the present specification by reference.

All of documents, patent applications, and technical standards described in the present specification are incorporated into the present specification by reference as much as the documents, the patent applications, and the technical standards are specifically and respectively described to be incorporated by reference.

What is claimed is:

1. A transfer film comprising on a temporary support:
   a first transparent layer including at least a polymerizable monomer and a resin;
   a second transparent layer including at least metal oxide particles and a resin and having an average thickness of less than 200 nm; and
   (A) a third transparent layer having an average thickness that is smaller than the average thickness of the second transparent layer and having a percentage of metal atoms of all atoms in the third transparent layer that is smaller than a percentage of metal atoms of all atoms in the second transparent layer, or (B) a third transparent layer having an average thickness that is smaller than the average thickness of the second transparent layer and having a percentage of metal atoms of all atoms of 2% or less in a 300 μm×300 μm area in the case of being measured from an outermost surface opposite to a surface in contact with the second transparent layer using X-ray photoelectron spectroscopy, sequentially on the temporary support.

2. The transfer film according to claim 1,
wherein the average thickness of the third transparent layer is 10 nm or less.
3. The transfer film according to claim 1,
wherein the first transparent layer further contains a polymerization initiator and a compound capable of reacting with an acid by heating.
4. The transfer film according to claim 1,
wherein the third transparent layer includes a component included in the first transparent layer.
5. The transfer film according to claim 4,
wherein the component is a curing component included in the first transparent layer.
6. The transfer film according to claim 1,
wherein the second transparent layer satisfies Expression (1), $$100 \times H2/T2 \leq 80.0 \qquad \text{Expression(1):}$$

in Expression (1), H2 represents an absolute value of a difference between a maximum value and a minimum value of a thickness of the second transparent layer, and T2 represents the average thickness of the second transparent layer.
7. The transfer film according to claim 1,
wherein the second transparent layer satisfies Expression (2), $$100 \times H2/T2 \leq 40.0 \qquad \text{Expression (2):}$$

in Expression (2), H2 represents an absolute value of a difference between a maximum value and a minimum value of a thickness of the second transparent layer, and T2 represents the average thickness of the second transparent layer.
8. The transfer film according to claim 1,
wherein the second transparent layer satisfies Expression (3), $$100 \times H2/T2 \leq 20.0 \qquad \text{Expression (3):}$$

in Expression (3), H2 represents an absolute value of a difference between a maximum value and a minimum value of a thickness of the second transparent layer, and T2 represents the average thickness of the second transparent layer.
9. The transfer film according to claim 1,
wherein the second transparent layer includes a resin (A) having an acid value of 150 mgKOH/g or more, and a resin (B) having an acid value of less than 150 mgKOH/.
10. The transfer film according to claim 9,
wherein at least one of the Resin (A) and the Resin (B) is a resin having a weight-average molecular weight of 1,000 or more and 20,000 or less.
11. The transfer film according to claim 1,
wherein the resin included in the second transparent layer includes a copolymer having a (meth)acrylic acid-derived structural unit and a styrene-derived structural unit.
12. The transfer film according to claim 1,
wherein the resin included in the second transparent layer includes a copolymer having a (meth)acrylic acid-derived structural unit and a styrene-derived structural unit and having an acid value of 150 mgKOH/g or more.
13. The transfer film according to claim 1,
wherein the resin included in the second transparent layer includes a copolymer having a (meth)acrylic acid-derived structural unit, a styrene-derived structural unit, and a (meth)acrylic acid ester-derived structural unit having an ethyleneoxy chain.
14. The transfer film according to claim 1,
wherein the second transparent layer is formed from a coating fluid that includes solvents comprising a solvent having a viscosity of 3 mPa s or more at 20° C., wherein the solvent having a viscosity of 3 mPa s or more has the highest viscosity among all the solvents.
15. The transfer film according to claim 1,
wherein the metal oxide particles are at least one selected from zirconium oxide particles and titanium oxide particles.
16. An electrode protective film obtained by removing a temporary support from a transfer film, said transfer film comprising on said temporary support:
a first transparent layer including at least a polymerizable monomer and an alkali-soluble resin having an acid value of 60 mgKOH/g or more;
a second transparent layer including at least metal oxide particles and a resin and having an average thickness of less than 200 nm; and
(A) a third transparent layer having an average thickness that is smaller than the average thickness of the second transparent layer and having a percentage of metal atoms of all atoms in the third transparent layer that is smaller than a percentage of metal atoms of all atoms in the second transparent layer, or (B) a third transparent layer having an average thickness that is smaller than the average thickness of the second transparent layer and having a percentage of metal atoms of all atoms of 2% or less in a 300 μm×300 μm area in the case of being measured from an outermost surface opposite to a surface in contact with the second transparent layer using X-ray photoelectron spectroscopy,
sequentially on the temporary support.
17. A laminate comprising on a substrate including an electrode:
the third transparent layer;
the second transparent layer; and
the first transparent layer of the electrode protective film according to claim 16 in this order on the substrate.
18. A laminate sequentially comprising:
a first transparent layer including at least a polymerizable monomer and an alkali-soluble resin having an acid value of 60 mgKOH/g or more;
a second transparent layer including at least metal oxide particles and a resin and having an average thickness of less than 200 nm;
(A) a third transparent layer having an average thickness that is smaller than the average thickness of the second transparent layer and having a percentage of metal atoms of all atoms in the third transparent layer that is smaller than a percentage of metal atoms of all atoms in the second transparent layer, or (B) a third transparent layer having an average thickness that is smaller than the average thickness of the second transparent layer and having a percentage of metal atoms of all atoms of 2% or less in a 300 μm×300 μm area in the case of being measured from an outermost surface opposite to a surface in contact with the second transparent layer using X-ray photoelectron spectroscopy; and
a substrate including an electrode of an electrostatic capacitance input device.
19. The laminate according to claim 18,
wherein the third transparent layer includes a component included in the first transparent layer.

20. An electrostatic capacitance input device comprising:
a substrate including an electrode that is a capacitive touch layer; and
the electrode protective film according to claim 16.

21. An electrostatic capacitance input device comprising in this order:
a first cured layer including a cured substance of a polymerizable monomer and a resin, wherein the resin is an alkali-soluble resin having an acid value of 60 mgKOH/g or more;
a second cured layer including metal oxide particles and a resin and having an average thickness of less than 200 nm;
a third cured layer having an average thickness that is smaller than the average thickness of the second cured layer and having a percentage of metal atoms of all atoms in the third layer which is smaller than a percentage of metal atoms of all atoms in the second cured layer; and
a substrate including an electrode.

22. The electrostatic capacitance input device according to claim 21 which is a touch panel.

* * * * *